US012627140B2

(12) United States Patent
Yoscovich et al.

(10) Patent No.: US 12,627,140 B2
(45) Date of Patent: May 12, 2026

(54) CHAIN OF POWER DEVICES

(71) Applicant: Solaredge Technologies Ltd., Herzeliya (IL)

(72) Inventors: Ilan Yoscovich, Givatayim (IL); Tzachi Glovinsky, Petah Tikva (IL); Ofir Bieber, Ra'anana (IL)

(73) Assignee: Solaredge Technologies Ltd., Herzeliya (IL)

( * ) Notice: Subject to any disclaimer, the term of this patent is extended or adjusted under 35 U.S.C. 154(b) by 51 days.

(21) Appl. No.: 18/511,655

(22) Filed: Nov. 16, 2023

(65) Prior Publication Data

US 2024/0097440 A1      Mar. 21, 2024

Related U.S. Application Data

(63) Continuation of application No. 17/500,102, filed on Oct. 13, 2021, now Pat. No. 11,870,250, which is a (Continued)

(51) Int. Cl.
*H02J 1/12*        (2006.01)
*H01R 4/00*        (2006.01)
(Continued)

(52) U.S. Cl.
CPC .................. *H02J 1/12* (2013.01); *H01R 4/00* (2013.01); *H01R 25/00* (2013.01); *H02J 1/02* (2013.01);
(Continued)

(58) Field of Classification Search
CPC ...... H02J 1/12; H02J 3/38; H02J 3/381; H02J 3/388; H02J 3/46; H02J 1/00; H02J 7/35;

H02J 2300/24; H02J 2300/26; H02J 1/10; H01R 4/00; H01R 25/00; H02S 40/32; H02S 40/34; H02S 40/36; H02S 50/00;
(Continued)

(56) References Cited

U.S. PATENT DOCUMENTS 2,367,925 A      1/1945  Brown
2,586,804 A      2/1952  Fluke
(Continued)

FOREIGN PATENT DOCUMENTS

AU          2073800 A      9/2000
AU       2005262278 A1      1/2006
(Continued)

OTHER PUBLICATIONS

Storfer, Lior, "Enhancing Cable Modem TCP Performance," Texas Instruments Inc. white paper, Jul. 2003.
(Continued)

*Primary Examiner* — Rexford N Barnie
*Assistant Examiner* — Terrence R Willoughby
(74) *Attorney, Agent, or Firm* — Banner & Witcoff, Ltd.

(57) ABSTRACT

Various implementations described herein are directed to methods for connecting power devices prior to deployment in a photovoltaic installation, for cost savings and easy deployment. Some embodiments disclosed herein include manufacturing a chain of power devices already coupled by conductors, and providing a mechanical assembly for convenient storage and deployment.

16 Claims, 16 Drawing Sheets

Related U.S. Application Data continuation of application No. 15/478,526, filed on Apr. 4, 2017, now Pat. No. 11,177,663.

(60) Provisional application No. 62/395,461, filed on Sep. 16, 2016, provisional application No. 62/341,147, filed on May 25, 2016, provisional application No. 62/318,303, filed on Apr. 5, 2016.

(51) Int. Cl.

| | |
|---|---|
| *H01R 25/00* | (2006.01) |
| *H02J 1/02* | (2006.01) |
| *H02J 3/38* | (2006.01) |
| *H02J 3/388* | (2026.01) |
| *H02J 3/46* | (2006.01) |
| *H02S 40/32* | (2014.01) |
| *H02S 40/34* | (2014.01) |
| *H02S 40/36* | (2014.01) |
| *H02S 50/00* | (2014.01) |
| *H02S 50/10* | (2014.01) |
| *H02J 1/00* | (2006.01) |
| *H02J 7/35* | (2006.01) |

(52) U.S. Cl.
CPC ............... *H02J 3/38* (2013.01); *H02J 3/381* (2013.01); *H02J 3/388* (2020.01); *H02J 3/46* (2013.01); *H02S 40/32* (2014.12); *H02S 40/34* (2014.12); *H02S 40/36* (2014.12); *H02S 50/00* (2013.01); *H02S 50/10* (2014.12); *H02J 1/00* (2013.01); *H02J 7/35* (2013.01); *H02J 2300/24* (2020.01); *H02J 2300/26* (2020.01)

(58) Field of Classification Search
CPC ...... H02S 50/10; H02S 40/30; H02M 7/5387; Y02E 10/56
USPC ...................................................... 307/82–87
See application file for complete search history.

(56) References Cited

U.S. PATENT DOCUMENTS

| | | | |
|---|---|---|---|
| 2,758,219 | A | 8/1956 | Miller |
| 2,852,721 | A | 9/1958 | Harders et al. |
| 2,958,171 | A | 11/1960 | Deckers |
| 3,369,210 | A | 2/1968 | Manickella |
| 3,380,035 | A | 4/1968 | Hecker |
| 3,392,326 | A | 7/1968 | Lamberton |
| 3,496,029 | A | 2/1970 | King et al. |
| 3,566,143 | A | 2/1971 | Paine et al. |
| 3,569,784 | A | 3/1971 | Carroll et al. |
| 3,643,564 | A | 2/1972 | Uchiyama |
| 3,696,286 | A | 10/1972 | Ule |
| 3,740,652 | A | 6/1973 | Burgener |
| 3,958,136 | A | 5/1976 | Schroeder |
| 3,982,105 | A | 9/1976 | Eberle |
| 4,060,757 | A | 11/1977 | McMurray |
| 4,101,816 | A | 7/1978 | Shepter |
| 4,104,687 | A | 8/1978 | Zulaski |
| 4,127,797 | A | 11/1978 | Perper |
| 4,129,788 | A | 12/1978 | Chavannes |
| 4,129,823 | A | 12/1978 | van der Pool et al. |
| 4,146,785 | A | 3/1979 | Neale |
| 4,161,771 | A | 7/1979 | Bates |
| 4,171,861 | A | 10/1979 | Hohorst |
| 4,183,079 | A | 1/1980 | Wachi |
| 4,253,764 | A | 3/1981 | Morrill |
| 4,257,087 | A | 3/1981 | Cuk |
| 4,296,461 | A | 10/1981 | Mallory et al. |
| 4,321,581 | A | 3/1982 | Tappeiner et al. |
| 4,324,225 | A | 4/1982 | Trihey |
| 4,327,318 | A | 4/1982 | Kwon et al. |
| 4,346,341 | A | 8/1982 | Blackburn et al. |
| 4,363,040 | A | 12/1982 | Inose |
| 4,367,557 | A | 1/1983 | Stern et al. |
| 4,375,662 | A | 3/1983 | Baker |
| 4,384,321 | A | 5/1983 | Rippel |
| 4,404,472 | A | 9/1983 | Steigerwald |
| 4,412,142 | A | 10/1983 | Ragonese et al. |
| 4,452,867 | A | 6/1984 | Conforti |
| 4,453,207 | A | 6/1984 | Paul |
| 4,460,232 | A | 7/1984 | Sotolongo |
| 4,470,213 | A | 9/1984 | Thompson |
| 4,479,175 | A | 10/1984 | Gille et al. |
| 4,481,654 | A | 11/1984 | Daniels et al. |
| 4,488,136 | A | 12/1984 | Hansen et al. |
| 4,526,553 | A | 7/1985 | Guerrero |
| 4,533,986 | A | 8/1985 | Jones |
| 4,545,997 | A | 10/1985 | Wong et al. |
| 4,549,254 | A | 10/1985 | Kissel |
| 4,554,502 | A | 11/1985 | Rohatyn |
| 4,554,515 | A | 11/1985 | Burson et al. |
| 4,580,090 | A | 4/1986 | Bailey et al. |
| 4,591,965 | A | 5/1986 | Dickerson |
| 4,598,330 | A | 7/1986 | Woodworth |
| 4,602,322 | A | 7/1986 | Merrick |
| 4,604,567 | A | 8/1986 | Chetty |
| 4,611,090 | A | 9/1986 | Catella et al. |
| 4,623,753 | A | 11/1986 | Feldman et al. |
| 4,626,983 | A | 12/1986 | Harada et al. |
| 4,631,565 | A | 12/1986 | Tihanyi |
| 4,637,677 | A | 1/1987 | Barkus |
| 4,639,844 | A | 1/1987 | Gallios et al. |
| 4,641,042 | A | 2/1987 | Miyazawa |
| 4,641,079 | A | 2/1987 | Kato et al. |
| 4,644,458 | A | 2/1987 | Harafuji et al. |
| 4,649,334 | A | 3/1987 | Nakajima |
| 4,652,770 | A | 3/1987 | Kumano |
| 4,683,529 | A | 7/1987 | Bucher, II |
| 4,685,040 | A | 8/1987 | Steigerwald et al. |
| 4,686,617 | A | 8/1987 | Colton |
| 4,706,181 | A | 11/1987 | Mercer |
| 4,719,553 | A | 1/1988 | Hinckley |
| 4,720,667 | A | 1/1988 | Lee et al. |
| 4,720,668 | A | 1/1988 | Lee et al. |
| 4,736,151 | A | 4/1988 | Dishner |
| 4,746,879 | A | 5/1988 | Ma et al. |
| 4,772,994 | A | 9/1988 | Harada et al. |
| 4,783,728 | A | 11/1988 | Hoffman |
| 4,797,803 | A | 1/1989 | Carroll |
| 4,819,121 | A | 4/1989 | Saito et al. |
| RE33,057 | E | 9/1989 | Clegg et al. |
| 4,864,213 | A | 9/1989 | Kido |
| 4,868,379 | A | 9/1989 | West |
| 4,873,480 | A | 10/1989 | Lafferty |
| 4,888,063 | A | 12/1989 | Powell |
| 4,888,702 | A | 12/1989 | Gerken et al. |
| 4,899,246 | A | 2/1990 | Tripodi |
| 4,899,269 | A | 2/1990 | Rouzies |
| 4,903,851 | A | 2/1990 | Slough |
| 4,906,859 | A | 3/1990 | Kobayashi et al. |
| 4,910,518 | A | 3/1990 | Kim et al. |
| 4,951,117 | A | 8/1990 | Kasai |
| 4,978,870 | A | 12/1990 | Chen et al. |
| 4,987,360 | A | 1/1991 | Thompson |
| 5,001,415 | A | 3/1991 | Watkinson |
| 5,027,051 | A | 6/1991 | Lafferty |
| 5,027,059 | A | 6/1991 | de Montgolfier et al. |
| 5,041,739 | A | 8/1991 | Goto |
| 5,045,988 | A | 9/1991 | Gritter et al. |
| 5,054,023 | A | 10/1991 | Kronberg |
| 5,081,558 | A | 1/1992 | Mahler |
| 5,097,196 | A | 3/1992 | Schoneman |
| 5,138,422 | A | 8/1992 | Fujii et al. |
| 5,143,556 | A | 9/1992 | Matlin |
| 5,144,222 | A | 9/1992 | Herbert |
| 5,155,670 | A | 10/1992 | Brian |
| 5,191,519 | A | 3/1993 | Kawakami |
| 5,196,781 | A | 3/1993 | Jamieson et al. |
| 5,210,519 | A | 5/1993 | Moore |
| 5,235,266 | A | 8/1993 | Schaffrin |
| 5,237,194 | A | 8/1993 | Takahashi |

(56) References Cited

U.S. PATENT DOCUMENTS

| | | | |
|---|---|---|---|
| 5,268,832 | A | 12/1993 | Kandatsu |
| 5,280,133 | A | 1/1994 | Nath |
| 5,280,232 | A | 1/1994 | Kohl et al. |
| 5,287,261 | A | 2/1994 | Ehsani |
| 5,289,361 | A | 2/1994 | Vinciarelli |
| 5,289,998 | A | 3/1994 | Bingley et al. |
| 5,327,071 | A | 7/1994 | Frederick et al. |
| 5,329,222 | A | 7/1994 | Gyugyi et al. |
| 5,345,375 | A | 9/1994 | Mohan |
| 5,379,209 | A | 1/1995 | Goff |
| 5,381,327 | A | 1/1995 | Yan |
| 5,391,235 | A | 2/1995 | Inoue |
| 5,402,060 | A | 3/1995 | Erisman |
| 5,404,059 | A | 4/1995 | Loffler |
| 5,412,558 | A | 5/1995 | Sakurai et al. |
| 5,413,313 | A | 5/1995 | Mutterlein et al. |
| 5,428,286 | A | 6/1995 | Kha |
| 5,446,645 | A | 8/1995 | Shirahama et al. |
| 5,460,546 | A | 10/1995 | Kunishi et al. |
| 5,472,614 | A | 12/1995 | Rossi |
| 5,475,296 | A | 12/1995 | Vinsant et al. |
| 5,477,091 | A | 12/1995 | Fiorina et al. |
| 5,493,154 | A | 2/1996 | Smith et al. |
| 5,497,289 | A | 3/1996 | Sugishima et al. |
| 5,501,083 | A | 3/1996 | Kim |
| 5,504,415 | A | 4/1996 | Podrazhansky et al. |
| 5,504,418 | A | 4/1996 | Ashley |
| 5,504,449 | A | 4/1996 | Prentice |
| 5,513,075 | A | 4/1996 | Capper et al. |
| 5,517,378 | A | 5/1996 | Asplund et al. |
| 5,530,335 | A | 6/1996 | Decker et al. |
| 5,539,238 | A | 7/1996 | Malhi |
| 5,548,504 | A | 8/1996 | Takehara |
| 5,563,780 | A | 10/1996 | Goad |
| 5,565,855 | A | 10/1996 | Knibbe |
| 5,566,022 | A | 10/1996 | Segev |
| 5,576,941 | A | 11/1996 | Nguyen et al. |
| 5,580,395 | A | 12/1996 | Yoshioka et al. |
| 5,585,749 | A | 12/1996 | Pace et al. |
| 5,604,430 | A | 2/1997 | Decker et al. |
| 5,616,913 | A | 4/1997 | Litterst |
| 5,625,539 | A | 4/1997 | Nakata et al. |
| 5,631,534 | A | 5/1997 | Lewis |
| 5,636,107 | A | 6/1997 | Lu et al. |
| 5,644,212 | A | 7/1997 | Takahashi |
| 5,644,219 | A | 7/1997 | Kurokawa |
| 5,646,501 | A | 7/1997 | Fishman et al. |
| 5,648,731 | A | 7/1997 | Decker et al. |
| 5,654,740 | A | 8/1997 | Schulha |
| 5,659,465 | A | 8/1997 | Flack et al. |
| 5,677,833 | A | 10/1997 | Bingley |
| 5,684,385 | A | 11/1997 | Guyonneau et al. |
| 5,686,766 | A | 11/1997 | Tamechika |
| 5,696,439 | A | 12/1997 | Presti et al. |
| 5,703,390 | A | 12/1997 | Itoh |
| 5,708,576 | A | 1/1998 | Jones et al. |
| 5,719,758 | A | 2/1998 | Nakata et al. |
| 5,722,057 | A | 2/1998 | Wu |
| 5,726,505 | A | 3/1998 | Yamada et al. |
| 5,726,615 | A | 3/1998 | Bloom |
| 5,731,603 | A | 3/1998 | Nakagawa et al. |
| 5,734,258 | A | 3/1998 | Esser |
| 5,734,259 | A | 3/1998 | Sisson et al. |
| 5,734,565 | A | 3/1998 | Mueller et al. |
| 5,747,967 | A | 5/1998 | Muljadi et al. |
| 5,751,120 | A | 5/1998 | Zeitler et al. |
| 5,773,963 | A | 6/1998 | Blanc et al. |
| 5,777,515 | A | 7/1998 | Kimura |
| 5,777,858 | A | 7/1998 | Rodulfo |
| 5,780,092 | A | 7/1998 | Agbo et al. |
| 5,793,184 | A | 8/1998 | O'Connor |
| 5,798,631 | A | 8/1998 | Spee et al. |
| 5,801,519 | A | 9/1998 | Midya et al. |
| 5,804,894 | A | 9/1998 | Leeson et al. |
| 5,812,045 | A | 9/1998 | Ishikawa et al. |
| 5,814,970 | A | 9/1998 | Schmidt |
| 5,821,734 | A | 10/1998 | Faulk |
| 5,822,186 | A | 10/1998 | Bull et al. |
| 5,838,148 | A | 11/1998 | Kurokami et al. |
| 5,847,549 | A | 12/1998 | Dodson, III |
| 5,859,772 | A | 1/1999 | Hilpert |
| 5,869,956 | A | 2/1999 | Nagao et al. |
| 5,873,738 | A | 2/1999 | Shimada et al. |
| 5,886,882 | A | 3/1999 | Rodulfo |
| 5,886,890 | A | 3/1999 | Ishida et al. |
| 5,892,354 | A | 4/1999 | Nagao et al. |
| 5,898,585 | A | 4/1999 | Sirichote et al. |
| 5,903,138 | A | 5/1999 | Hwang et al. |
| 5,905,645 | A | 5/1999 | Cross |
| 5,917,722 | A | 6/1999 | Singh |
| 5,919,314 | A | 7/1999 | Kim |
| 5,923,100 | A | 7/1999 | Lukens et al. |
| 5,923,158 | A | 7/1999 | Kurokami et al. |
| 5,929,614 | A | 7/1999 | Copple |
| 5,930,128 | A | 7/1999 | Dent |
| 5,930,131 | A | 7/1999 | Feng |
| 5,932,994 | A | 8/1999 | Jo et al. |
| 5,933,327 | A | 8/1999 | Leighton et al. |
| 5,945,806 | A | 8/1999 | Faulk |
| 5,946,206 | A | 8/1999 | Shimizu et al. |
| 5,949,668 | A | 9/1999 | Schweighofer |
| 5,955,885 | A | 9/1999 | Kurokami et al. |
| 5,959,438 | A | 9/1999 | Jovanovic et al. |
| 5,961,739 | A | 10/1999 | Osborne |
| 5,963,010 | A | 10/1999 | Hayashi et al. |
| 5,963,078 | A | 10/1999 | Wallace |
| 5,982,253 | A | 11/1999 | Perrin et al. |
| 5,986,909 | A | 11/1999 | Hammond et al. |
| 5,990,659 | A | 11/1999 | Frannhagen |
| 6,002,290 | A | 12/1999 | Avery et al. |
| 6,002,603 | A | 12/1999 | Carver |
| 6,008,971 | A | 12/1999 | Duba et al. |
| 6,021,052 | A | 2/2000 | Unger et al. |
| 6,031,736 | A | 2/2000 | Takehara et al. |
| 6,037,720 | A | 3/2000 | Wong et al. |
| 6,038,148 | A | 3/2000 | Farrington et al. |
| 6,046,470 | A | 4/2000 | Williams et al. |
| 6,046,919 | A | 4/2000 | Madenokouji et al. |
| 6,050,779 | A | 4/2000 | Nagao et al. |
| 6,058,035 | A | 5/2000 | Madenokouji et al. |
| 6,064,086 | A | 5/2000 | Nakagawa et al. |
| 6,078,511 | A | 6/2000 | Fasullo et al. |
| 6,081,104 | A | 6/2000 | Kern |
| 6,082,122 | A | 7/2000 | Madenokouji et al. |
| 6,087,738 | A | 7/2000 | Hammond |
| 6,091,329 | A | 7/2000 | Newman |
| 6,093,885 | A | 7/2000 | Takehara et al. |
| 6,094,129 | A | 7/2000 | Baiatu |
| 6,101,073 | A | 8/2000 | Takehara |
| 6,105,317 | A | 8/2000 | Tomiuchi et al. |
| 6,111,188 | A | 8/2000 | Kurokami et al. |
| 6,111,391 | A | 8/2000 | Cullen |
| 6,111,767 | A | 8/2000 | Handleman |
| 6,127,801 | A | 10/2000 | Manor |
| 6,130,458 | A | 10/2000 | Takagi et al. |
| 6,150,739 | A | 11/2000 | Baumgartl et al. |
| 6,151,234 | A | 11/2000 | Oldenkamp |
| 6,163,086 | A | 12/2000 | Choo |
| 6,166,455 | A | 12/2000 | Li |
| 6,166,527 | A | 12/2000 | Dwelley et al. |
| 6,169,678 | B1 | 1/2001 | Kondo et al. |
| 6,175,219 | B1 | 1/2001 | Imamura et al. |
| 6,175,512 | B1 | 1/2001 | Hagihara et al. |
| 6,191,456 | B1 | 2/2001 | Stoisiek et al. |
| 6,191,498 | B1 | 2/2001 | Chang |
| 6,215,286 | B1 | 4/2001 | Scoones et al. |
| 6,219,623 | B1 | 4/2001 | Wills |
| 6,222,351 | B1 | 4/2001 | Fontanella et al. |
| 6,225,793 | B1 | 5/2001 | Dickmann |
| 6,255,360 | B1 | 7/2001 | Domschke et al. |
| 6,255,804 | B1 | 7/2001 | Herniter et al. |
| 6,256,234 | B1 | 7/2001 | Keeth et al. |
| 6,259,234 | B1 | 7/2001 | Perol |
| 6,262,558 | B1 | 7/2001 | Weinberg |

(56)                References Cited

U.S. PATENT DOCUMENTS

| | | |
|---|---|---|
| 6,268,559 B1 | 7/2001 | Yamawaki |
| 6,274,804 B1 | 8/2001 | Psyk et al. |
| 6,275,016 B1 | 8/2001 | Ivanov |
| 6,281,485 B1 | 8/2001 | Siri |
| 6,285,572 B1 | 9/2001 | Onizuka et al. |
| 6,291,764 B1 | 9/2001 | Ishida et al. |
| 6,292,379 B1 | 9/2001 | Edevold et al. |
| 6,297,621 B1 | 10/2001 | Hui et al. |
| 6,301,128 B1 | 10/2001 | Jang et al. |
| 6,304,065 B1 | 10/2001 | Wittenbreder |
| 6,307,749 B1 | 10/2001 | Daanen et al. |
| 6,311,137 B1 | 10/2001 | Kurokami et al. |
| 6,316,716 B1 | 11/2001 | Hilgrath |
| 6,320,769 B2 | 11/2001 | Kurokami et al. |
| 6,329,808 B1 | 12/2001 | Enguent |
| 6,331,670 B2 | 12/2001 | Takehara et al. |
| 6,339,538 B1 | 1/2002 | Handleman |
| 6,344,612 B1 | 2/2002 | Kuwahara et al. |
| 6,346,451 B1 | 2/2002 | Simpson et al. |
| 6,348,781 B1 | 2/2002 | Midya et al. |
| 6,350,944 B1 | 2/2002 | Sherif et al. |
| 6,351,130 B1 | 2/2002 | Preiser et al. |
| 6,369,461 B1 | 4/2002 | Jungreis et al. |
| 6,369,462 B1 | 4/2002 | Siri |
| 6,380,719 B2 | 4/2002 | Underwood et al. |
| 6,396,170 B1 | 5/2002 | Laufenberg et al. |
| 6,396,239 B1 | 5/2002 | Benn et al. |
| 6,400,579 B2 | 6/2002 | Cuk |
| 6,425,248 B1 | 7/2002 | Tonomura et al. |
| 6,429,546 B1 | 8/2002 | Ropp et al. |
| 6,429,621 B1 | 8/2002 | Arai |
| 6,433,522 B1 | 8/2002 | Siri |
| 6,433,978 B1 | 8/2002 | Neiger et al. |
| 6,441,597 B1 | 8/2002 | Lethellier |
| 6,445,599 B1 | 9/2002 | Nguyen |
| 6,448,489 B2 | 9/2002 | Kimura et al. |
| 6,452,362 B1 | 9/2002 | Choo |
| 6,452,814 B1 | 9/2002 | Wittenbreder |
| 6,465,910 B2 | 10/2002 | Young et al. |
| 6,465,931 B2 | 10/2002 | Knowles et al. |
| 6,469,919 B1 | 10/2002 | Bennett |
| 6,472,254 B2 | 10/2002 | Cantarini et al. |
| 6,479,963 B1 | 11/2002 | Manor et al. |
| 6,483,203 B1 | 11/2002 | McCormack |
| 6,493,246 B2 | 12/2002 | Suzui et al. |
| 6,501,362 B1 | 12/2002 | Hoffman et al. |
| 6,507,176 B2 | 1/2003 | Wittenbreder, Jr. |
| 6,509,712 B1 | 1/2003 | Landis |
| 6,512,444 B1 | 1/2003 | Morris, Jr. et al. |
| 6,515,215 B1 | 2/2003 | Mimura |
| 6,515,217 B1 | 2/2003 | Aylaian |
| 6,519,165 B2 | 2/2003 | Koike |
| 6,528,977 B2 | 3/2003 | Arakawa |
| 6,531,848 B1 | 3/2003 | Chitsazan et al. |
| 6,545,211 B1 | 4/2003 | Mimura |
| 6,548,205 B2 | 4/2003 | Leung et al. |
| 6,560,131 B1 | 5/2003 | vonBrethorst |
| 6,587,051 B2 | 7/2003 | Takehara et al. |
| 6,590,793 B1 | 7/2003 | Nagao et al. |
| 6,590,794 B1 | 7/2003 | Carter |
| 6,593,520 B2 | 7/2003 | Kondo et al. |
| 6,593,521 B2 | 7/2003 | Kobayashi |
| 6,600,100 B2 | 7/2003 | Ho et al. |
| 6,603,672 B1 | 8/2003 | Deng et al. |
| 6,608,468 B2 | 8/2003 | Nagase |
| 6,611,130 B2 | 8/2003 | Chang |
| 6,611,441 B2 | 8/2003 | Kurokami et al. |
| 6,628,011 B2 | 9/2003 | Droppo et al. |
| 6,633,824 B2 | 10/2003 | Dollar, II |
| 6,636,431 B2 | 10/2003 | Seki et al. |
| 6,650,031 B1 | 11/2003 | Goldack |
| 6,650,560 B2 | 11/2003 | MacDonald et al. |
| 6,653,549 B2 | 11/2003 | Matsushita et al. |
| 6,655,987 B2 | 12/2003 | Higashikozono et al. |
| 6,657,419 B2 | 12/2003 | Renyolds |
| 6,664,762 B2 | 12/2003 | Kutkut |
| 6,672,018 B2 | 1/2004 | Shingleton |
| 6,678,174 B2 | 1/2004 | Suzui et al. |
| 6,690,590 B2 | 2/2004 | Stamenic et al. |
| 6,693,327 B2 | 2/2004 | Priefert et al. |
| 6,693,781 B1 | 2/2004 | Kroker |
| 6,708,507 B1 | 3/2004 | Sem et al. |
| 6,709,291 B1 | 3/2004 | Wallace et al. |
| 6,724,593 B1 | 4/2004 | Smith |
| 6,731,136 B2 | 5/2004 | Knee |
| 6,738,692 B2 | 5/2004 | Schienbein et al. |
| 6,744,643 B2 | 6/2004 | Luo et al. |
| 6,750,391 B2 | 6/2004 | Bower et al. |
| 6,765,315 B2 | 7/2004 | Hammerstrom et al. |
| 6,768,047 B2 | 7/2004 | Chang et al. |
| 6,768,180 B2 | 7/2004 | Salama et al. |
| 6,788,033 B2 | 9/2004 | Vinciarelli |
| 6,788,146 B2 | 9/2004 | Forejt et al. |
| 6,795,318 B2 | 9/2004 | Haas et al. |
| 6,800,964 B2 | 10/2004 | Beck |
| 6,801,442 B2 | 10/2004 | Suzui et al. |
| 6,807,069 B2 | 10/2004 | Nieminen et al. |
| 6,809,942 B2 | 10/2004 | Madenokouji et al. |
| 6,810,339 B2 | 10/2004 | Wills |
| 6,812,396 B2 | 11/2004 | Makita et al. |
| 6,828,503 B2 | 12/2004 | Yoshikawa et al. |
| 6,828,901 B2 | 12/2004 | Birchfield et al. |
| 6,835,491 B2 | 12/2004 | Gartstein et al. |
| 6,837,739 B2 | 1/2005 | Gorringe et al. |
| 6,838,611 B2 | 1/2005 | Kondo et al. |
| 6,838,856 B2 | 1/2005 | Raichle |
| 6,842,354 B1 | 1/2005 | Tallam et al. |
| 6,844,739 B2 | 1/2005 | Kasai et al. |
| 6,850,074 B2 | 2/2005 | Adams et al. |
| 6,856,102 B1 | 2/2005 | Lin et al. |
| 6,882,131 B1 | 4/2005 | Takada et al. |
| 6,888,728 B2 | 5/2005 | Takagi et al. |
| 6,894,911 B2 | 5/2005 | Telefus et al. |
| 6,897,370 B2 | 5/2005 | Kondo et al. |
| 6,914,418 B2 | 7/2005 | Sung |
| 6,919,714 B2 | 7/2005 | Delepaut |
| 6,927,955 B2 | 8/2005 | Suzui et al. |
| 6,933,627 B2 | 8/2005 | Wilhelm |
| 6,933,714 B2 | 8/2005 | Fasshauer et al. |
| 6,936,995 B2 | 8/2005 | Kapsokavathis et al. |
| 6,940,735 B2 | 9/2005 | Deng et al. |
| 6,949,843 B2 | 9/2005 | Dubovsky |
| 6,950,323 B2 | 9/2005 | Achleitner et al. |
| 6,963,147 B2 | 11/2005 | Kurokami et al. |
| 6,966,184 B2 | 11/2005 | Toyomura et al. |
| 6,970,365 B2 | 11/2005 | Turchi |
| 6,980,783 B2 | 12/2005 | Liu et al. |
| 6,984,967 B2 | 1/2006 | Notman |
| 6,984,970 B2 | 1/2006 | Capel |
| 6,985,967 B1 | 1/2006 | Hipp |
| 6,987,444 B2 | 1/2006 | Bub et al. |
| 6,996,741 B1 | 2/2006 | Pittelkow et al. |
| 7,030,597 B2 | 4/2006 | Bruno et al. |
| 7,031,176 B2 | 4/2006 | Kotsopoulos et al. |
| 7,038,430 B2 | 5/2006 | Itabashi et al. |
| 7,039,941 B1 | 5/2006 | Caporizzo et al. |
| 7,042,195 B2 | 5/2006 | Tsunetsugu et al. |
| 7,045,991 B2 | 5/2006 | Nakamura et al. |
| 7,046,531 B2 | 5/2006 | Zocchi et al. |
| 7,053,506 B2 | 5/2006 | Alonso et al. |
| 7,061,211 B2 | 6/2006 | Satoh et al. |
| 7,061,214 B2 | 6/2006 | Mayega et al. |
| 7,064,967 B2 | 6/2006 | Ichinose et al. |
| 7,068,017 B2 | 6/2006 | Willner et al. |
| 7,072,194 B2 | 7/2006 | Nayar et al. |
| 7,078,883 B2 | 7/2006 | Chapman et al. |
| 7,079,406 B2 | 7/2006 | Kurokami et al. |
| 7,087,332 B2 | 8/2006 | Harris |
| 7,088,595 B2 | 8/2006 | Nino |
| 7,089,780 B2 | 8/2006 | Sunshine et al. |
| 7,090,509 B1 | 8/2006 | Gilliland et al. |
| 7,091,707 B2 | 8/2006 | Cutler |
| 7,097,516 B2 | 8/2006 | Werner et al. |
| 7,099,169 B2 | 8/2006 | West et al. |

(56) References Cited

U.S. PATENT DOCUMENTS

| | | | |
|---|---|---|---|
| 7,126,053 B2 | 10/2006 | Kurokami et al. |
| 7,126,294 B2 | 10/2006 | Minami et al. |
| 7,138,786 B2 | 11/2006 | Ishigaki et al. |
| 7,142,997 B1 | 11/2006 | Widner |
| 7,148,669 B2 | 12/2006 | Maksimovic et al. |
| 7,150,938 B2 | 12/2006 | Munshi et al. |
| 7,157,888 B2 | 1/2007 | Chen et al. |
| 7,158,359 B2 | 1/2007 | Bertele et al. |
| 7,158,395 B2 | 1/2007 | Deng et al. |
| 7,161,082 B2 | 1/2007 | Matsushita et al. |
| 7,174,973 B1 | 2/2007 | Lysaght |
| 7,176,667 B2 | 2/2007 | Chen et al. |
| 7,183,667 B2 | 2/2007 | Colby et al. |
| 7,193,872 B2 | 3/2007 | Siri |
| 7,202,653 B2 | 4/2007 | Pai |
| 7,208,674 B2 | 4/2007 | Aylaian |
| 7,218,541 B2 | 5/2007 | Price et al. |
| 7,248,946 B2 | 7/2007 | Bashaw et al. |
| 7,256,566 B2 | 8/2007 | Bhavaraju et al. |
| 7,259,474 B2 | 8/2007 | Blanc |
| 7,262,979 B2 | 8/2007 | Wai et al. |
| 7,276,886 B2 | 10/2007 | Kinder et al. |
| 7,277,304 B2 | 10/2007 | Stancu et al. |
| 7,281,141 B2 | 10/2007 | Elkayam et al. |
| 7,282,814 B2 | 10/2007 | Jacobs |
| 7,282,924 B1 | 10/2007 | Wittner |
| 7,291,036 B1 | 11/2007 | Daily et al. |
| 7,298,113 B2 | 11/2007 | Orikasa |
| RE39,976 E | 1/2008 | Schiff et al. |
| 7,315,052 B2 | 1/2008 | Alter |
| 7,319,313 B2 | 1/2008 | Dickerson et al. |
| 7,324,361 B2 | 1/2008 | Siri |
| 7,336,004 B2 | 2/2008 | Lai |
| 7,336,056 B1 | 2/2008 | Dening |
| 7,339,287 B2 | 3/2008 | Jepsen et al. |
| 7,348,802 B2 | 3/2008 | Kasanyal et al. |
| 7,352,154 B2 | 4/2008 | Cook |
| 7,361,952 B2 | 4/2008 | Miura et al. |
| 7,371,963 B2 | 5/2008 | Suenaga et al. |
| 7,372,712 B2 | 5/2008 | Stancu et al. |
| 7,385,380 B2 | 6/2008 | Ishigaki et al. |
| 7,385,833 B2 | 6/2008 | Keung |
| 7,388,348 B2 | 6/2008 | Mattichak |
| 7,391,190 B1 | 6/2008 | Rajagopalan |
| 7,394,237 B2 | 7/2008 | Chou et al. |
| 7,405,117 B2 | 7/2008 | Zuniga et al. |
| 7,414,870 B2 | 8/2008 | Rottger et al. |
| 7,420,354 B2 | 9/2008 | Cutler |
| 7,420,815 B2 | 9/2008 | Love |
| 7,432,691 B2 | 10/2008 | Cutler |
| 7,435,134 B2 | 10/2008 | Lenox |
| 7,435,897 B2 | 10/2008 | Russell |
| 7,443,052 B2 | 10/2008 | Wendt et al. |
| 7,443,152 B2 | 10/2008 | Utsunomiya |
| 7,450,401 B2 | 11/2008 | Iida |
| 7,456,510 B2 | 11/2008 | Ito et al. |
| 7,456,523 B2 | 11/2008 | Kobayashi |
| 7,463,500 B2 | 12/2008 | West |
| 7,466,566 B2 | 12/2008 | Fukumoto |
| 7,471,014 B2 | 12/2008 | Lum et al. |
| 7,471,524 B1 | 12/2008 | Batarseh et al. |
| 7,479,774 B2 | 1/2009 | Wai et al. |
| 7,482,238 B2 | 1/2009 | Sung |
| 7,485,987 B2 | 2/2009 | Mori et al. |
| 7,495,419 B1 | 2/2009 | Ju |
| 7,504,811 B2 | 3/2009 | Watanabe et al. |
| 7,518,346 B2 | 4/2009 | Prexl et al. |
| 7,538,451 B2 | 5/2009 | Nomoto |
| 7,560,915 B2 | 7/2009 | Ito et al. |
| 7,589,437 B2 | 9/2009 | Henne et al. |
| 7,595,616 B2 | 9/2009 | Prexl et al. |
| 7,596,008 B2 | 9/2009 | Iwata et al. |
| 7,599,200 B2 | 10/2009 | Tomonaga |
| 7,600,349 B2 | 10/2009 | Liebendorfer |
| 7,602,080 B1 | 10/2009 | Hadar et al. |
| 7,602,626 B2 | 10/2009 | Iwata et al. |
| 7,605,498 B2 | 10/2009 | Ledenev et al. |
| 7,612,283 B2 | 11/2009 | Toyomura et al. |
| 7,615,981 B2 | 11/2009 | Wong et al. |
| 7,626,834 B2 | 12/2009 | Chisenga et al. |
| 7,634,667 B2 | 12/2009 | Weaver et al. |
| 7,646,116 B2 | 1/2010 | Batarseh et al. |
| 7,649,434 B2 | 1/2010 | Xu et al. |
| 7,659,701 B1 | 2/2010 | Metsker et al. |
| 7,701,083 B2 | 4/2010 | Savage |
| 7,709,727 B2 | 5/2010 | Roehrig et al. |
| 7,719,140 B2 | 5/2010 | Ledenev et al. |
| 7,723,865 B2 | 5/2010 | Kitanaka |
| 7,733,069 B2 | 6/2010 | Toyomura et al. |
| 7,748,175 B2 | 7/2010 | Liebendorfer |
| 7,759,575 B2 | 7/2010 | Jones et al. |
| 7,763,807 B2 | 7/2010 | Richter |
| 7,772,716 B2 | 8/2010 | Shaver, II et al. |
| 7,777,570 B2 | 8/2010 | Lai |
| 7,780,472 B2 | 8/2010 | Lenox |
| 7,782,031 B2 | 8/2010 | Qiu et al. |
| 7,783,389 B2 | 8/2010 | Yamada et al. |
| 7,787,273 B2 | 8/2010 | Lu et al. |
| 7,804,282 B2 | 9/2010 | Bertele |
| 7,807,919 B2 | 10/2010 | Powell et al. |
| 7,808,125 B1 | 10/2010 | Sachdeva et al. |
| 7,812,592 B2 | 10/2010 | Prior et al. |
| 7,812,701 B2 | 10/2010 | Lee et al. |
| 7,821,225 B2 | 10/2010 | Chou et al. |
| 7,824,189 B1 | 11/2010 | Lauermann et al. |
| 7,839,022 B2 | 11/2010 | Wolfs |
| 7,843,085 B2 | 11/2010 | Ledenev et al. |
| 7,864,497 B2 | 1/2011 | Quardt et al. |
| 7,868,599 B2 | 1/2011 | Rahman et al. |
| 7,880,334 B2 | 2/2011 | Evans et al. |
| 7,883,808 B2 | 2/2011 | Norimatsu et al. |
| 7,884,278 B2 | 2/2011 | Powell et al. |
| 7,893,346 B2 | 2/2011 | Nachamkin et al. |
| 7,898,112 B2 | 3/2011 | Powell et al. |
| 7,900,361 B2 | 3/2011 | Adest et al. |
| 7,906,007 B2 | 3/2011 | Gibson et al. |
| 7,906,870 B2 | 3/2011 | Ohm |
| 7,919,952 B1 | 4/2011 | Fahrenbruch |
| 7,919,953 B2 | 4/2011 | Porter et al. |
| 7,925,552 B2 | 4/2011 | Tarbell et al. |
| 7,944,191 B2 | 5/2011 | Xu |
| 7,945,413 B2 | 5/2011 | Krein |
| 7,948,221 B2 | 5/2011 | Watanabe et al. |
| 7,952,897 B2 | 5/2011 | Nocentini et al. |
| 7,960,650 B2 | 6/2011 | Richter et al. |
| 7,960,950 B2 | 6/2011 | Glovinsky |
| 7,962,249 B1 | 6/2011 | Zhang et al. |
| 7,969,043 B2 | 6/2011 | Caraghiorghiopol et al. |
| 7,969,133 B2 | 6/2011 | Zhang et al. |
| 7,977,810 B2 | 7/2011 | Choi et al. |
| 8,003,885 B2 | 8/2011 | Richter et al. |
| 8,004,113 B2 | 8/2011 | Sander et al. |
| 8,004,116 B2 | 8/2011 | Ledenev et al. |
| 8,004,117 B2 | 8/2011 | Adest et al. |
| 8,004,237 B2 | 8/2011 | Manor et al. |
| 8,004,866 B2 | 8/2011 | Bucella et al. |
| 8,013,472 B2 | 9/2011 | Adest et al. |
| 8,018,748 B2 | 9/2011 | Leonard |
| 8,035,249 B2 | 10/2011 | Shaver, II et al. |
| 8,039,730 B2 | 10/2011 | Hadar et al. |
| 8,049,363 B2 | 11/2011 | McLean et al. |
| 8,050,804 B2 | 11/2011 | Kernahan |
| 8,058,747 B2 | 11/2011 | Avrutsky et al. |
| 8,058,752 B2 | 11/2011 | Erickson, Jr. et al. |
| 8,067,855 B2 | 11/2011 | Mumtaz et al. |
| 8,077,437 B2 | 12/2011 | Mumtaz et al. |
| 8,080,986 B2 | 12/2011 | Lai et al. |
| 8,089,780 B2 | 1/2012 | Mochikawa et al. |
| 8,089,785 B2 | 1/2012 | Rodriguez |
| 8,090,548 B2 | 1/2012 | Abdennadher et al. |
| 8,093,756 B2 | 1/2012 | Porter et al. |
| 8,093,757 B2 | 1/2012 | Wolfs |
| 8,097,818 B2 | 1/2012 | Gerull et al. |
| 8,098,055 B2 | 1/2012 | Avrutsky et al. |

(56) References Cited

U.S. PATENT DOCUMENTS

| | | | |
|---|---|---|---|
| 8,102,074 B2 | 1/2012 | Hadar et al. |
| 8,102,144 B2 | 1/2012 | Capp et al. |
| 8,111,052 B2 | 2/2012 | Glovinsky |
| 8,116,103 B2 | 2/2012 | Zacharias et al. |
| 8,138,631 B2 | 3/2012 | Allen et al. |
| 8,138,914 B2 | 3/2012 | Wong et al. |
| 8,139,335 B2 | 3/2012 | Quardt et al. |
| 8,139,382 B2 | 3/2012 | Zhang et al. |
| 8,148,849 B2 | 4/2012 | Zanarini et al. |
| 8,158,877 B2 | 4/2012 | Klein et al. |
| 8,169,252 B2 | 5/2012 | Fahrenbruch et al. |
| 8,179,147 B2 | 5/2012 | Dargatz et al. |
| 8,184,460 B2 | 5/2012 | O'Brien et al. |
| 8,188,610 B2 | 5/2012 | Scholte-Wassink |
| 8,204,709 B2 | 6/2012 | Presher, Jr. et al. |
| 8,212,408 B2 | 7/2012 | Fishman |
| 8,212,409 B2 | 7/2012 | Bettenwort et al. |
| 8,232,790 B2 | 7/2012 | Leong et al. |
| 8,233,301 B1 | 7/2012 | Guo |
| 8,248,804 B2 | 8/2012 | Han et al. |
| 8,271,599 B2 | 9/2012 | Eizips et al. |
| 8,274,172 B2 | 9/2012 | Hadar et al. |
| 8,279,644 B2 | 10/2012 | Zhang et al. |
| 8,284,574 B2 | 10/2012 | Chapman et al. |
| 8,289,183 B1 | 10/2012 | Foss |
| 8,289,742 B2 | 10/2012 | Adest et al. |
| 8,294,451 B2 | 10/2012 | Hasenfus |
| 8,299,757 B2 | 10/2012 | Yamauchi et al. |
| 8,299,773 B2 | 10/2012 | Jang et al. |
| 8,304,932 B2 | 11/2012 | Ledenev et al. |
| 8,310,101 B2 | 11/2012 | Amaratunga et al. |
| 8,310,102 B2 | 11/2012 | Raju |
| 8,314,375 B2 | 11/2012 | Arditi et al. |
| 8,319,471 B2 | 11/2012 | Adest et al. |
| 8,324,921 B2 | 12/2012 | Adest et al. |
| 8,325,059 B2 | 12/2012 | Rozenboim |
| 8,344,548 B2 | 1/2013 | Stern |
| 8,355,563 B2 | 1/2013 | Kasahara et al. |
| 8,369,113 B2 | 2/2013 | Rodriguez |
| 8,378,656 B2 | 2/2013 | de Rooij et al. |
| 8,379,418 B2 | 2/2013 | Falk |
| 8,391,031 B2 | 3/2013 | Garrity |
| 8,391,032 B2 | 3/2013 | Garrity et al. |
| 8,395,366 B2 | 3/2013 | Uno |
| 8,405,248 B2 | 3/2013 | Mumtaz et al. |
| 8,405,349 B2 | 3/2013 | Kikinis et al. |
| 8,405,367 B2 | 3/2013 | Chisenga et al. |
| 8,410,359 B2 | 4/2013 | Richter |
| 8,410,889 B2 | 4/2013 | Garrity et al. |
| 8,410,950 B2 | 4/2013 | Takehara et al. |
| 8,415,552 B2 | 4/2013 | Hadar et al. |
| 8,415,937 B2 | 4/2013 | Hester |
| 8,427,009 B2 | 4/2013 | Shaver, II et al. |
| 8,436,592 B2 | 5/2013 | Saitoh |
| 8,461,809 B2 | 6/2013 | Rodriguez |
| 8,466,789 B2 | 6/2013 | Muhlberger et al. |
| 8,472,220 B2 | 6/2013 | Garrity et al. |
| 8,473,250 B2 | 6/2013 | Adest et al. |
| 8,509,032 B2 | 8/2013 | Rakib |
| 8,526,205 B2 | 9/2013 | Garrity |
| 8,531,055 B2 | 9/2013 | Adest et al. |
| 8,542,512 B2 | 9/2013 | Garrity |
| 8,570,017 B2 | 10/2013 | Perichon et al. |
| 8,581,441 B2 | 11/2013 | Rotzoll et al. |
| 8,587,151 B2 | 11/2013 | Adest et al. |
| 8,618,692 B2 | 12/2013 | Adest et al. |
| 8,624,443 B2 | 1/2014 | Mumtaz |
| 8,653,689 B2 | 2/2014 | Rozenboim |
| 8,669,675 B2 | 3/2014 | Capp et al. |
| 8,670,255 B2 | 3/2014 | Gong et al. |
| 8,674,548 B2 | 3/2014 | Mumtaz |
| 8,674,668 B2 | 3/2014 | Chisenga et al. |
| 8,686,333 B2 | 4/2014 | Arditi et al. |
| 8,710,351 B2 | 4/2014 | Robbins |
| 8,751,053 B2 | 6/2014 | Hadar et al. |
| 8,773,236 B2 | 7/2014 | Makhota et al. |
| 8,791,598 B2 | 7/2014 | Jain |
| 8,796,884 B2 | 8/2014 | Naiknaware et al. |
| 8,809,699 B2 | 8/2014 | Funk |
| 8,811,047 B2 | 8/2014 | Rodriguez |
| 8,816,535 B2 | 8/2014 | Adest et al. |
| 8,823,212 B2 | 9/2014 | Garrity et al. |
| 8,823,218 B2 | 9/2014 | Hadar et al. |
| 8,823,342 B2 | 9/2014 | Williams |
| 8,835,748 B2 | 9/2014 | Frolov et al. |
| 8,841,916 B2 | 9/2014 | Avrutsky |
| 8,842,397 B2 | 9/2014 | Fahrenbruch et al. |
| 8,853,886 B2 | 10/2014 | Avrutsky et al. |
| 8,854,193 B2 | 10/2014 | Makhota et al. |
| 8,859,884 B2 | 10/2014 | Dunton et al. |
| 8,860,241 B2 | 10/2014 | Hadar et al. |
| 8,860,246 B2 | 10/2014 | Hadar et al. |
| 8,872,439 B2 | 10/2014 | Cohen |
| 8,878,563 B2 | 11/2014 | Robbins |
| 8,917,156 B2 | 12/2014 | Garrity et al. |
| 8,922,061 B2 | 12/2014 | Arditi |
| 8,933,321 B2 | 1/2015 | Hadar et al. |
| 8,934,269 B2 | 1/2015 | Garrity |
| 8,947,194 B2 | 2/2015 | Sella et al. |
| 8,963,375 B2 | 2/2015 | DeGraaff |
| 8,963,378 B1 * | 2/2015 | Fornage ............... H01R 13/639 |
| | | 307/147 |
| 8,963,501 B2 | 2/2015 | Shigemizu et al. |
| 8,963,518 B2 | 2/2015 | Wolfs |
| 8,972,765 B1 | 3/2015 | Krolak et al. |
| 9,010,645 B2 | 4/2015 | Arnouse |
| 9,041,339 B2 | 5/2015 | Adest et al. |
| 9,088,178 B2 | 7/2015 | Adest et al. |
| 9,130,401 B2 | 9/2015 | Adest et al. |
| 9,142,965 B2 | 9/2015 | Grana |
| 9,257,848 B2 | 2/2016 | Coccia et al. |
| 9,291,696 B2 | 3/2016 | Adest et al. |
| 9,362,743 B2 | 6/2016 | Gazit et al. |
| 9,397,497 B2 | 7/2016 | Ledenev |
| 9,401,664 B2 | 7/2016 | Perreault et al. |
| 9,407,161 B2 | 8/2016 | Adest et al. |
| 9,466,737 B2 | 10/2016 | Ledenev |
| 9,577,454 B2 | 2/2017 | Seymour et al. |
| 9,647,442 B2 | 5/2017 | Yoscovich et al. |
| 9,660,527 B2 | 5/2017 | Glovinski |
| 9,673,630 B2 | 6/2017 | Ledenev et al. |
| 9,819,178 B2 | 11/2017 | Gazit et al. |
| 9,831,916 B2 | 11/2017 | Behrends |
| 9,843,193 B2 | 12/2017 | Getsla |
| 9,853,490 B2 | 12/2017 | Adest et al. |
| 9,865,411 B2 | 1/2018 | Friebe et al. |
| 9,869,701 B2 | 1/2018 | Sella et al. |
| 9,923,516 B2 | 3/2018 | Har-Shai et al. |
| 9,991,717 B1 | 6/2018 | Rowe et al. |
| 9,995,796 B1 | 6/2018 | Johnson |
| 10,032,939 B2 | 7/2018 | Ledenev et al. |
| 10,256,770 B2 | 4/2019 | Hadar et al. |
| 10,432,139 B2 | 10/2019 | Chaintreuil et al. |
| 10,457,159 B1 | 10/2019 | Castelaz et al. |
| 10,666,045 B2 | 5/2020 | Gemin et al. |
| 10,673,253 B2 | 6/2020 | Adest et al. |
| 10,931,119 B2 | 2/2021 | Har-Shai et al. |
| 10,969,412 B2 | 4/2021 | Sella et al. |
| 11,018,623 B2 | 5/2021 | Loewenstern et al. |
| 11,205,946 B2 | 12/2021 | Yoscovich et al. |
| 11,276,786 B2 | 3/2022 | Hopf et al. |
| 11,476,799 B2 | 10/2022 | Sella et al. |
| 11,682,918 B2 | 6/2023 | Adest et al. |
| 11,728,724 B2 | 8/2023 | Braginsky et al. |
| 2001/0000957 A1 | 5/2001 | Birchfield et al. |
| 2001/0011881 A1 | 8/2001 | Emori et al. |
| 2001/0013767 A1 | 8/2001 | Takemoto |
| 2001/0023703 A1 | 9/2001 | Kondo et al. |
| 2001/0032664 A1 | 10/2001 | Takehara et al. |
| 2001/0034982 A1 | 11/2001 | Nagao et al. |
| 2001/0035180 A1 | 11/2001 | Kimura et al. |
| 2001/0048605 A1 | 12/2001 | Kurokami et al. |
| 2001/0050102 A1 | 12/2001 | Matsumi et al. |
| 2001/0054881 A1 | 12/2001 | Watanabe |

(56) References Cited

U.S. PATENT DOCUMENTS

| | | |
|---|---|---|
| 2002/0002040 A1 | 1/2002 | Kline et al. |
| 2002/0014262 A1 | 2/2002 | Matsushita et al. |
| 2002/0017900 A1 | 2/2002 | Takeda et al. |
| 2002/0034083 A1 | 3/2002 | Ayyanar et al. |
| 2002/0038667 A1 | 4/2002 | Kondo et al. |
| 2002/0041505 A1 | 4/2002 | Suzui et al. |
| 2002/0044473 A1 | 4/2002 | Toyomura et al. |
| 2002/0047309 A1 | 4/2002 | Droppo et al. |
| 2002/0047693 A1 | 4/2002 | Chang |
| 2002/0056089 A1 | 5/2002 | Houston |
| 2002/0059035 A1 | 5/2002 | Yagi et al. |
| 2002/0063552 A1 | 5/2002 | Arakawa |
| 2002/0063625 A1 | 5/2002 | Takehara et al. |
| 2002/0078991 A1 | 6/2002 | Nagao et al. |
| 2002/0080027 A1 | 6/2002 | Conley |
| 2002/0085397 A1 | 7/2002 | Suzui et al. |
| 2002/0105765 A1 | 8/2002 | Kondo et al. |
| 2002/0113689 A1 | 8/2002 | Gehlot et al. |
| 2002/0118559 A1 | 8/2002 | Kurokami et al. |
| 2002/0127980 A1 | 9/2002 | Amanullah et al. |
| 2002/0134567 A1 | 9/2002 | Rasmussen et al. |
| 2002/0148497 A1 | 10/2002 | Sasaoka et al. |
| 2002/0149950 A1 | 10/2002 | Takebayashi |
| 2002/0162585 A1 | 11/2002 | Sugawara et al. |
| 2002/0165458 A1 | 11/2002 | Carter et al. |
| 2002/0177401 A1 | 11/2002 | Judd et al. |
| 2002/0179140 A1 | 12/2002 | Toyomura |
| 2002/0180408 A1 | 12/2002 | McDaniel et al. |
| 2002/0190696 A1 | 12/2002 | Darshan |
| 2003/0001709 A1 | 1/2003 | Visser |
| 2003/0002303 A1 | 1/2003 | Riggio et al. |
| 2003/0025594 A1 | 2/2003 | Akiyama et al. |
| 2003/0038615 A1 | 2/2003 | Elbanhawy |
| 2003/0043597 A1 | 3/2003 | Betts-LaCroix |
| 2003/0047207 A1 | 3/2003 | Aylaian |
| 2003/0058593 A1 | 3/2003 | Bertele et al. |
| 2003/0058662 A1 | 3/2003 | Baudelot et al. |
| 2003/0062078 A1 | 4/2003 | Mimura |
| 2003/0066076 A1 | 4/2003 | Minahan |
| 2003/0066555 A1 | 4/2003 | Hui et al. |
| 2003/0075211 A1 | 4/2003 | Makita et al. |
| 2003/0080741 A1 | 5/2003 | LeRow et al. |
| 2003/0085621 A1 | 5/2003 | Potega |
| 2003/0090233 A1 | 5/2003 | Browe |
| 2003/0090246 A1 | 5/2003 | Shenai et al. |
| 2003/0094931 A1 | 5/2003 | Renyolds |
| 2003/0098056 A1 | 5/2003 | Fronek et al. |
| 2003/0107352 A1 | 6/2003 | Downer et al. |
| 2003/0111103 A1 | 6/2003 | Bower et al. |
| 2003/0116154 A1 | 6/2003 | Butler et al. |
| 2003/0121514 A1 | 7/2003 | Davenport et al. |
| 2003/0127126 A1 | 7/2003 | Yang |
| 2003/0140960 A1 | 7/2003 | Baum et al. |
| 2003/0156439 A1 | 8/2003 | Ohmichi et al. |
| 2003/0164695 A1 | 9/2003 | Fasshauer et al. |
| 2003/0185026 A1 | 10/2003 | Matsuda et al. |
| 2003/0193821 A1 | 10/2003 | Krieger et al. |
| 2003/0201674 A1 | 10/2003 | Droppo et al. |
| 2003/0206424 A1 | 11/2003 | Jungreis et al. |
| 2003/0214274 A1 | 11/2003 | Lethellier |
| 2003/0223257 A1 | 12/2003 | Onoe |
| 2004/0004402 A1 | 1/2004 | Kippley |
| 2004/0027101 A1 | 2/2004 | Vinciarelli et al. |
| 2004/0027112 A1 | 2/2004 | Kondo et al. |
| 2004/0041548 A1 | 3/2004 | Perry |
| 2004/0056642 A1 | 3/2004 | Nebrigic et al. |
| 2004/0056768 A1 | 3/2004 | Matsushita et al. |
| 2004/0061527 A1 | 4/2004 | Knee |
| 2004/0076028 A1 | 4/2004 | Achleitner et al. |
| 2004/0117676 A1 | 6/2004 | Kobayashi et al. |
| 2004/0118446 A1 | 6/2004 | Toyomura |
| 2004/0123894 A1 | 7/2004 | Erban |
| 2004/0124816 A1 | 7/2004 | DeLepaut |
| 2004/0125618 A1 | 7/2004 | De Rooij et al. |
| 2004/0140719 A1 | 7/2004 | Vulih et al. |
| 2004/0141345 A1 | 7/2004 | Cheng et al. |
| 2004/0144043 A1 | 7/2004 | Stevenson et al. |
| 2004/0150410 A1 | 8/2004 | Schoepf et al. |
| 2004/0164718 A1 | 8/2004 | McDaniel et al. |
| 2004/0165408 A1 | 8/2004 | West et al. |
| 2004/0167676 A1 | 8/2004 | Mizumaki |
| 2004/0169499 A1 | 9/2004 | Huang et al. |
| 2004/0170038 A1 | 9/2004 | Ichinose et al. |
| 2004/0189090 A1 | 9/2004 | Yanagida et al. |
| 2004/0189432 A1 | 9/2004 | Yan et al. |
| 2004/0201279 A1 | 10/2004 | Templeton |
| 2004/0201933 A1 | 10/2004 | Blanc |
| 2004/0207366 A1 | 10/2004 | Sung |
| 2004/0211456 A1 | 10/2004 | Brown et al. |
| 2004/0211458 A1 | 10/2004 | Gui et al. |
| 2004/0211459 A1 | 10/2004 | Suenaga et al. |
| 2004/0213169 A1 | 10/2004 | Allard et al. |
| 2004/0223351 A1 | 11/2004 | Kurokami et al. |
| 2004/0230343 A1 | 11/2004 | Zalesski |
| 2004/0233685 A1 | 11/2004 | Matsuo et al. |
| 2004/0246226 A1 | 12/2004 | Moon |
| 2004/0255999 A1 | 12/2004 | Matsushita et al. |
| 2004/0258141 A1 | 12/2004 | Tustison et al. |
| 2004/0262998 A1 | 12/2004 | Kunow et al. |
| 2004/0263119 A1 | 12/2004 | Meyer et al. |
| 2004/0263183 A1 | 12/2004 | Naidu et al. |
| 2004/0264225 A1 | 12/2004 | Bhavaraju et al. |
| 2005/0002214 A1 | 1/2005 | Deng et al. |
| 2005/0005785 A1 | 1/2005 | Poss et al. |
| 2005/0006958 A1 | 1/2005 | Dubovsky |
| 2005/0017697 A1 | 1/2005 | Capel |
| 2005/0017701 A1 | 1/2005 | Hsu |
| 2005/0030772 A1 | 2/2005 | Phadke |
| 2005/0040800 A1 | 2/2005 | Sutardja |
| 2005/0041442 A1 | 2/2005 | Balakrishnan |
| 2005/0057214 A1 | 3/2005 | Matan |
| 2005/0057215 A1 | 3/2005 | Matan |
| 2005/0068012 A1 | 3/2005 | Cutler |
| 2005/0068820 A1 | 3/2005 | Radosevich et al. |
| 2005/0077879 A1 | 4/2005 | Near |
| 2005/0099138 A1 | 5/2005 | Wilhelm |
| 2005/0103376 A1 | 5/2005 | Matsushita et al. |
| 2005/0105224 A1 | 5/2005 | Nishi |
| 2005/0105306 A1 | 5/2005 | Deng et al. |
| 2005/0109386 A1 | 5/2005 | Marshall |
| 2005/0110454 A1 | 5/2005 | Tsai et al. |
| 2005/0121067 A1 | 6/2005 | Toyomura et al. |
| 2005/0122747 A1 | 6/2005 | Gaksch |
| 2005/0135031 A1 | 6/2005 | Colby et al. |
| 2005/0139258 A1 | 6/2005 | Liu et al. |
| 2005/0140335 A1 | 6/2005 | Lee et al. |
| 2005/0162018 A1 | 7/2005 | Realmuto et al. |
| 2005/0163063 A1 | 7/2005 | Kuchler et al. |
| 2005/0172995 A1 | 8/2005 | Rohrig et al. |
| 2005/0179420 A1 | 8/2005 | Satoh et al. |
| 2005/0191528 A1 | 9/2005 | Cortes et al. |
| 2005/0194937 A1 | 9/2005 | Jacobs |
| 2005/0201397 A1 | 9/2005 | Petite |
| 2005/0213272 A1 | 9/2005 | Kobayashi |
| 2005/0218876 A1 | 10/2005 | Nino |
| 2005/0225090 A1 | 10/2005 | Wobben |
| 2005/0226017 A1 | 10/2005 | Kotsopoulos et al. |
| 2005/0231183 A1 | 10/2005 | Li et al. |
| 2005/0242795 A1 | 11/2005 | Al-Kuran et al. |
| 2005/0248428 A1 | 11/2005 | Coleman et al. |
| 2005/0252545 A1 | 11/2005 | Nowlan et al. |
| 2005/0257827 A1 | 11/2005 | Gaudiana et al. |
| 2005/0269988 A1 | 12/2005 | Thrap |
| 2005/0275386 A1 | 12/2005 | Jepsen et al. |
| 2005/0275527 A1 | 12/2005 | Kates |
| 2005/0275979 A1 | 12/2005 | Xu |
| 2005/0281064 A1 | 12/2005 | Olsen et al. |
| 2005/0286510 A1 | 12/2005 | Nakajima et al. |
| 2005/0287402 A1 | 12/2005 | Maly et al. |
| 2006/0001406 A1 | 1/2006 | Matan |
| 2006/0017327 A1 | 1/2006 | Siri et al. |
| 2006/0034106 A1 | 2/2006 | Johnson |
| 2006/0038692 A1 | 2/2006 | Schnetker |
| 2006/0043792 A1 | 3/2006 | Hjort et al. |

(56)                References Cited

U.S. PATENT DOCUMENTS

| 2006/0043942 | A1 | 3/2006 | Cohen |
|---|---|---|---|
| 2006/0053447 | A1 | 3/2006 | Krzyzanowski et al. |
| 2006/0055384 | A1 | 3/2006 | Jordan et al. |
| 2006/0066349 | A1 | 3/2006 | Murakami |
| 2006/0068239 | A1 | 3/2006 | Norimatsu et al. |
| 2006/0077046 | A1 | 4/2006 | Endo |
| 2006/0085167 | A1 | 4/2006 | Warfield et al. |
| 2006/0091958 | A1 | 5/2006 | Bhatti et al. |
| 2006/0103360 | A9 | 5/2006 | Cutler |
| 2006/0108979 | A1 | 5/2006 | Daniel et al. |
| 2006/0109009 | A1 | 5/2006 | Banke et al. |
| 2006/0113843 | A1 | 6/2006 | Beveridge |
| 2006/0113979 | A1 | 6/2006 | Ishigaki et al. |
| 2006/0116968 | A1 | 6/2006 | Arisawa |
| 2006/0118162 | A1 | 6/2006 | Saelzer et al. |
| 2006/0125449 | A1 | 6/2006 | Unger |
| 2006/0132102 | A1 | 6/2006 | Harvey |
| 2006/0149396 | A1 | 7/2006 | Templeton |
| 2006/0152085 | A1 | 7/2006 | Flett et al. |
| 2006/0162772 | A1 | 7/2006 | Presher et al. |
| 2006/0163946 | A1 | 7/2006 | Henne et al. |
| 2006/0164065 | A1 | 7/2006 | Hoouk et al. |
| 2006/0167762 | A1 | 7/2006 | Hahn-Carlson |
| 2006/0171182 | A1 | 8/2006 | Siri et al. |
| 2006/0174939 | A1 | 8/2006 | Matan |
| 2006/0176029 | A1 | 8/2006 | McGinty et al. |
| 2006/0176031 | A1 | 8/2006 | Forman et al. |
| 2006/0176036 | A1 | 8/2006 | Flatness et al. |
| 2006/0176716 | A1 | 8/2006 | Balakrishnan et al. |
| 2006/0185727 | A1 | 8/2006 | Matan |
| 2006/0192540 | A1 | 8/2006 | Balakrishnan et al. |
| 2006/0208660 | A1 | 9/2006 | Shinmura et al. |
| 2006/0222912 | A1 | 10/2006 | Smith |
| 2006/0222916 | A1 | 10/2006 | Norimatsu et al. |
| 2006/0225781 | A1 | 10/2006 | Locher |
| 2006/0227577 | A1 | 10/2006 | Horiuchi et al. |
| 2006/0227578 | A1 | 10/2006 | Datta et al. |
| 2006/0231132 | A1 | 10/2006 | Neussner |
| 2006/0232220 | A1 | 10/2006 | Melis |
| 2006/0235717 | A1 | 10/2006 | Sharma et al. |
| 2006/0237058 | A1 | 10/2006 | McClintock et al. |
| 2006/0238750 | A1 | 10/2006 | Shimotomai |
| 2006/0243318 | A1 | 11/2006 | Feldmeier et al. |
| 2006/0261751 | A1 | 11/2006 | Okabe et al. |
| 2006/0266408 | A1 | 11/2006 | Horne et al. |
| 2006/0267515 | A1 | 11/2006 | Burke et al. |
| 2006/0290317 | A1 | 12/2006 | McNulty et al. |
| 2007/0001653 | A1 | 1/2007 | Xu |
| 2007/0013349 | A1 | 1/2007 | Bassett |
| 2007/0019613 | A1 | 1/2007 | Frezzolini |
| 2007/0024257 | A1 | 2/2007 | Boldo |
| 2007/0027644 | A1 | 2/2007 | Bettenwort et al. |
| 2007/0029468 | A1 | 2/2007 | Sinton et al. |
| 2007/0029636 | A1 | 2/2007 | Kanemaru et al. |
| 2007/0030068 | A1 | 2/2007 | Motonobu et al. |
| 2007/0035975 | A1 | 2/2007 | Dickerson et al. |
| 2007/0040540 | A1 | 2/2007 | Cutler |
| 2007/0044837 | A1 | 3/2007 | Simburger et al. |
| 2007/0075689 | A1 | 4/2007 | Kinder et al. |
| 2007/0075711 | A1 | 4/2007 | Blanc et al. |
| 2007/0081364 | A1 | 4/2007 | Andreycak |
| 2007/0085523 | A1 | 4/2007 | Scoones et al. |
| 2007/0089778 | A1 | 4/2007 | Horne et al. |
| 2007/0103108 | A1 | 5/2007 | Capp et al. |
| 2007/0103297 | A1 | 5/2007 | Armstrong et al. |
| 2007/0107767 | A1 | 5/2007 | Hayden et al. |
| 2007/0115635 | A1 | 5/2007 | Low et al. |
| 2007/0119718 | A1 | 5/2007 | Gibson et al. |
| 2007/0121648 | A1 | 5/2007 | Hahn |
| 2007/0133241 | A1 | 6/2007 | Mumtaz et al. |
| 2007/0133421 | A1 | 6/2007 | Young |
| 2007/0147075 | A1 | 6/2007 | Bang |
| 2007/0158185 | A1 | 7/2007 | Andelman et al. |
| 2007/0159866 | A1 | 7/2007 | Siri |
| 2007/0164612 | A1 | 7/2007 | Wendt et al. |
| 2007/0164750 | A1 | 7/2007 | Chen et al. |
| 2007/0165347 | A1 | 7/2007 | Wendt et al. |
| 2007/0205778 | A1 | 9/2007 | Fabbro et al. |
| 2007/0209656 | A1 | 9/2007 | Lee |
| 2007/0211888 | A1 | 9/2007 | Corcoran et al. |
| 2007/0217178 | A1 | 9/2007 | Johnson et al. |
| 2007/0223165 | A1 | 9/2007 | Itri et al. |
| 2007/0227574 | A1 | 10/2007 | Cart |
| 2007/0235071 | A1 | 10/2007 | Work et al. |
| 2007/0236187 | A1 | 10/2007 | Wai et al. |
| 2007/0241720 | A1 | 10/2007 | Sakamoto et al. |
| 2007/0246546 | A1 | 10/2007 | Yoshida |
| 2007/0247135 | A1 | 10/2007 | Koga |
| 2007/0247877 | A1 | 10/2007 | Kwon et al. |
| 2007/0262802 | A1 | 11/2007 | Huard et al. |
| 2007/0271006 | A1 | 11/2007 | Golden et al. |
| 2007/0273240 | A1 | 11/2007 | Steele et al. |
| 2007/0273339 | A1 | 11/2007 | Haines |
| 2007/0273342 | A1 | 11/2007 | Kataoka et al. |
| 2007/0273351 | A1 | 11/2007 | Matan |
| 2007/0284451 | A1 | 12/2007 | Uramoto |
| 2007/0290636 | A1 | 12/2007 | Beck et al. |
| 2007/0290656 | A1 | 12/2007 | Lee Tai Keung |
| 2008/0021707 | A1 | 1/2008 | Bou-Ghazale et al. |
| 2008/0023061 | A1 | 1/2008 | Clemens et al. |
| 2008/0024098 | A1 | 1/2008 | Hojo |
| 2008/0030198 | A1 | 2/2008 | Kawata et al. |
| 2008/0036440 | A1 | 2/2008 | Garmer |
| 2008/0042709 | A1 | 2/2008 | Chen et al. |
| 2008/0055941 | A1 | 3/2008 | Victor et al. |
| 2008/0072091 | A1 | 3/2008 | Hanson et al. |
| 2008/0080177 | A1 | 4/2008 | Chang |
| 2008/0088184 | A1 | 4/2008 | Tung et al. |
| 2008/0088829 | A1 | 4/2008 | Fuyuki |
| 2008/0089277 | A1 | 4/2008 | Alexander et al. |
| 2008/0097655 | A1 | 4/2008 | Hadar et al. |
| 2008/0106250 | A1 | 5/2008 | Prior et al. |
| 2008/0111529 | A1 | 5/2008 | Shah et al. |
| 2008/0115823 | A1 | 5/2008 | Kinsey |
| 2008/0121272 | A1 | 5/2008 | Besser et al. |
| 2008/0122449 | A1 | 5/2008 | Besser et al. |
| 2008/0122518 | A1 | 5/2008 | Besser et al. |
| 2008/0136367 | A1 | 6/2008 | Adest et al. |
| 2008/0142071 | A1 | 6/2008 | Dorn et al. |
| 2008/0143188 | A1 | 6/2008 | Adest et al. |
| 2008/0143462 | A1 | 6/2008 | Belisle et al. |
| 2008/0144294 | A1 | 6/2008 | Adest et al. |
| 2008/0147335 | A1 | 6/2008 | Adest et al. |
| 2008/0149167 | A1 | 6/2008 | Liu |
| 2008/0150366 | A1 | 6/2008 | Adest et al. |
| 2008/0150484 | A1 | 6/2008 | Kimball et al. |
| 2008/0156551 | A1 | 7/2008 | Kawahara et al. |
| 2008/0164766 | A1 | 7/2008 | Adest et al. |
| 2008/0179949 | A1 | 7/2008 | Besser et al. |
| 2008/0186004 | A1 | 8/2008 | Williams |
| 2008/0191560 | A1 | 8/2008 | Besser et al. |
| 2008/0191675 | A1 | 8/2008 | Besser et al. |
| 2008/0192510 | A1 | 8/2008 | Falk |
| 2008/0192519 | A1 | 8/2008 | Iwata et al. |
| 2008/0198523 | A1 | 8/2008 | Schmidt et al. |
| 2008/0205096 | A1 | 8/2008 | Lai et al. |
| 2008/0218152 | A1 | 9/2008 | Bo |
| 2008/0224652 | A1 | 9/2008 | Zhu et al. |
| 2008/0236647 | A1 | 10/2008 | Gibson et al. |
| 2008/0236648 | A1 | 10/2008 | Klein et al. |
| 2008/0238195 | A1 | 10/2008 | Shaver et al. |
| 2008/0238372 | A1 | 10/2008 | Cintra et al. |
| 2008/0246460 | A1 | 10/2008 | Smith |
| 2008/0246463 | A1 | 10/2008 | Sinton et al. |
| 2008/0252273 | A1 | 10/2008 | Woo et al. |
| 2008/0264470 | A1 | 10/2008 | Masuda et al. |
| 2008/0266913 | A1 | 10/2008 | Brotto et al. |
| 2008/0266919 | A1 | 10/2008 | Mallwitz |
| 2008/0283118 | A1* | 11/2008 | Rotzoll ................... H02S 40/32 |
| | | | 136/251 |
| 2008/0291707 | A1 | 11/2008 | Fang |
| 2008/0294472 | A1 | 11/2008 | Yamada |
| 2008/0297963 | A1 | 12/2008 | Lee et al. |
| 2008/0298608 | A1 | 12/2008 | Wilcox |

(56) References Cited

U.S. PATENT DOCUMENTS

| | | |
|---|---|---|
| 2008/0303503 A1 | 12/2008 | Wolfs |
| 2008/0304296 A1 | 12/2008 | NadimpalliRaju et al. |
| 2008/0304298 A1 | 12/2008 | Toba et al. |
| 2009/0010035 A1 | 1/2009 | Williams |
| 2009/0012917 A1 | 1/2009 | Thompson et al. |
| 2009/0014050 A1 | 1/2009 | Haaf |
| 2009/0014057 A1 | 1/2009 | Croft et al. |
| 2009/0014058 A1 | 1/2009 | Croft et al. |
| 2009/0015071 A1 | 1/2009 | Iwata et al. |
| 2009/0020151 A1 | 1/2009 | Fornage |
| 2009/0021877 A1 | 1/2009 | Fornage et al. |
| 2009/0039833 A1 | 2/2009 | Kitagawa |
| 2009/0039852 A1 | 2/2009 | Fishelov et al. |
| 2009/0064252 A1 | 3/2009 | Howarter et al. |
| 2009/0066357 A1 | 3/2009 | Fornage |
| 2009/0066382 A1 | 3/2009 | Yousefzadeh et al. |
| 2009/0066399 A1 | 3/2009 | Chen et al. |
| 2009/0069950 A1 | 3/2009 | Kurokami et al. |
| 2009/0073726 A1 | 3/2009 | Babcock |
| 2009/0078300 A1 | 3/2009 | Ang et al. |
| 2009/0080226 A1 | 3/2009 | Fornage |
| 2009/0084570 A1 | 4/2009 | Gherardini et al. |
| 2009/0097172 A1 | 4/2009 | Bremicker et al. |
| 2009/0097283 A1 | 4/2009 | Krein et al. |
| 2009/0101191 A1 | 4/2009 | Beck et al. |
| 2009/0102440 A1 | 4/2009 | Coles |
| 2009/0114263 A1 | 5/2009 | Powell et al. |
| 2009/0120485 A1 | 5/2009 | Kikinis |
| 2009/0121549 A1 | 5/2009 | Leonard |
| 2009/0127448 A1 | 5/2009 | Fuyuki |
| 2009/0133736 A1 | 5/2009 | Powell et al. |
| 2009/0140715 A1 | 6/2009 | Adest et al. |
| 2009/0141522 A1 | 6/2009 | Adest et al. |
| 2009/0145480 A1 | 6/2009 | Adest et al. |
| 2009/0146667 A1 | 6/2009 | Adest et al. |
| 2009/0146671 A1 | 6/2009 | Gazit |
| 2009/0147554 A1 | 6/2009 | Adest et al. |
| 2009/0150005 A1 | 6/2009 | Hadar et al. |
| 2009/0160258 A1 | 6/2009 | Allen et al. |
| 2009/0179500 A1 | 7/2009 | Ragonese et al. |
| 2009/0179662 A1 | 7/2009 | Moulton et al. |
| 2009/0182532 A1 | 7/2009 | Stoeber et al. |
| 2009/0183763 A1 | 7/2009 | Meyer |
| 2009/0184746 A1 | 7/2009 | Fahrenbruch |
| 2009/0189456 A1 | 7/2009 | Skutt |
| 2009/0190275 A1 | 7/2009 | Gilmore et al. |
| 2009/0195081 A1 | 8/2009 | Quardt et al. |
| 2009/0206666 A1 | 8/2009 | Sella et al. |
| 2009/0207543 A1 | 8/2009 | Boniface et al. |
| 2009/0217965 A1 | 9/2009 | Dougal et al. |
| 2009/0224817 A1 | 9/2009 | Nakamura et al. |
| 2009/0234692 A1 | 9/2009 | Powell et al. |
| 2009/0237042 A1 | 9/2009 | Glovinski |
| 2009/0237043 A1 | 9/2009 | Glovinsky |
| 2009/0238444 A1 | 9/2009 | Su et al. |
| 2009/0242011 A1 | 10/2009 | Proisy et al. |
| 2009/0243385 A1 | 10/2009 | Ichikawa |
| 2009/0243547 A1 | 10/2009 | Andelfinger |
| 2009/0273241 A1 | 11/2009 | Gazit et al. |
| 2009/0278496 A1 | 11/2009 | Nakao et al. |
| 2009/0282755 A1 | 11/2009 | Abbott et al. |
| 2009/0283129 A1 | 11/2009 | Foss |
| 2009/0283130 A1 | 11/2009 | Gilmore et al. |
| 2009/0284078 A1 | 11/2009 | Zhang et al. |
| 2009/0284232 A1 | 11/2009 | Zhang et al. |
| 2009/0284240 A1 | 11/2009 | Zhang et al. |
| 2009/0284998 A1 | 11/2009 | Zhang et al. |
| 2009/0295225 A1 | 12/2009 | Asplund et al. |
| 2009/0296434 A1 | 12/2009 | De Rooij et al. |
| 2009/0322494 A1 | 12/2009 | Lee |
| 2009/0325003 A1 | 12/2009 | Aberle et al. |
| 2010/0001587 A1 | 1/2010 | Casey et al. |
| 2010/0002349 A1 | 1/2010 | La Scala et al. |
| 2010/0013452 A1 | 1/2010 | Tang et al. |
| 2010/0020576 A1 | 1/2010 | Falk |
| 2010/0026097 A1 | 2/2010 | Avrutsky et al. |
| 2010/0026736 A1 | 2/2010 | Plut |
| 2010/0038907 A1 | 2/2010 | Hunt et al. |
| 2010/0043781 A1 | 2/2010 | Jones et al. |
| 2010/0052735 A1 | 3/2010 | Burkland et al. |
| 2010/0057267 A1 | 3/2010 | Liu et al. |
| 2010/0060000 A1 | 3/2010 | Scholte-Wassink |
| 2010/0071742 A1 | 3/2010 | de Rooij et al. |
| 2010/0085670 A1 | 4/2010 | Palaniswami et al. |
| 2010/0103579 A1 | 4/2010 | Carkner et al. |
| 2010/0115093 A1 | 5/2010 | Rice |
| 2010/0124027 A1 | 5/2010 | Handelsman et al. |
| 2010/0124087 A1 | 5/2010 | Falk |
| 2010/0126550 A1 | 5/2010 | Foss |
| 2010/0127570 A1 | 5/2010 | Hadar et al. |
| 2010/0127571 A1 | 5/2010 | Hadar et al. |
| 2010/0131108 A1 | 5/2010 | Meyer |
| 2010/0132757 A1 | 6/2010 | He et al. |
| 2010/0132758 A1 | 6/2010 | Gilmore |
| 2010/0132761 A1 | 6/2010 | Echizenya et al. |
| 2010/0133911 A1 | 6/2010 | Williams et al. |
| 2010/0139734 A1 | 6/2010 | Hadar et al. |
| 2010/0139743 A1 | 6/2010 | Hadar et al. |
| 2010/0141041 A1 | 6/2010 | Bose et al. |
| 2010/0141153 A1 | 6/2010 | Recker et al. |
| 2010/0147362 A1 | 6/2010 | King et al. |
| 2010/0154858 A1 | 6/2010 | Jain |
| 2010/0176773 A1 | 7/2010 | Capel |
| 2010/0181957 A1 | 7/2010 | Goeltner |
| 2010/0191383 A1 | 7/2010 | Gaul |
| 2010/0195357 A1 | 8/2010 | Fornage et al. |
| 2010/0195361 A1 | 8/2010 | Stem |
| 2010/0206378 A1 | 8/2010 | Erickson, Jr. et al. |
| 2010/0207764 A1 | 8/2010 | Muhlberger et al. |
| 2010/0207770 A1 | 8/2010 | Thiemann |
| 2010/0208501 A1 | 8/2010 | Matan et al. |
| 2010/0213897 A1 | 8/2010 | Tse |
| 2010/0214808 A1 | 8/2010 | Rodriguez |
| 2010/0217551 A1 | 8/2010 | Goff et al. |
| 2010/0229915 A1 | 9/2010 | Ledenev et al. |
| 2010/0241375 A1 | 9/2010 | Kumar et al. |
| 2010/0244575 A1 | 9/2010 | Coccia et al. |
| 2010/0246223 A1 | 9/2010 | Xuan |
| 2010/0264736 A1 | 10/2010 | Mumtaz et al. |
| 2010/0269430 A1 | 10/2010 | Haddock |
| 2010/0277001 A1 | 11/2010 | Wagoner |
| 2010/0282290 A1 | 11/2010 | Schwarze et al. |
| 2010/0286836 A1 | 11/2010 | Shaver, II et al. |
| 2010/0288327 A1 | 11/2010 | Lisi et al. |
| 2010/0289337 A1 | 11/2010 | Stauth et al. |
| 2010/0294528 A1 | 11/2010 | Sella et al. |
| 2010/0294903 A1 | 11/2010 | Shmukler et al. |
| 2010/0295680 A1 | 11/2010 | Dumps |
| 2010/0297860 A1 | 11/2010 | Shmukler et al. |
| 2010/0301677 A1 | 12/2010 | Tomita |
| 2010/0301991 A1 | 12/2010 | Sella et al. |
| 2010/0308662 A1 | 12/2010 | Schatz et al. |
| 2010/0309692 A1 | 12/2010 | Chisenga et al. |
| 2010/0315043 A1 | 12/2010 | Chau |
| 2010/0321148 A1 | 12/2010 | Gevorkian |
| 2010/0326809 A1 | 12/2010 | Lang et al. |
| 2010/0327657 A1 | 12/2010 | Kuran |
| 2010/0327659 A1 | 12/2010 | Lisi et al. |
| 2010/0332047 A1 | 12/2010 | Arditi et al. |
| 2011/0006743 A1 | 1/2011 | Fabbro |
| 2011/0012430 A1 | 1/2011 | Cheng et al. |
| 2011/0019444 A1 | 1/2011 | Dargatz et al. |
| 2011/0025130 A1 | 2/2011 | Hadar et al. |
| 2011/0026282 A1 | 2/2011 | Chapman et al. |
| 2011/0027626 A1 | 2/2011 | Lattin |
| 2011/0031816 A1 | 2/2011 | Buthker et al. |
| 2011/0031946 A1 | 2/2011 | Egan et al. |
| 2011/0037600 A1 | 2/2011 | Takehara et al. |
| 2011/0043172 A1 | 2/2011 | Dearn |
| 2011/0045802 A1 | 2/2011 | Bland et al. |
| 2011/0049990 A1 | 3/2011 | Amaratunga et al. |
| 2011/0050002 A1 | 3/2011 | De Luca |
| 2011/0050190 A1 | 3/2011 | Avrutsky |
| 2011/0056533 A1 | 3/2011 | Kuan |

(56) References Cited

U.S. PATENT DOCUMENTS

| | | |
|---|---|---|
| 2011/0061705 A1 | 3/2011 | Croft et al. |
| 2011/0061713 A1 | 3/2011 | Powell et al. |
| 2011/0062784 A1 | 3/2011 | Wolfs |
| 2011/0068633 A1 | 3/2011 | Quardt et al. |
| 2011/0079263 A1 | 4/2011 | Avrutsky |
| 2011/0080147 A1 | 4/2011 | Schoenlinner et al. |
| 2011/0083733 A1 | 4/2011 | Marroquin et al. |
| 2011/0084553 A1 | 4/2011 | Adest et al. |
| 2011/0084556 A1* | 4/2011 | Marroquin ........... H10F 77/955 |
| | | 307/82 |
| 2011/0088741 A1 | 4/2011 | Dunton et al. |
| 2011/0101949 A1 | 5/2011 | Lopata et al. |
| 2011/0108087 A1 | 5/2011 | Croft et al. |
| 2011/0109158 A1 | 5/2011 | Olsen |
| 2011/0114154 A1 | 5/2011 | Lichy et al. |
| 2011/0115295 A1 | 5/2011 | Moon et al. |
| 2011/0115393 A1 | 5/2011 | He |
| 2011/0116294 A1 | 5/2011 | Wolf |
| 2011/0121441 A1 | 5/2011 | Halstead et al. |
| 2011/0121652 A1 | 5/2011 | Sella et al. |
| 2011/0125431 A1 | 5/2011 | Adest et al. |
| 2011/0132424 A1 | 6/2011 | Rakib |
| 2011/0133552 A1 | 6/2011 | Binder et al. |
| 2011/0133556 A1 | 6/2011 | Choi |
| 2011/0139213 A1 | 6/2011 | Lee |
| 2011/0140535 A1 | 6/2011 | Choi et al. |
| 2011/0140536 A1 | 6/2011 | Adest et al. |
| 2011/0141644 A1 | 6/2011 | Hastings et al. |
| 2011/0144822 A1 | 6/2011 | Choi |
| 2011/0161722 A1 | 6/2011 | Makhota et al. |
| 2011/0172842 A1 | 7/2011 | Makhota et al. |
| 2011/0173276 A1 | 7/2011 | Eizips et al. |
| 2011/0179726 A1 | 7/2011 | Pao et al. |
| 2011/0181251 A1 | 7/2011 | Porter et al. |
| 2011/0181340 A1 | 7/2011 | Gazit |
| 2011/0183537 A1 | 7/2011 | Fornage et al. |
| 2011/0198935 A1 | 8/2011 | Hinman et al. |
| 2011/0210610 A1 | 9/2011 | Mitsuoka et al. |
| 2011/0210611 A1 | 9/2011 | Ledenev et al. |
| 2011/0210612 A1 | 9/2011 | Leutwein |
| 2011/0218687 A1 | 9/2011 | Hadar et al. |
| 2011/0227411 A1 | 9/2011 | Arditi |
| 2011/0232714 A1 | 9/2011 | Bhavaraju et al. |
| 2011/0240100 A1 | 10/2011 | Lu et al. |
| 2011/0245989 A1 | 10/2011 | Makhota et al. |
| 2011/0246338 A1 | 10/2011 | Eich |
| 2011/0254372 A1 | 10/2011 | Haines et al. |
| 2011/0260866 A1 | 10/2011 | Avrutsky et al. |
| 2011/0267721 A1 | 11/2011 | Chaintreuil et al. |
| 2011/0267859 A1 | 11/2011 | Chapman |
| 2011/0271611 A1 | 11/2011 | Maracci et al. |
| 2011/0273015 A1 | 11/2011 | Adest et al. |
| 2011/0273016 A1 | 11/2011 | Adest et al. |
| 2011/0273017 A1 | 11/2011 | Borup et al. |
| 2011/0273024 A1 | 11/2011 | Butzmann |
| 2011/0273302 A1 | 11/2011 | Fornage et al. |
| 2011/0278955 A1 | 11/2011 | Signorelli et al. |
| 2011/0285205 A1 | 11/2011 | Ledenev et al. |
| 2011/0285375 A1 | 11/2011 | Deboy |
| 2011/0290317 A1 | 12/2011 | Naumovitz et al. |
| 2011/0291486 A1 | 12/2011 | Adest et al. |
| 2011/0298288 A1 | 12/2011 | Cho et al. |
| 2011/0301772 A1 | 12/2011 | Zuercher et al. |
| 2011/0304204 A1 | 12/2011 | Avrutsky et al. |
| 2011/0304213 A1 | 12/2011 | Avrutsky et al. |
| 2011/0304215 A1 | 12/2011 | Avrutsky et al. |
| 2011/0316346 A1 | 12/2011 | Porter et al. |
| 2012/0007434 A1 | 1/2012 | Perreault et al. |
| 2012/0007558 A1 | 1/2012 | Pigott |
| 2012/0007613 A1 | 1/2012 | Gazit |
| 2012/0019966 A1 | 1/2012 | DeBoer |
| 2012/0026763 A1 | 2/2012 | Humphrey et al. |
| 2012/0026769 A1 | 2/2012 | Schroeder et al. |
| 2012/0032515 A1 | 2/2012 | Ledenev et al. |
| 2012/0033392 A1 | 2/2012 | Golubovic et al. |
| 2012/0033463 A1 | 2/2012 | Rodriguez |
| 2012/0039099 A1 | 2/2012 | Rodriguez |
| 2012/0042588 A1 | 2/2012 | Erickson, Jr. |
| 2012/0043818 A1 | 2/2012 | Stratakos et al. |
| 2012/0043823 A1 | 2/2012 | Stratakos et al. |
| 2012/0044014 A1 | 2/2012 | Stratakos et al. |
| 2012/0044717 A1 | 2/2012 | Suntio et al. |
| 2012/0048325 A1 | 3/2012 | Matsuo et al. |
| 2012/0049627 A1 | 3/2012 | Matsuo et al. |
| 2012/0049801 A1 | 3/2012 | Chang |
| 2012/0049819 A1 | 3/2012 | Mao et al. |
| 2012/0056483 A1 | 3/2012 | Capp et al. |
| 2012/0056591 A1 | 3/2012 | Abe et al. |
| 2012/0063177 A1 | 3/2012 | Garrity |
| 2012/0080943 A1 | 4/2012 | Phadke |
| 2012/0081009 A1 | 4/2012 | Shteynberg et al. |
| 2012/0081933 A1 | 4/2012 | Garrity |
| 2012/0081934 A1 | 4/2012 | Garrity et al. |
| 2012/0081937 A1 | 4/2012 | Phadke |
| 2012/0087159 A1 | 4/2012 | Chapman et al. |
| 2012/0091810 A1 | 4/2012 | Aiello et al. |
| 2012/0091817 A1 | 4/2012 | Seymour et al. |
| 2012/0098344 A1 | 4/2012 | Bergveld et al. |
| 2012/0104861 A1 | 5/2012 | Kojori et al. |
| 2012/0104863 A1 | 5/2012 | Yuan |
| 2012/0113554 A1 | 5/2012 | Paoletti et al. |
| 2012/0119584 A1 | 5/2012 | Hadar et al. |
| 2012/0126624 A1 | 5/2012 | Hester et al. |
| 2012/0127764 A1 | 5/2012 | Phadke et al. |
| 2012/0133372 A1 | 5/2012 | Tsai et al. |
| 2012/0134058 A1 | 5/2012 | Pamer et al. |
| 2012/0138123 A1 | 6/2012 | Newdoll et al. |
| 2012/0139343 A1 | 6/2012 | Adest et al. |
| 2012/0146420 A1 | 6/2012 | Wolfs |
| 2012/0146583 A1 | 6/2012 | Gaul et al. |
| 2012/0161526 A1 | 6/2012 | Huang et al. |
| 2012/0161528 A1 | 6/2012 | Mumtaz et al. |
| 2012/0169124 A1 | 7/2012 | Nakashima et al. |
| 2012/0169291 A1 | 7/2012 | Abe et al. |
| 2012/0174961 A1 | 7/2012 | Larson et al. |
| 2012/0175961 A1 | 7/2012 | Har-Shai et al. |
| 2012/0175963 A1 | 7/2012 | Adest et al. |
| 2012/0187769 A1 | 7/2012 | Spannhake et al. |
| 2012/0194003 A1 | 8/2012 | Schmidt et al. |
| 2012/0199172 A1 | 8/2012 | Avrutsky |
| 2012/0200311 A1 | 8/2012 | Chaintreuil |
| 2012/0212066 A1 | 8/2012 | Adest et al. |
| 2012/0215367 A1 | 8/2012 | Eizips et al. |
| 2012/0217797 A1 | 8/2012 | Butzmann |
| 2012/0217973 A1 | 8/2012 | Avrutsky |
| 2012/0228931 A1 | 9/2012 | Butzmann |
| 2012/0240490 A1 | 9/2012 | Gangemi |
| 2012/0242156 A1 | 9/2012 | Butzmann et al. |
| 2012/0253533 A1 | 10/2012 | Eizips et al. |
| 2012/0253541 A1 | 10/2012 | Arditi et al. |
| 2012/0255591 A1 | 10/2012 | Arditi et al. |
| 2012/0268969 A1 | 10/2012 | Cuk |
| 2012/0271576 A1 | 10/2012 | Kamel et al. |
| 2012/0274145 A1 | 11/2012 | Taddeo |
| 2012/0274264 A1 | 11/2012 | Mun et al. |
| 2012/0280571 A1 | 11/2012 | Hargis |
| 2012/0299380 A1 | 11/2012 | Haupt |
| 2012/0318320 A1 | 12/2012 | Robbins |
| 2013/0002335 A1 | 1/2013 | DeGraaff |
| 2013/0026839 A1 | 1/2013 | Grana |
| 2013/0026840 A1 | 1/2013 | Arditi et al. |
| 2013/0026842 A1 | 1/2013 | Arditi et al. |
| 2013/0026843 A1 | 1/2013 | Arditi et al. |
| 2013/0038124 A1 | 2/2013 | Newdoll et al. |
| 2013/0039028 A1 | 2/2013 | Korman et al. |
| 2013/0049710 A1 | 2/2013 | Kraft et al. |
| 2013/0057223 A1 | 3/2013 | Lee |
| 2013/0062956 A1 | 3/2013 | Meyer et al. |
| 2013/0062958 A1 | 3/2013 | Erickson, Jr. et al. |
| 2013/0063119 A1 | 3/2013 | Lubomirsky |
| 2013/0069438 A1 | 3/2013 | Liu et al. |
| 2013/0082724 A1 | 4/2013 | Noda et al. |
| 2013/0094112 A1 | 4/2013 | Burghardt et al. |
| 2013/0094262 A1 | 4/2013 | Avrutsky |

(56) References Cited

U.S. PATENT DOCUMENTS

| | | | |
|---|---|---|---|
| 2013/0134790 A1 | 5/2013 | Amaratunga et al. | |
| 2013/0175971 A1 | 7/2013 | Har-Shai et al. | |
| 2013/0181533 A1 | 7/2013 | Capp et al. | |
| 2013/0192657 A1 | 8/2013 | Hadar et al. | |
| 2013/0193765 A1 | 8/2013 | Yoscovich | |
| 2013/0194706 A1 | 8/2013 | Har-Shai et al. | |
| 2013/0200709 A1 | 8/2013 | Kirchner et al. | |
| 2013/0200710 A1 | 8/2013 | Robbins | |
| 2013/0214607 A1 | 8/2013 | Harrison | |
| 2013/0222144 A1 | 8/2013 | Hadar et al. | |
| 2013/0229834 A1 | 9/2013 | Garrity et al. | |
| 2013/0229842 A1 | 9/2013 | Garrity | |
| 2013/0234518 A1 | 9/2013 | Mumtaz et al. | |
| 2013/0235637 A1 | 9/2013 | Rodriguez | |
| 2013/0269181 A1 | 10/2013 | McBride et al. | |
| 2013/0271096 A1 | 10/2013 | Inagaki | |
| 2013/0279210 A1 | 10/2013 | Chisenga et al. | |
| 2013/0285459 A1 | 10/2013 | Jaoui et al. | |
| 2013/0294126 A1 | 11/2013 | Garrity et al. | |
| 2013/0307556 A1 | 11/2013 | Ledenev et al. | |
| 2013/0313909 A1 | 11/2013 | Storbeck et al. | |
| 2013/0320778 A1 | 12/2013 | Hopf et al. | |
| 2013/0321013 A1 | 12/2013 | Pisklak et al. | |
| 2013/0328541 A1 | 12/2013 | Euler et al. | |
| 2013/0332093 A1 | 12/2013 | Adest et al. | |
| 2013/0335861 A1 | 12/2013 | Laschinski et al. | |
| 2014/0062206 A1 | 3/2014 | Bryson | |
| 2014/0062209 A1 | 3/2014 | Liu et al. | |
| 2014/0062396 A1 | 3/2014 | Reddy | |
| 2014/0077611 A1* | 3/2014 | Young | H05K 7/14324 |
| | | | 174/68.2 |
| 2014/0077756 A1 | 3/2014 | Kataoka et al. | |
| 2014/0097808 A1 | 4/2014 | Clark et al. | |
| 2014/0119072 A1 | 5/2014 | Behrends et al. | |
| 2014/0119076 A1 | 5/2014 | Chang et al. | |
| 2014/0167715 A1 | 6/2014 | Wu et al. | |
| 2014/0169053 A1 | 6/2014 | Ilic et al. | |
| 2014/0191583 A1 | 7/2014 | Chisenga et al. | |
| 2014/0210485 A1 | 7/2014 | Lang et al. | |
| 2014/0233136 A1 | 8/2014 | Heerdt | |
| 2014/0246915 A1 | 9/2014 | Mumtaz | |
| 2014/0246927 A1 | 9/2014 | Mumtaz | |
| 2014/0252859 A1 | 9/2014 | Chisenga et al. | |
| 2014/0265551 A1 | 9/2014 | Willis | |
| 2014/0265579 A1 | 9/2014 | Mumtaz | |
| 2014/0265629 A1 | 9/2014 | Gazit et al. | |
| 2014/0265638 A1 | 9/2014 | Orr et al. | |
| 2014/0268913 A1 | 9/2014 | Zheng et al. | |
| 2014/0277796 A1 | 9/2014 | Peskin et al. | |
| 2014/0293491 A1 | 10/2014 | Robbins | |
| 2014/0306543 A1 | 10/2014 | Garrity et al. | |
| 2014/0327313 A1 | 11/2014 | Arditi et al. | |
| 2014/0327995 A1 | 11/2014 | Panjwani et al. | |
| 2014/0354245 A1 | 12/2014 | Batikoff et al. | |
| 2015/0022006 A1 | 1/2015 | Garrity et al. | |
| 2015/0028683 A1 | 1/2015 | Hadar et al. | |
| 2015/0028692 A1 | 1/2015 | Makhota et al. | |
| 2015/0061409 A1 | 3/2015 | Dunton et al. | |
| 2015/0069844 A1 | 3/2015 | Wu et al. | |
| 2015/0100265 A1 | 4/2015 | Duchemin | |
| 2015/0103572 A1 | 4/2015 | Jean | |
| 2015/0131187 A1 | 5/2015 | Krein et al. | |
| 2015/0161872 A1 | 6/2015 | Beaulieu et al. | |
| 2015/0171789 A1 | 6/2015 | Har-Shai et al. | |
| 2015/0183328 A1 | 7/2015 | Kusch et al. | |
| 2015/0188249 A1* | 7/2015 | Pereira | H01R 13/2492 |
| | | | 439/700 |
| 2015/0188415 A1 | 7/2015 | Abido et al. | |
| 2015/0214889 A1 | 7/2015 | Nam et al. | |
| 2015/0236589 A1 | 8/2015 | Baba | |
| 2015/0263609 A1 | 9/2015 | Weida et al. | |
| 2015/0280439 A1* | 10/2015 | Zimmerman | H02J 3/381 |
| | | | 307/82 |
| 2015/0318410 A1 | 11/2015 | Higuma | |
| 2015/0351264 A1 | 12/2015 | Linderman | |
| 2015/0364918 A1 | 12/2015 | Singh et al. | |
| 2015/0372490 A1 | 12/2015 | Bakas et al. | |
| 2015/0381108 A1 | 12/2015 | Hoft et al. | |
| 2015/0381111 A1 | 12/2015 | Nicolescu et al. | |
| 2016/0006392 A1 | 1/2016 | Hoft | |
| 2016/0036235 A1 | 2/2016 | Getsla | |
| 2016/0126367 A1 | 5/2016 | Dunton et al. | |
| 2016/0172900 A1 | 6/2016 | Welch, Jr. | |
| 2016/0181802 A1 | 6/2016 | Jacobson et al. | |
| 2016/0190931 A1 | 6/2016 | Zhang | |
| 2016/0211841 A1 | 7/2016 | Harrison | |
| 2016/0226252 A1 | 8/2016 | Kravtiz et al. | |
| 2016/0226257 A1 | 8/2016 | Porter et al. | |
| 2016/0241039 A1 | 8/2016 | Cheng et al. | |
| 2016/0268809 A1 | 9/2016 | Ledenev et al. | |
| 2016/0270245 A1* | 9/2016 | Linderman | H01R 13/64 |
| 2016/0276820 A1 | 9/2016 | Olivas et al. | |
| 2016/0293115 A1 | 10/2016 | Yamashita et al. | |
| 2016/0329715 A1 | 11/2016 | Orr et al. | |
| 2016/0336899 A1 | 11/2016 | Ledenev et al. | |
| 2016/0380436 A1 | 12/2016 | Porter et al. | |
| 2017/0047739 A1* | 2/2017 | Berger | H02J 1/102 |
| 2017/0104413 A1 | 4/2017 | Busch et al. | |
| 2017/0138804 A1 | 5/2017 | Lebental et al. | |
| 2017/0179876 A1* | 6/2017 | Freeman | H02J 3/40 |
| 2017/0179886 A1 | 6/2017 | Oishi et al. | |
| 2017/0184343 A1 | 6/2017 | Freer et al. | |
| 2017/0207746 A1 | 7/2017 | Yoscovich et al. | |
| 2017/0211190 A1 | 7/2017 | Glasscock et al. | |
| 2017/0222542 A1 | 8/2017 | Adest et al. | |
| 2017/0271879 A1 | 9/2017 | Ledenev et al. | |
| 2017/0278375 A1 | 9/2017 | Galin et al. | |
| 2017/0288384 A1 | 10/2017 | Loewenstern et al. | |
| 2017/0331325 A1 | 11/2017 | Ristau | |
| 2018/0034411 A1 | 2/2018 | Charles et al. | |
| 2018/0145593 A1 | 5/2018 | Xi et al. | |
| 2018/0191292 A1 | 7/2018 | Ehlmann | |
| 2018/0248513 A1 | 8/2018 | Höft | |
| 2018/0351401 A1 | 12/2018 | Binder et al. | |
| 2019/0379279 A1 | 12/2019 | Adest et al. | |
| 2019/0393834 A1 | 12/2019 | Har-Shai et al. | |
| 2020/0176937 A1 | 6/2020 | Azad | |
| 2020/0279963 A1 | 9/2020 | Yoscovich et al. | |
| 2020/0373841 A1 | 11/2020 | Xie et al. | |
| 2021/0036557 A1 | 2/2021 | Haug et al. | |

FOREIGN PATENT DOCUMENTS

| | | |
|---|---|---|
| AU | 2009202125 A1 | 12/2009 |
| AU | 2012225199 A1 | 10/2013 |
| CA | 1183574 A | 3/1985 |
| CA | 2063243 A1 | 12/1991 |
| CA | 2301657 A1 | 3/1999 |
| CA | 2394761 A1 | 6/2001 |
| CA | 2658087 A1 | 6/2001 |
| CA | 2443450 A1 | 3/2005 |
| CA | 2572452 A1 | 1/2006 |
| CA | 2613038 A1 | 1/2007 |
| CA | 2704605 A1 | 5/2009 |
| CA | 2702392 C | 9/2015 |
| CN | 2071396 U | 2/1991 |
| CN | 1106523 A | 8/1995 |
| CN | 2284479 Y | 6/1998 |
| CN | 1188453 A | 7/1998 |
| CN | 2305016 Y | 1/1999 |
| CN | 1236213 A | 11/1999 |
| CN | 1244745 A | 2/2000 |
| CN | 1262552 A | 8/2000 |
| CN | 1064487 C | 4/2001 |
| CN | 1309451 A | 8/2001 |
| CN | 1362655 A | 8/2002 |
| CN | 2514538 Y | 10/2002 |
| CN | 1122905 C | 10/2003 |
| CN | 2579063 Y | 10/2003 |
| CN | 1474492 A | 2/2004 |
| CN | 1523726 A | 8/2004 |
| CN | 1551377 A | 12/2004 |
| CN | 1185782 C | 1/2005 |
| CN | 2672668 Y | 1/2005 |

(56) References Cited

FOREIGN PATENT DOCUMENTS

| | | | |
|---|---|---|---|
| CN | 2672938 | Y | 1/2005 |
| CN | 1588773 | A | 3/2005 |
| CN | 1201157 | C | 5/2005 |
| CN | 1614854 | A | 5/2005 |
| CN | 2706955 | Y | 6/2005 |
| CN | 1245795 | C | 3/2006 |
| CN | 1787717 | A | 6/2006 |
| CN | 1794537 | A | 6/2006 |
| CN | 1838191 | A | 9/2006 |
| CN | 1841254 | A | 10/2006 |
| CN | 1841823 | A | 10/2006 |
| CN | 1848588 | A | 10/2006 |
| CN | 1892239 | A | 1/2007 |
| CN | 1902809 | A | 1/2007 |
| CN | 1929276 | A | 3/2007 |
| CN | 1930925 | A | 3/2007 |
| CN | 1933315 | A | 3/2007 |
| CN | 2891438 | Y | 4/2007 |
| CN | 101030752 | A | 9/2007 |
| CN | 101050770 | A | 10/2007 |
| CN | 101107712 | A | 1/2008 |
| CN | 100371843 | C | 2/2008 |
| CN | 101128974 | A | 2/2008 |
| CN | 101136129 | A | 3/2008 |
| CN | 101180781 | A | 5/2008 |
| CN | 101257221 | A | 9/2008 |
| CN | 100426175 | C | 10/2008 |
| CN | 201167381 | Y | 12/2008 |
| CN | 201203438 | Y | 3/2009 |
| CN | 100487970 | C | 5/2009 |
| CN | 101488271 | A | 7/2009 |
| CN | 101521459 | A | 9/2009 |
| CN | 101523230 | A | 9/2009 |
| CN | 101647172 | A | 2/2010 |
| CN | 101672252 | A | 3/2010 |
| CN | 101697462 | A | 4/2010 |
| CN | 101779291 | A | 7/2010 |
| CN | 101847939 | A | 9/2010 |
| CN | 201601477 | U | 10/2010 |
| CN | 201623478 | U | 11/2010 |
| CN | 201623651 | U | 11/2010 |
| CN | 101902051 | A | 12/2010 |
| CN | 101902171 | A | 12/2010 |
| CN | 101904015 | A | 12/2010 |
| CN | 201663167 | U | 12/2010 |
| CN | 101939660 | A | 1/2011 |
| CN | 101951011 | A | 1/2011 |
| CN | 101951190 | A | 1/2011 |
| CN | 101953051 | A | 1/2011 |
| CN | 101953060 | A | 1/2011 |
| CN | 101976855 | A | 2/2011 |
| CN | 101976952 | A | 2/2011 |
| CN | 101980409 | A | 2/2011 |
| CN | 102084584 | A | 6/2011 |
| CN | 102089883 | A | 6/2011 |
| CN | 102117815 | A | 7/2011 |
| CN | 102148584 | A | 8/2011 |
| CN | 201926948 | U | 8/2011 |
| CN | 201956938 | U | 8/2011 |
| CN | 202034903 | U | 11/2011 |
| CN | 102273039 | A | 12/2011 |
| CN | 202103601 | U | 1/2012 |
| CN | 102362550 | A | 2/2012 |
| CN | 102386259 | A | 3/2012 |
| CN | 202178274 | U | 3/2012 |
| CN | 102474112 | A | 5/2012 |
| CN | 102565635 | A | 7/2012 |
| CN | 102771017 | A | 11/2012 |
| CN | 102845136 | A | 12/2012 |
| CN | 202871823 | U | 4/2013 |
| CN | 103227475 | A | 7/2013 |
| CN | 103280768 | A | 9/2013 |
| CN | 103299501 | A | 9/2013 |
| CN | 203367304 | U | 12/2013 |
| CN | 103548226 | A | 1/2014 |
| CN | 103580463 | A | 2/2014 |
| CN | 103875144 | A | 6/2014 |
| CN | 104143916 | A | 11/2014 |
| CN | 104158482 | A | 11/2014 |
| CN | 104253585 | A | 12/2014 |
| CN | 104488155 | A | 4/2015 |
| CN | 104685785 | A | 6/2015 |
| CN | 104779636 | A | 7/2015 |
| CN | 105075046 | A | 11/2015 |
| CN | 105164915 | A | 12/2015 |
| CN | 105490298 | A | 4/2016 |
| CN | 105553422 | A | 5/2016 |
| CN | 205609261 | U | 9/2016 |
| CN | 106093721 | A | 11/2016 |
| CN | 207304483 | U | 5/2018 |
| DE | 1161639 | B | 1/1964 |
| DE | 3236071 | A1 | 1/1984 |
| DE | 3525630 | A1 | 1/1987 |
| DE | 3729000 | A1 | 3/1989 |
| DE | 4019710 | A1 | 1/1992 |
| DE | 4032569 | A1 | 4/1992 |
| DE | 4041672 | A1 | 6/1992 |
| DE | 9312710 | U1 | 10/1993 |
| DE | 4232356 | A1 | 3/1994 |
| DE | 4325436 | A1 | 2/1995 |
| DE | 4328511 | A1 | 3/1995 |
| DE | 19515786 | A1 | 11/1995 |
| DE | 19502762 | A1 | 8/1996 |
| DE | 19614861 | A1 | 7/1997 |
| DE | 19609189 | A1 | 9/1997 |
| DE | 19618882 | A1 | 11/1997 |
| DE | 19701897 | A1 | 7/1998 |
| DE | 19718046 | A1 | 11/1998 |
| DE | 19732218 | C1 | 3/1999 |
| DE | 19737286 | A1 | 3/1999 |
| DE | 19838230 | A1 | 2/2000 |
| DE | 19846818 | A1 | 4/2000 |
| DE | 19859732 | A1 | 6/2000 |
| DE | 19904561 | C1 | 8/2000 |
| DE | 19928809 | A1 | 1/2001 |
| DE | 019937410 | A1 | 2/2001 |
| DE | 19961705 | A1 | 7/2001 |
| DE | 10064039 | A1 | 12/2001 |
| DE | 10060108 | A1 | 6/2002 |
| DE | 10103431 | A1 | 8/2002 |
| DE | 10136147 | A1 | 2/2003 |
| DE | 10219956 | A1 | 4/2003 |
| DE | 10222621 | A1 | 11/2003 |
| DE | 202004001246 | U1 | 4/2004 |
| DE | 10345302 | A1 | 4/2005 |
| DE | 102004043478 | A1 | 4/2005 |
| DE | 102004053942 | A1 | 5/2006 |
| DE | 102004037446 | A1 | 6/2006 |
| DE | 69734495 | T2 | 7/2006 |
| DE | 69735169 | T2 | 8/2006 |
| DE | 102005012213 | A1 | 8/2006 |
| DE | 102005018173 | A1 | 10/2006 |
| DE | 20 2005 020161 | U1 | 11/2006 |
| DE | 102005036153 | A1 | 12/2006 |
| DE | 102005030907 | A1 | 1/2007 |
| DE | 102005032864 | A1 | 1/2007 |
| DE | 102006023563 | A1 | 11/2007 |
| DE | 102006026073 | A1 | 12/2007 |
| DE | 202007002077 | U1 | 4/2008 |
| DE | 102006060815 | A1 | 6/2008 |
| DE | 602004011201 | T2 | 12/2008 |
| DE | 102007051134 | A1 | 3/2009 |
| DE | 202008012345 | U1 | 3/2009 |
| DE | 102007037130 | B3 | 4/2009 |
| DE | 102007050031 | B3 | 4/2009 |
| DE | 202009007318 | U1 | 8/2009 |
| DE | 102008042199 | A1 | 4/2010 |
| DE | 102008057874 | A1 | 5/2010 |
| DE | 102009051186 | A1 | 5/2010 |
| DE | 102009022569 | A1 | 12/2010 |
| DE | 102010023549 | A1 | 12/2011 |
| DE | 202011109688 | U1 | 3/2012 |
| DE | 102013101314 | A1 | 8/2014 |
| DE | 102013106255 | A1 | 12/2014 |

(56) References Cited

FOREIGN PATENT DOCUMENTS

| | | | |
|---|---|---|---|
| DE | 102013106808 | A1 | 12/2014 |
| DE | 102016117229 | A1 | 3/2018 |
| EP | 0027405 | A1 | 4/1981 |
| EP | 169673 | A1 | 1/1986 |
| EP | 0178757 | A2 | 4/1986 |
| EP | 0206253 | A1 | 12/1986 |
| EP | 0231211 | A1 | 8/1987 |
| EP | 0293219 | A2 | 11/1988 |
| EP | 0340006 | A2 | 11/1989 |
| EP | 0418612 | A1 | 3/1991 |
| EP | 419093 | A2 | 3/1991 |
| EP | 420295 | A1 | 4/1991 |
| EP | 0521467 | A2 | 1/1993 |
| EP | 0576271 | A2 | 12/1993 |
| EP | 0577334 | A2 | 1/1994 |
| EP | 604777 | A1 | 7/1994 |
| EP | 0628901 | A2 | 12/1994 |
| EP | 0642199 | A1 | 3/1995 |
| EP | 653692 | A2 | 5/1995 |
| EP | 0670915 | A1 | 9/1995 |
| EP | 677749 | A2 | 10/1995 |
| EP | 756178 | A2 | 1/1997 |
| EP | 0756372 | A1 | 1/1997 |
| EP | 0780750 | A2 | 6/1997 |
| EP | 0809293 | A1 | 11/1997 |
| EP | 824273 | A2 | 2/1998 |
| EP | 827254 | A2 | 3/1998 |
| EP | 0895146 | A1 | 2/1999 |
| EP | 0906660 | A1 | 4/1999 |
| EP | 0947904 | A2 | 10/1999 |
| EP | 0947905 | A2 | 10/1999 |
| EP | 964415 | A1 | 12/1999 |
| EP | 0978884 | A3 | 3/2000 |
| EP | 1012886 | A1 | 6/2000 |
| EP | 1024575 | A2 | 8/2000 |
| EP | 1034465 | A1 | 9/2000 |
| EP | 1035640 | A1 | 9/2000 |
| EP | 1039361 | A1 | 9/2000 |
| EP | 1039620 | A2 | 9/2000 |
| EP | 1039621 | A2 | 9/2000 |
| EP | 1047179 | A1 | 10/2000 |
| EP | 1130770 | A2 | 9/2001 |
| EP | 1143594 | A2 | 10/2001 |
| EP | 1187291 | A2 | 3/2002 |
| EP | 1235339 | A2 | 8/2002 |
| EP | 1239573 | A1 | 9/2002 |
| EP | 1239576 | A2 | 9/2002 |
| EP | 1254505 | A2 | 11/2002 |
| EP | 1271742 | A2 | 1/2003 |
| EP | 1291997 | A2 | 3/2003 |
| EP | 1330009 | A2 | 7/2003 |
| EP | 1339153 | A2 | 8/2003 |
| EP | 1369983 | A1 | 12/2003 |
| EP | 1376706 | A2 | 1/2004 |
| EP | 1388774 | A1 | 2/2004 |
| EP | 1400988 | A2 | 3/2004 |
| EP | 1407534 | A2 | 4/2004 |
| EP | 1120895 | A3 | 5/2004 |
| EP | 1418482 | A1 | 5/2004 |
| EP | 1429393 | A2 | 6/2004 |
| EP | 1442473 | A2 | 8/2004 |
| EP | 1447561 | A1 | 8/2004 |
| EP | 1457857 | A2 | 9/2004 |
| EP | 1463188 | A2 | 9/2004 |
| EP | 1475882 | A2 | 11/2004 |
| EP | 1503490 | A1 | 2/2005 |
| EP | 1521345 | A1 | 4/2005 |
| EP | 1526633 | A2 | 4/2005 |
| EP | 1531542 | A2 | 5/2005 |
| EP | 1531545 | A2 | 5/2005 |
| EP | 1532727 | A2 | 5/2005 |
| EP | 1552563 | A2 | 7/2005 |
| EP | 1562281 | A1 | 8/2005 |
| EP | 1580862 | A1 | 9/2005 |
| EP | 1603212 | A2 | 12/2005 |
| EP | 1610571 | A2 | 12/2005 |
| EP | 1623495 | A1 | 2/2006 |
| EP | 1642355 | A2 | 4/2006 |
| EP | 0964457 | A3 | 5/2006 |
| EP | 1657557 | A1 | 5/2006 |
| EP | 1657797 | A1 | 5/2006 |
| EP | 1684397 | A2 | 7/2006 |
| EP | 1691246 | A2 | 8/2006 |
| EP | 1706937 | A1 | 10/2006 |
| EP | 1708070 | A1 | 10/2006 |
| EP | 1716272 | A1 | 11/2006 |
| EP | 1728413 | A1 | 12/2006 |
| EP | 1734373 | A2 | 12/2006 |
| EP | 1750193 | A1 | 2/2007 |
| EP | 1766490 | A1 | 3/2007 |
| EP | 1782146 | A2 | 5/2007 |
| EP | 1785800 | A1 | 5/2007 |
| EP | 1837985 | A2 | 9/2007 |
| EP | 1842121 | A2 | 10/2007 |
| EP | 1609250 | B1 | 1/2008 |
| EP | 1887675 | A2 | 2/2008 |
| EP | 1901419 | A2 | 3/2008 |
| EP | 1902349 | A2 | 3/2008 |
| EP | 1911101 | A1 | 4/2008 |
| EP | 1914857 | A1 | 4/2008 |
| EP | 2048679 | A1 | 4/2009 |
| EP | 2054944 | A2 | 5/2009 |
| EP | 2061088 | A2 | 5/2009 |
| EP | 2092625 | A2 | 8/2009 |
| EP | 2092631 | A2 | 8/2009 |
| EP | 2130286 | A1 | 12/2009 |
| EP | 2135296 | A2 | 12/2009 |
| EP | 2135348 | A2 | 12/2009 |
| EP | 2144133 | A1 | 1/2010 |
| EP | 2179451 | A1 | 4/2010 |
| EP | 2206159 | A2 | 7/2010 |
| EP | 2232690 | A1 | 9/2010 |
| EP | 2234237 | A1 | 9/2010 |
| EP | 2249457 | A1 | 11/2010 |
| EP | 2256819 | A1 | 12/2010 |
| EP | 2315328 | A2 | 4/2011 |
| EP | 2355268 | A1 | 8/2011 |
| EP | 2374190 | A1 | 10/2011 |
| EP | 2386122 | A2 | 11/2011 |
| EP | 2393178 | A2 | 12/2011 |
| EP | 2395648 | A2 | 12/2011 |
| EP | 2495766 | A1 | 9/2012 |
| EP | 2515424 | A2 | 10/2012 |
| EP | 2533299 | A1 | 12/2012 |
| EP | 2549635 | A1 | 1/2013 |
| EP | 2561596 | A2 | 2/2013 |
| EP | 2581941 | A2 | 4/2013 |
| EP | 2615644 | A2 | 7/2013 |
| EP | 2621045 | A2 | 7/2013 |
| EP | 2666222 | A1 | 11/2013 |
| EP | 2722979 | A1 | 4/2014 |
| EP | 2779251 | A1 | 9/2014 |
| EP | 3176933 | A1 | 6/2017 |
| EP | 2139104 | B1 | 10/2017 |
| EP | 3252909 | A1 | 12/2017 |
| EP | 3382871 | A1 | 10/2018 |
| ES | 2249147 | A1 | 3/2006 |
| ES | 2249149 | A1 | 3/2006 |
| FR | 2796216 | A1 | 1/2001 |
| FR | 2819653 | A1 | 7/2002 |
| FR | 2894401 | A1 | 6/2007 |
| GB | 310362 | A | 9/1929 |
| GB | 612859 | A | 11/1948 |
| GB | 1211885 | A | 11/1970 |
| GB | 1231961 | A | 5/1971 |
| GB | 1261838 | A | 1/1972 |
| GB | 1571681 | A | 7/1980 |
| GB | 1597508 | A | 9/1981 |
| GB | 2128017 | A | 4/1984 |
| GB | 2327208 | A | 1/1999 |
| GB | 2339465 | A | 1/2000 |
| GB | 2376801 | A | 12/2002 |
| GB | 2399463 | A | 9/2004 |
| GB | 2399465 | A | 9/2004 |

(56) References Cited

FOREIGN PATENT DOCUMENTS

| GB | 2415841 | A | 1/2006 |
|----|---------|---|--------|
| GB | 2419968 | A | 5/2006 |
| GB | 2421847 | A | 7/2006 |
| GB | 2434490 | A | 7/2007 |
| GB | 2476508 | A | 6/2011 |
| GB | 2480015 | B | 12/2011 |
| GB | 2482653 | A | 2/2012 |
| GB | 2483317 | A | 3/2012 |
| GB | 2485527 | A | 5/2012 |
| GB | 2486408 | A | 6/2012 |
| GB | 2487368 | A | 7/2012 |
| GB | 2497275 | A | 6/2013 |
| GB | 2498365 | A | 7/2013 |
| GB | 2498790 | A | 7/2013 |
| GB | 2498791 | A | 7/2013 |
| GB | 2499991 | A | 9/2013 |
| JP | S56042365 | A | 4/1981 |
| JP | S60027964 | A | 2/1985 |
| JP | S60148172 | A | 8/1985 |
| JP | 61065320 | A | 4/1986 |
| JP | S62154121 | A | 7/1987 |
| JP | S62154122 | A | 7/1987 |
| JP | H01311874 | A | 12/1989 |
| JP | H04219982 | A | 8/1992 |
| JP | H04364378 | A | 12/1992 |
| JP | H05003678 | A | 1/1993 |
| JP | H06035555 | A | 2/1994 |
| JP | H06141261 | A | 5/1994 |
| JP | H07026849 | A | 1/1995 |
| JP | H07058843 | A | 3/1995 |
| JP | H07-222436 | A | 8/1995 |
| JP | H07322529 | A | 12/1995 |
| JP | 8009557 | A | 1/1996 |
| JP | H08033347 | A | 2/1996 |
| JP | H08066050 | A | 3/1996 |
| JP | H0897460 | A | 4/1996 |
| JP | 08138754 | A | 5/1996 |
| JP | H08116628 | A | 5/1996 |
| JP | H08181343 | A | 7/1996 |
| JP | H08185235 | A | 7/1996 |
| JP | H08204220 | A | 8/1996 |
| JP | H08227324 | A | 9/1996 |
| JP | H08316517 | A | 11/1996 |
| JP | H08317664 | A | 11/1996 |
| JP | 097644 | A | 1/1997 |
| JP | H094692 | A | 1/1997 |
| JP | H09097918 | A | 4/1997 |
| JP | H09148611 | A | 6/1997 |
| JP | H09148613 | A | 6/1997 |
| JP | H09275644 | A | 10/1997 |
| JP | 2676789 | B2 | 11/1997 |
| JP | H1017445 | A | 1/1998 |
| JP | H1075580 | A | 3/1998 |
| JP | H10201086 | A | 7/1998 |
| JP | H10201105 | A | 7/1998 |
| JP | H10308523 | A | 11/1998 |
| JP | 11041832 | A | 2/1999 |
| JP | H1146457 | A | 2/1999 |
| JP | 11103538 | A | 4/1999 |
| JP | 2892183 | B2 | 5/1999 |
| JP | 11206038 | A | 7/1999 |
| JP | H11266545 | A | 9/1999 |
| JP | 11289891 | A | 10/1999 |
| JP | 11318042 | A | 11/1999 |
| JP | H11332088 | A | 11/1999 |
| JP | 2000020150 | A | 1/2000 |
| JP | 2000051074 | A | 2/2000 |
| JP | 3015512 | B2 | 3/2000 |
| JP | 2000-112545 | A | 4/2000 |
| JP | 2000-116010 | A | 4/2000 |
| JP | 2000160789 | A | 6/2000 |
| JP | 2000166097 | A | 6/2000 |
| JP | 2000174307 | A | 6/2000 |
| JP | 2000232791 | A | 8/2000 |
| JP | 2000232793 | A | 8/2000 |
| JP | 2000316282 | A | 11/2000 |
| JP | 2000324852 | A | 11/2000 |
| JP | 2000339044 | A | 12/2000 |
| JP | 2000341974 | A | 12/2000 |
| JP | 2000347753 | A | 12/2000 |
| JP | 2000358330 | A | 12/2000 |
| JP | 200185716 | A | 3/2001 |
| JP | 2001060120 | A | 3/2001 |
| JP | 2001075662 | A | 3/2001 |
| JP | 2001086765 | A | 3/2001 |
| JP | 2001178145 | A | 6/2001 |
| JP | 2001189476 | A | 7/2001 |
| JP | 2001224142 | A | 8/2001 |
| JP | 2001238466 | A | 8/2001 |
| JP | 2001250964 | A | 9/2001 |
| JP | 2001255949 | A | 9/2001 |
| JP | 2001-320827 | A | 11/2001 |
| JP | 2002073184 | A | 3/2002 |
| JP | 2002231578 | A | 8/2002 |
| JP | 2002238246 | A | 8/2002 |
| JP | 2002-262461 | A | 9/2002 |
| JP | 2002270876 | A | 9/2002 |
| JP | 2002300735 | A | 10/2002 |
| JP | 2002339591 | A | 11/2002 |
| JP | 2002354677 | A | 12/2002 |
| JP | 2003068312 | A | 3/2003 |
| JP | 2003102134 | A | 4/2003 |
| JP | 2003124492 | A | 4/2003 |
| JP | 2003132959 | A | 5/2003 |
| JP | 2003132960 | A | 5/2003 |
| JP | 2003134661 | A | 5/2003 |
| JP | 2003134667 | A | 5/2003 |
| JP | 2003168487 | A | 6/2003 |
| JP | 2003282916 | A | 10/2003 |
| JP | 2003289674 | A | 10/2003 |
| JP | 3499941 | B2 | 2/2004 |
| JP | 2004047279 | A | 2/2004 |
| JP | 2004055603 | A | 2/2004 |
| JP | 2004-096090 | A | 3/2004 |
| JP | 2004111754 | A | 4/2004 |
| JP | 2004-147465 | A | 5/2004 |
| JP | 2004194500 | A | 7/2004 |
| JP | 2004260944 | A | 9/2004 |
| JP | 2004-334704 | A | 11/2004 |
| JP | 2004312994 | A | 11/2004 |
| JP | 2005-151662 | A | 6/2005 |
| JP | 3656531 | B2 | 6/2005 |
| JP | 2005192314 | A | 7/2005 |
| JP | 2005-235082 | A | 9/2005 |
| JP | 2005251039 | A | 9/2005 |
| JP | 2005-276942 | A | 10/2005 |
| JP | 2005283516 | A | 10/2005 |
| JP | 2005-312287 | A | 11/2005 |
| JP | 2006041440 | A | 2/2006 |
| JP | 2006262619 | A | 9/2006 |
| JP | 2006271083 | A | 10/2006 |
| JP | 2006278755 | A | 10/2006 |
| JP | 2007058845 | A | 3/2007 |
| JP | 2007104872 | A | 4/2007 |
| JP | 2007225625 | A | 9/2007 |
| JP | 4174227 | B2 | 10/2008 |
| JP | 2010-146047 | A | 7/2010 |
| JP | 2010245532 | A | 10/2010 |
| JP | 2011-055634 | A | 3/2011 |
| JP | 2011-249790 | A | 12/2011 |
| JP | 2012-60714 | A | 3/2012 |
| JP | 2012511299 | A | 5/2012 |
| JP | 2012178535 | A | 9/2012 |
| JP | 2015-233386 | A | 12/2015 |
| KR | 20010044490 | A | 6/2001 |
| KR | 20030050390 | A | 6/2003 |
| KR | 20040086088 | A | 10/2004 |
| KR | 100468127 | B1 | 1/2005 |
| KR | 200402282 | Y1 | 11/2005 |
| KR | 20060060825 | A | 6/2006 |
| KR | 20070036528 | A | 4/2007 |
| KR | 100725755 | B1 | 5/2007 |
| KR | 20080092747 | A | 10/2008 |
| KR | 100912892 | B1 | 8/2009 |

(56) References Cited

FOREIGN PATENT DOCUMENTS

| | | | |
|---|---|---|---|
| KR | 101073143 | B1 | 10/2011 |
| NL | 1011483 | C2 | 9/2000 |
| TW | 497326 | B | 8/2002 |
| TW | 200913291 | A | 3/2009 |
| WO | 8202134 | A1 | 6/1982 |
| WO | 1984003402 | A1 | 8/1984 |
| WO | 1988004801 | A1 | 6/1988 |
| WO | 9003680 | A1 | 4/1990 |
| WO | 1992007418 | A1 | 4/1992 |
| WO | 1993013587 | A1 | 7/1993 |
| WO | 95/25374 | A1 | 9/1995 |
| WO | 95/34121 | A1 | 12/1995 |
| WO | 1996007130 | A1 | 3/1996 |
| WO | 1996013093 | A1 | 5/1996 |
| WO | 1998023021 | A2 | 5/1998 |
| WO | 1999028801 | A1 | 6/1999 |
| WO | 00/00839 | A1 | 1/2000 |
| WO | 00/21178 | A1 | 4/2000 |
| WO | 0042689 | A1 | 7/2000 |
| WO | 0075947 | A1 | 12/2000 |
| WO | 0077522 | A1 | 12/2000 |
| WO | 01/13502 | A1 | 2/2001 |
| WO | 01047095 | A2 | 6/2001 |
| WO | 02/17469 | A1 | 2/2002 |
| WO | 0231517 | | 4/2002 |
| WO | 02056126 | A1 | 7/2002 |
| WO | 2002073785 | A1 | 9/2002 |
| WO | 02078164 | A1 | 10/2002 |
| WO | 02093655 | A1 | 11/2002 |
| WO | 03012569 | A1 | 2/2003 |
| WO | 03/026114 | A2 | 3/2003 |
| WO | 2003036688 | A2 | 5/2003 |
| WO | 2003050938 | A2 | 6/2003 |
| WO | 2003071655 | A1 | 8/2003 |
| WO | 03084041 | A1 | 10/2003 |
| WO | 2003098703 | | 11/2003 |
| WO | 2004001942 | A1 | 12/2003 |
| WO | 2004006342 | A1 | 1/2004 |
| WO | 2004008619 | A2 | 1/2004 |
| WO | 2004023278 | A2 | 3/2004 |
| WO | 2004053993 | A1 | 6/2004 |
| WO | 2004090993 | A2 | 10/2004 |
| WO | 2004098261 | A2 | 11/2004 |
| WO | 2004100344 | A2 | 11/2004 |
| WO | 2004100348 | A1 | 11/2004 |
| WO | 2004107543 | A2 | 12/2004 |
| WO | 2005015584 | A2 | 2/2005 |
| WO | 2005027300 | A1 | 3/2005 |
| WO | 2005036725 | A1 | 4/2005 |
| WO | 2005053189 | A1 | 6/2005 |
| WO | 2005069096 | A1 | 7/2005 |
| WO | 2005076444 | A1 | 8/2005 |
| WO | 2005076445 | A1 | 8/2005 |
| WO | 2005089030 | A1 | 9/2005 |
| WO | 2005112551 | A2 | 12/2005 |
| WO | 2005119278 | A1 | 12/2005 |
| WO | 2005119609 | A2 | 12/2005 |
| WO | 2005124498 | A1 | 12/2005 |
| WO | 2006002380 | A2 | 1/2006 |
| WO | 2006005125 | A1 | 1/2006 |
| WO | 2006007198 | A1 | 1/2006 |
| WO | 2006011071 | A2 | 2/2006 |
| WO | 2006011359 | A1 | 2/2006 |
| WO | 2006013600 | A2 | 2/2006 |
| WO | 2006033143 | A1 | 3/2006 |
| WO | 2006045016 | A2 | 4/2006 |
| WO | 2006048688 | A1 | 5/2006 |
| WO | 2006048689 | A2 | 5/2006 |
| WO | 2006/074561 | A1 | 7/2006 |
| WO | 2006071436 | A2 | 7/2006 |
| WO | 2006078685 | A2 | 7/2006 |
| WO | 2006079503 | A2 | 8/2006 |
| WO | 2006089778 | A2 | 8/2006 |
| WO | 2006110613 | A2 | 10/2006 |
| WO | 2006/125664 | A1 | 11/2006 |
| WO | 2006117551 | A2 | 11/2006 |
| WO | 2006130520 | A2 | 12/2006 |
| WO | 2006137948 | A2 | 12/2006 |
| WO | 2007006564 | A2 | 1/2007 |
| WO | 2007007360 | A2 | 1/2007 |
| WO | 2007010326 | A1 | 1/2007 |
| WO | 2007/020419 | A2 | 2/2007 |
| WO | 2007048421 | A2 | 5/2007 |
| WO | 2007072517 | A1 | 6/2007 |
| WO | 2007073951 | A1 | 7/2007 |
| WO | 2007080429 | A2 | 7/2007 |
| WO | 2007084196 | A2 | 7/2007 |
| WO | 2007090476 | A2 | 8/2007 |
| WO | 2006124130 | A9 | 10/2007 |
| WO | 2007113358 | A1 | 10/2007 |
| WO | 2007124518 | A1 | 11/2007 |
| WO | 2007129808 | A1 | 11/2007 |
| WO | 2007142693 | A2 | 12/2007 |
| WO | 2008008528 | A2 | 1/2008 |
| WO | 2008026207 | A2 | 3/2008 |
| WO | 2008/046370 | A1 | 4/2008 |
| WO | 2008/077473 | A2 | 7/2008 |
| WO | 2008069926 | A3 | 8/2008 |
| WO | 2008097591 | A2 | 8/2008 |
| WO | 2008119034 | A1 | 10/2008 |
| WO | 2008121266 | A2 | 10/2008 |
| WO | 2008125915 | A2 | 10/2008 |
| WO | 2008132551 | A2 | 11/2008 |
| WO | 2008132553 | A2 | 11/2008 |
| WO | 2008142480 | A2 | 11/2008 |
| WO | 2009003680 | A1 | 1/2009 |
| WO | 2009006879 | A2 | 1/2009 |
| WO | 2009007782 | A2 | 1/2009 |
| WO | 2009011780 | A2 | 1/2009 |
| WO | 2009020917 | A2 | 2/2009 |
| WO | 2009/026602 | A1 | 3/2009 |
| WO | 2009046533 | A1 | 4/2009 |
| WO | 2009051221 | A1 | 4/2009 |
| WO | 2009051222 | A1 | 4/2009 |
| WO | 2009051853 | A1 | 4/2009 |
| WO | 2009051854 | A1 | 4/2009 |
| WO | 2009051870 | A1 | 4/2009 |
| WO | 2009055474 | A1 | 4/2009 |
| WO | 2009/059877 | A1 | 5/2009 |
| WO | 2009056957 | A2 | 5/2009 |
| WO | 2009059028 | A2 | 5/2009 |
| WO | 2009064683 | A2 | 5/2009 |
| WO | 2009/072075 | A2 | 6/2009 |
| WO | 2009/073867 | A1 | 6/2009 |
| WO | 2009072076 | A2 | 6/2009 |
| WO | 2009072077 | A1 | 6/2009 |
| WO | 2009073868 | A1 | 6/2009 |
| WO | 2009073995 | A1 | 6/2009 |
| WO | 2009075985 | A2 | 6/2009 |
| WO | 2009098729 | A1 | 8/2009 |
| WO | 2009114341 | A2 | 9/2009 |
| WO | 2009118682 | A2 | 10/2009 |
| WO | 2009118683 | A2 | 10/2009 |
| WO | 2009136358 | A1 | 11/2009 |
| WO | 2009140539 | A2 | 11/2009 |
| WO | 2009140543 | A2 | 11/2009 |
| WO | 2009155392 | A1 | 12/2009 |
| WO | 2010/002960 | A1 | 1/2010 |
| WO | 2010/003941 | A2 | 1/2010 |
| WO | 2009/140536 | A3 | 2/2010 |
| WO | 2009/140551 | A3 | 2/2010 |
| WO | 2010014116 | A1 | 2/2010 |
| WO | 2010020385 | A2 | 2/2010 |
| WO | 2010/042124 | A1 | 4/2010 |
| WO | 2010037393 | A1 | 4/2010 |
| WO | 2010056777 | A1 | 5/2010 |
| WO | 2010/071855 | A1 | 6/2010 |
| WO | 2010062410 | A1 | 6/2010 |
| WO | 2010062662 | A2 | 6/2010 |
| WO | 2010065043 | A1 | 6/2010 |
| WO | 2010065388 | A1 | 6/2010 |
| WO | 2010072717 | A1 | 7/2010 |
| WO | 2010078303 | A2 | 7/2010 |
| WO | 2010080672 | A2 | 7/2010 |

(56) References Cited

FOREIGN PATENT DOCUMENTS

| WO | 2010091025 A2 | 8/2010 |
|---|---|---|
| WO | 2010094012 A1 | 8/2010 |
| WO | 2010118503 A1 | 10/2010 |
| WO | 2010120315 A1 | 10/2010 |
| WO | 2010/132369 A1 | 11/2010 |
| WO | 20100134057 A1 | 11/2010 |
| WO | 2011005339 A1 | 1/2011 |
| WO | 2011011711 A2 | 1/2011 |
| WO | 2011014275 A1 | 2/2011 |
| WO | 2011017721 A1 | 2/2011 |
| WO | 2011019936 A1 | 2/2011 |
| WO | 2011023732 A2 | 3/2011 |
| WO | 2011028456 A2 | 3/2011 |
| WO | 2011028457 A2 | 3/2011 |
| WO | 2011044641 A1 | 4/2011 |
| WO | 2011049985 A1 | 4/2011 |
| WO | 2011059067 A1 | 5/2011 |
| WO | 2011074025 A1 | 6/2011 |
| WO | 2011076707 A2 | 6/2011 |
| WO | 2011085259 A2 | 7/2011 |
| WO | 2011089607 A1 | 7/2011 |
| WO | 2011109746 A2 | 9/2011 |
| WO | 2011119587 A2 | 9/2011 |
| WO | 2011133843 A2 | 10/2011 |
| WO | 2011133928 A2 | 10/2011 |
| WO | 2011151672 A1 | 12/2011 |
| WO | 2012024538 A3 | 5/2012 |
| WO | 2012100263 A2 | 7/2012 |
| WO | 2013015921 A1 | 1/2013 |
| WO | 2013019899 A2 | 2/2013 |
| WO | 2013064828 A1 | 5/2013 |
| WO | 2013130563 A1 | 9/2013 |
| WO | 2014143021 A1 | 9/2014 |
| WO | 2017/125375 A1 | 7/2017 |
| WO | 2018122835 A1 | 7/2018 |

OTHER PUBLICATIONS

Philips Semiconductors, Data Sheet PSMN005-55B; PSMN005-55P N-channel logic trenchMOS transistor, Oct. 1999, Product specification, pp. 1-11.

International Preliminary Report on Patentability Issued in corresponding international application No. PCT/US04/16668, filed May 27, 2004.

International Application No. PCT/US13/27965, International Preliminary Examination Report, Sep. 2, 2014.

International Patent Application PCT/US13/027965, International Search Report and Written Opinion, Jun. 2, 2013.

International Application No. PCT/US12/44045, International Preliminary Examination Report, Jan. 28, 2014.

International Patent Application No. PCT/US2012/044045, International Search Report and Written Opinion, Jan. 2, 2013.

International Patent Application No. PCT/US2009/047734, International Search Report and Written Opinion, May 4, 2010.

Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.

International Patent Application No. PCT/US2010/029929, International Search Report and Written Opinion, Oct. 27, 2010.

Lowe, Electronics Basis: What is a Latch Circuit, http://www.dummies.com/how-to/content/electronics-basics-what-is-a-latch-circuit.html, from Electronics All-in-One for Dummies, Feb. 2012, downloaded Jul. 13, 2014.

International Patent Application No. PCT/US2011/020591, International Search Report and Written Opinion, Aug. 8, 2011.

International Patent Application No. PCT/US2011/033544, International Search Report and Written Opinion, Nov. 24, 2011.

J. Keller and B. Kroposki, titled, "Understanding Fault Characteristics of Inverter-Based Distributed Energy Resources", in a Technical Report NREL/TP-550-46698, published Jan. 2010, pp. 1 through 48.

International Patent Application No. PCT/US2008/081827, International Search Report and Written Opinion, Jun. 24, 2009.

International Patent Application No. PCT/US2010/046274 International Search Report and Written Opinion, Apr. 22, 2011.

International Patent Application No. PCT/US2011/033658, International Search Report and Written Opinion, Jan. 13, 2012.

International Patent Application No. PCT/US2011/029392, International Search Report and Written Opinion, Oct. 24, 2011.

European Patent Application No. 09829487.9, Extended Search Report, Apr. 21, 2011.

International Patent Application No. PCT/US2009/062536, International Search Report and Written Opinion, Jun. 17, 2010.

International Patent Application No. PCT/US2010/022915, International Search Report and Written Opinion, Aug. 23, 2010.

International Patent Application No. PCT/US2010/046272, International Search Report and Written Opinion, Mar. 31, 2011.

Exell et al., "The Design and Development of a Solar Powered Refrigerator", [retrieved on Feb. 13, 2013], Retrieved from the Internet <URL: http://www.appropedia.org/The_Design_and_Development_of_a_Solar_Powered_Refrigerator>, pp. 1-64.

"Development of Water-Lithium Bromide Low-Temperature Absorption Refridgerating Machine", 2002 Energy & Environment on Database on Noteworthy contributions for Science and Technology (Japan), Research Data (No. 1748) [online], [retrieved on Aug. 29, 2012]. Retrieved from the Internet: <URL: http://dbnstl.nii.ac.jp/english/detail/1748>, pp. 1-4.

Dictionary.com, "air conditioning" [online], [retrieved on Aug. 28, 2012]. Retrieved from the Internet: <URL: http://dictionary.reference.com/browse/air+conditioning?s=t>, pp. 1-3.

International Patent Application No. PCT/US2010/029936, International Search Report and Written Opinion, Nov. 12, 2010.

International Patent Application No. PCT/US08/75127, International Search Report and Written Opinion, Apr. 28, 2009.

International Patent Application No. PCT/US09/35890, International Search Report and Written Opinion, Oct. 1, 2009.

European Patent Application No. 08845104.2, Extended Search Report, Jul. 31, 2014.

European Patent Application No. 11772811.3, Extended Search Report, Dec. 15, 2014.

International Patent Application No. PCT/US2008/082935, International Search Report and Written Opinion, Jun. 25, 2009.

Bhatnagar et al., Silicon Carbide High Voltage (400 V) Shottky Barrier Diodes, IEEE Electron Device Letters, vol. 13 (10) p. 501-503 Oct. 10, 1992.

Jun. 6-10, 2004—Rodriguez, C., and G. A. J. Amaratunga. "Dynamic stability of grid-connected photovoltaic systems." Power Engineering Society General Meeting, 2004. IEEE, pp. 2194-2200.

Nov. 3-Dec. 29, 1999—Kikuchi, Naoto, et al. "Single phase amplitude modulation inverter for utility interaction photovoltaic system." Industrial Electronics Society, 1999. IECON'99 Proceedings. The 25th Annual Conference of the IEEE. vol. 1. IEEE, 1999.

Oct. 7-12, 1990—Nonaka, Sakutaro, et al. "Interconnection system with single phase IGBT PWM CSI between photovoltaic arrays and the utility line." Industry Applications Society Annual Meeting, 1990., Conference Record of the 1990 IEEE.

Jun. 23-27, 2002—Calais, Martina, et al. "Inverters for single-phase grid connected photovoltaic systems-an overview." Power Electronics Specialists Conference, 2002. pesc 02. 2002 IEEE 33rd Annual. vol. 4. IEEE, 2002.

Jul. 1999—Marra, Enes Goncalves, and José Antenor Pomilio. "Self-excited induction generator controlled by a VS-PWM bidirectional converter for rural applications." Industry Applications, IEEE Transactions on 35.4 (1999): 877-883.

Apr. 2-5, 2002—Xiaofeng Sun, Weiyang Wu, Xin Li, Qinglin Zhao: A Research on Photovoltaic Energy Controlling System with Maximum Power Point Tracking:; Proceedings of the Power Conversion Conference—Osaka 2002 (Cat. No. 02TH8579) IEEE—Piscataway, NJ, USA, ISBN 0-7803-7156-9, vol. 2, p. 822-826, XP010590259: the whole document.

International Search Report for corresponding PCT/GB2005/050198 completed Jun. 28, 2006 by C. Wirner of the EPO.

(56) References Cited

OTHER PUBLICATIONS

Brunello, Gustavo, et al., "Shunt Capacitor Bank Fundamentals and Protection," 2003 Conference for Protective Relay Engineers, Apr. 8-10, 2003, pp. 1-17, Texas A&M University, College Station, TX, USA.

Cordonnier, Charles-Edouard, et al., "Application Considerations for Sensefet Power Devices," PCI Proceedings, May 11, 1987, pp. 47-65.

Jun. 9-11, 2003—Kotsopoulos, Andrew, et al., "Predictive DC Voltage Control of Single-Phase PV Inverters with Small DC Link Capacitance," IEEE International Symposium, Month Unknown, 2003, pp. 793-797.

Meinhardt, Mike, et al., "Multi-String-Converter with Reduced Specific Costs and Enhanced Functionality," Solar Energy, May 21, 2001, pp. 217-227, vol. 69, Elsevier Science Ltd.

Mar. 6-10, 2005—Kimball, et al.: "Analysis and Design of Switched Capacitor Converters"; Grainger Center for Electric Machinery and Electromechanics, University of Illinois at Urbana-Champaign, 1406 W. Green St, Urbana, IL 61801 USA, 201 2005 IEEE; pp. 1473-1477.

Martins, et al.: "Interconnection of a Photovoltaic Panels Array to a Single-Phase Utility Line From a Static Conversion System"; Power Electronics Specialists Conference, 2000. PESC 00. 2000 IEEE 31st Annual; Jun. 18, 2000-Jun. 23, 2000; ISSN: 0275-9306; pp. 1207-1211, vol. 3.

International Search Report for corresponding PCT/GB2005/050197, completed Dec. 20, 2005 by K-R Zettler of the EPO.

Kjaer, Soeren Baekhoej, et al., "Design Optimization of a Single Phase Inverter for Photovoltaic Applications," IEEE 34th Annual Power Electronics Specialist Conference, Jun. 15-19, 2003, pp. 1183-1190, vol. 3, IEEE.

Jun. 23-27, 2002—Shimizu, Toshihisa, et al., "A Flyback-type Single Phase Utility Interactive Inverter with Low-frequency Ripple Current Reduction on the DC Input for an AC Photovoltaic Module System," IEEE 33rd Annual Power Electronics Specialist Conference 2002, pp. 1483-1488, vol. 3, IEEE.

Written Opinion of PCT/GB2005/050197, Feb. 14, 2006 (mailing date), Enecsys Limited.

Jun. 17-21, 2001—Yatsuki, Satoshi, et al., "A Novel AC Photovoltaic Module System based on the Impedance-Admittance Conversion Theory," IEEE 32nd Annual Power Electronics Specialists Conference, Month Unknown, 2001, pp. 2191-2196, vol. 4, IEEE.

Subudhi et al., "A Comparative Study on Maximum Power Point Tracking Techniques for Photovoltaic Power Systems," IEEE Transactions on Sustainable Energy, vol. 4, No. 1, Jan. 2013.

Dec. 12, 2023—Japanese Office Action—JP App. No. 2020-004452.

Jan. 1, 2005; Linear Technology Specification Sheet, LTC3780— "High Efficiency Synchronous, 4-Switch Buck-Boost Controller".

Dec. 19, 2005; Edelmoser, K.H. et al.; High Efficiency DC-to-AC Power Inverter with Special DC Interface; Professional Paper, ISSN 0005-1144, Automatika 46 (2005) 3-4, 143-148, 6 pages.

Jan. 29, 2019—European Search Report for EP App No. 18199117.5.

Jul. 12, 2019—European Search Report—EP 19170538.3.

Sep. 4, 2019—Extended European Search Report—EP 19181247.8.

Aug. 6, 2019—Notice of Opposition of European Patent 2232663—Fronius International GmbH.

Sep. 5, 2019—Notice of Opposition of European Patent 2549635—Huawei Technologies Co.

Sep. 5, 2019—Notice of Opposition of European Patent 2549635—Fronius International GmbH.

Solide Arbeit, Heinz Neuenstein, Dec. 2007.

Spitzenwirkungsgrad mit drei Spitzen, Heinz Neuenstien and Andreas Schlumberger, Jan. 2007.

Technical Information, Temperature Derating for Sunny Boy, Sunny Mini Central, Sunny Tripower, Aug. 9, 2019.

Prinout from Energy Matters online Forum, Jul. 2011.

Wayback Machine Query for Energy Matters Online Forum Jul. 2011.

Nov. 27, 20197—European Search Report—3567562.

Baocheng, DC to AC Inverter with Improved One Cycle Control, 2003.

Brekken, Utility-Connected Power Converter for Maximizing Power Transfer From a Photovoltaic Source While Drawing Ripple-Free Current, 2002.

Cramer, Modulorientierter Stromrichter Geht In Serienfertigung , SPVSE, 1994.

Cramer, Modulorientierter Stromrichter, Juelich, Dec. 31, 1995.

Cramer, String-Wechselrichter Machen Solarstrom Billiger, Elektronik, Sep. 1996.

Dehbonei, A Combined Voltage Controlled and Current Controlled "Dual Converter" for a Weak Grid Connected Photovoltaic System with Battery Energy Storage, 2002.

Engler, Begleitende Untersuchungen zur Entwicklung eines Multi-String-Wechselrichters, SPVSE, Mar. 2002.

Geipel, Untersuchungen zur Entwicklung modulorientierter Stromrichter Modulorientierter Stromrichter für netzgekoppelte Photovoltaik-Anlagen, SPVSE, 1995.

Hoor, DSP-Based Stable Control Loops Design for a Single Stage Inverter, 2006.

Isoda, Battery Charging Characteristics in Small Scaled Photovoltaic System Using Resonant DC-DC Converter With Electric Isolation, 1990.

Jones, Communication Over Aircraft Power lines, Dec. 2006/ Jan. 2007.

Kalaivani, A Novel Control Strategy for the Boost DC-AC Inverter, 2006.

Lee, Powering The Dream, IET Computing & Control Engineering, Dec. 2006/ Jan. 2007.

Lee, A Novel Topology for Photovoltaic Series Connected DC/DC Converter with High Efficiency Under Wide Load Range, Jun. 2007.

Lin, LLC DC/DC Resonant Converter with PLL Control Scheme, 2007.

Niebauer, Solarenergie Optimal Nutzen, Stromversorgung, Elektronik, 1996.

Rodrigues, Experimental Study of Switched Modular Series Connected DC-DC Converters, 2001.

Sanchis, Buck-Boost DC-AC Inverter: Proposal for a New Control Strategy, 2004.

Sen, A New DC-to-AC Inverter With Dynamic Robust Performance, 1998.

Shaojun, Research on a Novel Inverter Based on DC/DC Converter Topology, 2003.

Siri, Sequentially Controlled Distributed Solar-Array Power System with Maximum Power Tracking, 2004.

Walko, Poised For Power, IEE Power Engineer, Feb./ Mar. 2005.

White, Electrical Isolation Requirements In Power-Over-Ethernet (PoE) Power Sourcing Equipment (PSE), 2006.

Yu, Power Conversion and Control Methods for Renewable Energy Sources, May 2005.

Zacharias, Modularisierung in der PV-Systemtechnik -Schnittstellen zur Standardisierung der Komponenten, Institut für Solare Energieversorgungstechnik (ISET), 1996.

Dec. 24, 2019—CN Office Action—CN Application 201610946835.5.

Jan. 30, 2020—EP Office Action—EP 18204177.2.

Feb. 3, 2020—Chinese Office Action—201710749388.9.

Mar. 24, 2020—Non-Final Rejection—U.S. Appl. No. 15/593,761.

Apr. 20, 2020—European Search Report—EP 20151729.9.

Apr. 23, 2020—European Search Report—EP 19217486.0.

May 12, 2020—Extended European Search Report—EP 20161381.7.

Jul. 8, 2020—CN Office Action—CN 201710362679.2.

Sep. 17, 2020—Extended European Search Report—EP Application 20176744.9.

Oct. 12, 2020—CN Office Action—CN 201610946835.5.

Nov. 12, 2020—Preliminary Opinion by EPO—EP 12188944.8.

Chinese Office Action—CN Appl. 201310035221.8—dated Aug. 11, 2016.

(56)        References Cited

OTHER PUBLICATIONS

Zhou, Wilson and Theo Phillips—"Industry's First 4-Switch Buck-Boost Controller Achieves Highest Efficiency Using a Single Inducutor—Design Note 369"—Linear Technology Corporation—www.linear.com—2005.

"Micropower Synchronous Buck-Boost DC/DC Converter"—Linear Technology Corporation—www.linear.com/LTC3440—2001.

Mar. 5-9, 1995—Caricchi, F. et al—20 kW Water-Cooled Prototype of a Buck-Boost Bidirectional DC-DC Converter Topology for Electrical Vehicle Motor Drives—University of Rome—IEEE 1995—pp. 887-892.

Roy, Arunanshu et al—"Battery Charger using Bicycle"—EE318 Electronic Design Lab Project Report, EE Dept, IIT Bombay, Apr. 2006.

Jun. 20-25, 2004—Viswanathan, K. et al—Dual-Mode Control of Cascade Buck-Boost PFC Converter—35th Annual IEEE Power Electronics Specialists Conference—Aachen, Germany, 2004.

Zhang, Pei et al.—"Hardware Design Experiences in ZebraNet"—Department of Electrical Engineering, Princeton University—SenSys '04, Nov. 3-5, 2004.

"High Efficiency, Synchronous, 4-Switch Buck-Boost Controller"—Linear Technology Corporation—www.linear.com/LTC3780—2005.

May 19-24, 2002—Chomsuwan, Komkrit et al. "Photovoltaic Grid-Connected Inverter Using Two-Switch Buck-Boost Converter"—Department of Electrical Engineering, King Mongkut's Institute of Technology Ladkrabang, Thailand, National Science and Technology Development Agency, Thailand—IEEE—2002.

Midya, Pallab et al.—"Buck or Boost Tracking Power Converter"—IEEE Power Electronics Letters, vol. 2, No. 4—Dec. 2004.

Chinese Office Action—CN Appl. 201510111948.9—dated Sep. 14, 2016.

Chinese Office Action—CN Appl. 201310066888.4—dated Nov. 2, 2016.

"Power-Switching Converters—the Principle, Simulation and Design of the Switching Power (the Second Edition)", Ang, Oliva, et al., translated by Xu Dehong, et al., China Machine Press, Aug. 2010, earlier publication 2005.

European Notice of Opposition—EP Patent 2092625—mailed Nov. 29, 2016.

Mar. 8, 2003—Vishay Siliconix "Si 7884DP—n-Channel 40-V (D-S) MOSFET" (2003).

Chinese Office Action—CN 201510423458.2—mailed Jan. 3, 2017 (english translation provided).

Chinese Office Action—CN 201410098154.9—mailed Mar. 3, 2017 (english translation provided).

European Search Report—EP Appl. 13150911.9—Apr. 7, 2017.

Howard et al, "Relaxation on a Mesh: a Formalism for Generalized Localization." Proceedings of the IEEE/RSJ International Conference on Intelligent Robots and Systems (IROS 2001). Wailea, Hawaii, Oct. 2001.

Chinese Office Action and Search Report—CN 201510578586.4—mailed Apr. 19, 2017.

Jul. 13, 2017—Chinese Office Action—CN201210007491.3.

Jul. 31, 2014—Huimin Zhou et al.—"PV Balancers: Concept, Architectures, and Realization"—IEEE Transactions on Power Electronics, vol. 30, No. 7, pp. 3479-3487.

Sep. 15, 2012—Huimin Zhou et. al—"PV balancers: Concept, architectures, and realization"—Energy Conversion Congress and Exposition (ECCE), 2012 IEEE, IEEE pp. 3749-3755.

Jul. 17, 2017—International Search Report—PCT/US2017/031571.

Aug. 4, 2017—European Search Report—EP 17165027.

Jul. 19, 2016—Notice of Opposition—EP 2374190—EP App No. 08878650.4.

Sep. 28, 2017—European Office Action—EP 08857835.6.

Nov. 2, 2017—EP Search Report App No. 13157876.7.

Nov. 11, 2017—EP Search Report—App No. 17171489.2.

Dec. 14, 2017—EP Search Report App No. 17188362.2.

Dec. 15, 2017—EP Search Report App No. 17188365.5.

2000; Bascope, G.V.T. Barbi, I; "Generation of Family of Non-isolated DC-DC PWM Converters Using New Three-state Switching Cells"; 2000 IEEE 31st Annual Power Electronics Specialists Conference in Galway, Ireland; vol. 2.

Jan. 20, 2005; Duncan, Joseph, A Global Maximum Power Point Tracking DC-DC Converter, Massachusetts Institute of Technology, Dept. of Electrical Engineering and Computer Science Dissertation; 8 pages.

2005; Edelmoser, K.H. et al.; High Efficiency DC-to-AC Power Inverter with Special DC Interface; Professional Paper, ISSN 0005-1144, Automatika 46 (2005) 3-4, 143-148, 6 pages.

2006; Esmaili, Gholamreza; "Application of Advanced Power Electornics in Renewable Energy Sources and Hygrid Generating Systems" Ohio State Univerty, Graduate Program in Electrical and Computer Engineering, Dissertation. 169 pages.

Nov. 13, 2007; Gomez, M; "Consulting in the Solar Power Age," IEEE-CNSV: Consultants' Network of Scilion Valley; 30 pages.

Jul. 25, 1995-Jun. 30, 1998; Kern, G; "SunSine (TM)300: Manufacture of an AC Photovoltaic Module," Final Report, Phases I & II; National Renewable Energy Laboratory, Mar. 1999; NREL-SR-520-26085; 33 pages.

May 1, 2000; Kroposki, H. Thomas and Witt, B & C; "Progress in Photovoltaic Components and Systems," National Renewable Energy Laboratory; NREL-CP-520-27460; 7 pages.

Jan. 22-23, 1998. Oldenkamp, H. et al; "AC Modules: Past, Present and Future" Workshop Installing the Solar Solution; Hatfield, UK; 6 pages.

Linear Technology Specification Sheet, LTC3443—"High Current Micropower 600kHz Synchronous Buck-Boost DC/DC Converter"—2004.

Linear Technology Specification Sheet, LTC3780—"High Efficiency Synchronous, 4-Switch Buck-Boost Controller"—2005.

Apr. 22, 2004—MICREL—MIC2182 High Efficiency Synchronous Buck Controller.

Apr. 1972—Methods for Utilizing Maximum Power From a Solar Array—Decker, DK.

2000—Evaluating MPPT converter topologies using a MATLAB PV model—Walker, Geoffrey.

Jun. 30, 2008—Wang, Ucilia; Greentechmedia; "National Semi Casts Solarmagic"; www.greentechmedia.com; 3 pages; accessed Oct. 24, 2017.

Sep. 2004; Yuvarajan, S; Dchuan Yu; Shanguang, Xu; "A Novel Power Converter for PHotovoltaic Applications," Journal of Power Sources; vol. 135, No. 1-2, pp. 327-331.

Jun. 1998—Stern M., et al., "Development of a Low-Cost Integrated 20-kW-AC Solar Tracking Subarray for Grid-Connected PV Power System Applications—Final Technical Report"—National Renewable Energy Laboratory; 41 pages.

1997; Verhoeve, C.W.G., et al., "Recent Test Results of AC_Module inverters," Netherlands Energy Research Foundation ECN, 1997; 3 pages.

2004—Nobuyoshi, M. et al., "A Controlling Method for Charging Photovoltaic Generation Power Obtained by a MPPT Control Method to Series Connected Ultra-Electric Double Layer Capacitors"—Industry Application Conference, 2004. 39th IAS Annual Meeting. Conference Record of the 2004 IEEE.

Feb. 23-27, 1992—Miwa, Brett et al., "High Efficiency Power Factor Correction Using Interleaving Techniques"—Applied Power Electronics Conference and Exposition, 1992. APEC '92. Conference Proceedings 1992., Seventh Annual.

QT Technical Application Papers, "ABB Circuit-Breakers for Direct current Applications", ABB SACE S.p.A., An ABB Group Company, L.V. Breakers, Via Baioni, 35, 24123 Bergamo—Italy, Tel.: +39 035.395.111—Telefax: +39035.395.306-433, Sep. 2007.

Woyte, et al., "Mains Monitoring and Protection in a European Context", 17th European Photovoltaic Solar Energy Conference and Exhibition, Munich, Germany, Oct. 22-26, 2001, Achim, Woyte, et al., pp. 1-4.

"Implementation and testing of Anti-Islanding Algorithms for IEEE 929-2000 Compliance of Single Phase Photovoltaic Inverters", Raymond M. Hudson, Photovoltaic Specialists Conference, 2002. Conference Record of the Twenty-Ninth IEEE, May 19-24, 2002.

(56)  References Cited

OTHER PUBLICATIONS

Fairchild Semiconductor, Application Note 9016, IGBT Basics 1, by K.S. Oh Feb. 1, 2001.

"Disconnect Switches in Photovoltaic Applications", ABB, Inc., Low Voltage Control Products & Systems, 1206 Hatton Road, Wichita Falls, TX 86302, Phone 888-385-1221, 940-397-7000, Fax: 940-397-7085, 1SXU301197B0201, Nov. 2009.

Walker, "A DC Circuit Breaker for an Electric Vehicle Battery Pack", Australasian Universities Power Engineering Conference and IEAust Electric Energy Conference, Sep. 26-29, 1999.

Combined Search and Examination Report for GB1018872.0 dated Apr. 15, 2011, 2 pages.

International Search Report and Opinion of International Patent Application PCT/2009/051221, dated Oct. 19, 2009.

International Search Report and Opinion of International Patent Application PCT/2009/051222, dated Oct. 7, 2009.

Communication in EP07874025.5 dated Aug. 17, 2011.

IPRP for PCT/IB2008/055095 dated Jun. 8, 2010, with Written Opinion.

ISR for PCT/IB2008/055095 dated Apr. 30, 2009.

ISR for PCT/IL07/01064 dated Mar. 25, 2008.

IPRP for PCT/IB2007/004584 dated Jun. 10, 2009, with Written Opinion.

IPRP for PCT/IB2007/004591 dated Jul. 13, 2010, with Written Opinion.

IPRP for PCT/IB2007/004643 dated Jun. 10, 2009, with Written Opinion.

Written Opinion for PCT/IB2008/055092 submitted with IPRP dated Jun. 8, 2010.

IPRP for PCT/US2008/085754 dated Jun. 8, 2010, with Written Opinion dated Jan. 21, 2009.

IPRP for PCT/US2008/085755 dated Jun. 8, 2010, with Written Opinion dated Jan. 20, 2009.

IPRP for PCT/IB2009/051221 dated Sep. 28, 2010, with Written Opinion.

IPRP for PCT/IB2009/051222 dated Sep. 28, 2010, with Written Opinion.

IPRP for PCT/IB2009/051831 dated Nov. 9, 2010, with Written Opinion.

IPRP for PCT/US2008/085736 dated Jun. 7, 2011, with Written Opinion.

IPRP for PCT/IB2010/052287 dated Nov. 22, 2011, with Written Opinion.

ISR for PCT/IB2010/052413 dated Sep. 7, 2010.

UK Intellectual Property Office, Application No. GB1109618.7, Patents Act 1977, Examination Report Under Section 18(3), Sep. 16, 2011.

UK Intellectual Property Office, Patents Act 1977: Patents Rules Notification of Grant: Patent Serial No. GB2480015, Nov. 29, 2011.

Walker, et al. "PV String Per-Module Maximum Power Point Enabling Converters", School of Information Technology and Electrical Engineering The University of Queensland, Sep. 28, 2003.

Walker, "Cascaded DC-DC Converter Connection of Photovoltaic Modules", 33rd Annual IEEE Power Electronics Specialists Conference. PESC 2002. Conference Proceedings. CAIRNS, Queensland, Australia, Jun. 23-27, 2002; [Annual Power Electronics Specialists Conference], New York, NY: IEEE US, vol. 1, Jun. 23, 2002, pp. 24-29, XP010596060 ISBN: 978-0-7803-7262-7, figure 1.

Baggio, "Quasi-ZVS Activity Auxiliary Commutation Circuit for Two Switches Forward Converter", 32nd Annual IEEE Power Electronics Specialists Conference. PESC 2001. Conference Proceedings. Vancouver, Canada, Jun. 17-21, 2001; [Annual Power Electronics Specialists Conference] New York, NY: IEEE, US.

Ilic, "Interleaved Zero-Current-Transition Buck Converter", IEEE Transactions on Industry Applications, IEEE Service Center, Piscataway, NJ, US, vol. 43, No. 6, Nov. 1, 2007, pp. 1619-1627, XP011197477 ISSN: 0093-9994, pp. 1619-1922.

Lee: "Novel Zero-Voltage-Transition and Zero-Current-Transition Pulse-Width-Modulation Converters", Power Electronics Specialists Conference, 1997, PESC '97, Record, 28th Annual IEEE St.

Louis, MO, USA, Jun. 22-27, 1997, New York, NY, USA IEEE, US, vol. 1, Jun. 22, 1997, pp. 233-239, XP010241553, ISBN: 978-0-7803-3840-1, pp. 233-236.

Sakamoto, "Switched Snubber for High-Frequency Switching Converters", Electronics & Communications in Japan, Part 1—Communications, Wiley, Hoboken, NJ, US, vol. 76, No. 2, Feb. 1, 1993, pp. 30-38, XP000403018 ISSN: 8756-6621, pp. 30-35.

Duarte, "A Family of ZVX-PWM Active-Clamping DC-to-DC Converters: Synthesis, Analysis and Experimentation", Telecommunications Energy Conference, 1995, INTELEC '95, 17th International The Hague, Netherlands, Oct. 29-Nov. 1, 1995, New York, NY, US, IEEE, US, Oct. 29, 1995, pp. 502-509, XP010161283 ISBN: 978-0-7803-2750-4 p. 503-504.

IPRP for PCT/IL2007/001064 dated Mar. 17, 2009, with Written Opinion dated Mar. 25, 2008.

IPRP for PCT/IB2007/004586 dated Jun. 10, 2009, with Written Opinion.

Gao, et al., "Parallel-Connected Solar PV System to Address Partial and Rapidly Fluctuating Shadow Conditions", IEEE Transactions on Industrial Electronics, vol. 56, No. 5, May 2009, pp. 1548-1556. IPRP PCT/IB2007/004610—date of issue Jun. 10, 2009.

Extended European Search Report—EP12176089.6—Mailing date: Nov. 8, 2012.

Gwon-Jong Yu et al: "Maximum power point tracking with temperature compensation of photovoltaic for air conditioning system with fuzzy controller", May 13, 1996; May 13, 1996-May 17, 1996, May 13, 1996 ( May 13, 1996), pp. 1429-1432, XP010208423.

Extended European Search Report—EP12177067.1—Mailing Date: Dec. 7, 2012.

GB Combined Search and Examination Report—GB1200423.0—Mailing date: Apr. 30, 2012.

GB Combined Search and Examination Report—GB1201499.9—Mailing date: May 28, 2012.

GB Combined Search and Examination Report—GB1201506.1—Mailing date: May 22, 2012.

"Study of Energy Storage Capacitor Reduction for Single Phase PWM Rectifier", Ruxi Wang et al., Virginia Polytechnic Institute and State University, Feb. 2009.

"Multilevel Inverters: A Survey of Topologies, Controls, and Applications", José Rodríguez et al., IEEE Transactions on Industrial Electronics, vol. 49, No. 4, Aug. 2002.

Extended European Search Report—EP 08878650.4—Mailing date: Mar. 28, 2013.

Satcon Solstice—Satcon Solstice 100 kW System Solution Sheet—2010.

John Xue, "PV Module Series String Balancing Converters", University of Queensland—School of Information Technology & Electrical Engineering, Nov. 6, 2002.

Robert W. Erickson, "Future of Power Electronics for Photovoltaics", IEEE Applied Power Electronics Conference, Feb. 2009.

Jan. 18, 2023—Chinese Notice of Allowance —CN App. No. 202010044554.7.

Jan. 30, 2024—CN Office Action—CN 202110858752.1.

Summons to Oral Proceedings Pursuant to Rule 115(1) EPC, dated Feb. 26, 2024 regarding EP Patent No. 2557650.

Ciobotaru, et al., Control of single-stage single-phase PV inverter, Aug. 7, 2006.

International Search Report and Written Opinion for PCT/IB2007/004591 dated Jul. 5, 2010.

European Communication for EP07873361.5 dated Jul. 12, 2010.

European Communication for EP07874022.2 dated Oct. 18, 2010.

European Communication for EP07875148.4 dated Oct. 18, 2010.

Chen, et al., "A New Low-Stress Buck-Boost Converter for Universal-Input PFC Applications", IEEE Applied Power Electronics Conference, Feb. 2001, Colorado Power Electronics Center Publications.

Chen, et al., "Buck-Boost PWM Converters Having Two Independently Controlled Switches", IEEE Power Electronics Specialists Conference, Jun. 2001, Colorado Power Electronics Center Publications.

Esram, et al., "Comparison of Photovoltaic Array Maximum Power Point Tracking Techniques", IEEE Transactions on Energy Conversion, vol. 22, No. 2, Jun. 2007, pp. 439-449.

(56) References Cited

OTHER PUBLICATIONS

Walker, et al., "Photovoltaic DC-DC Module Integrated Converter for Novel Cascaded and Bypass Grid Connection Topologies—Design and Optimisation", 37th IEEE Power Electronics Specialists Conference, Jun. 18-22, 2006, Jeju, Korea.

Geoffrey R. Walker Affidavit re: U.S. Appl. No. 11/950,271, submitted in an IDS for U.S. Appl. No. 11/950,271 on Mar. 9, 2010.

International Search Report for PCT/IB2007/004610 dated Feb. 23, 2009.

International Search Report for PCT/IB2007/004584 dated Jan. 28, 2009.

International Search Report for PCT/IB2007/004586 dated Mar. 5, 2009.

International Search Report for PCT/IB2007/004643 dated Jan. 30, 2009.

International Search Report for PCT/US2008/085736 dated Jan. 28, 2009.

International Search Report for PCT/US2008/085754 dated Feb. 9, 2009.

International Search Report for PCT/US2008/085755 dated Feb. 3, 2009.

Kajihara, et al., "Model of Photovoltaic Cell Circuits Under Partial Shading", 2005 IEEE, pp. 866-870.

Knaupp, et al., "Operation of a 10 KW PV Façade with 100 W AC Photovoltaic Modules", 1996 IEEE, 25th PVSC, May 13-17, 1996, pp. 1235-1238, Washington, DC.

Myrzik, et al., "String and Module Integrated Inverters for Single-Phase Grid Connected Photovoltaic Systems—A Review", Power Tech Conference Proceedings, 2003 IEEE Bologna, Jun. 23-26, 2003, p. 8, vol. 2.

Chen, et al., "Predictive Digital Current Programmed Control", IEEE Transactions on Power Electronics, vol. 18, Issue 1, Jan. 2003.

Wallace, et al., "DSP Controlled Buck/Boost Power Factor Correction for Telephony Rectifiers", Telecommunications Energy Conference 2001, INTELEC 2001, Twenty-Third International, Oct. 18, 2001, pp. 132-138.

Alonso, "A New Distributed Converter Interface for PV Panels", 20th European Photovoltaic Solar Energy Conference, Jun. 6-10, 2005, Barcelona, Spain, pp. 2288-2291.

Alonso, "Experimental Results of Intelligent PV Module for Grid-Connected PV Systems", 21st European Photovoltaic Solar Energy Conference, Sep. 4-8, 2006, Dresden, Germany, pp. 2297-2300.

Enslin, "Integrated Photovoltaic Maximum Power Point Tracking Converter", IEEE Transactions on Industrial Electronics, vol. 44, No. 6, Dec. 1997, pp. 769-773.

Sep. 7-9, 1999—Lindgren, "Topology for Decentralised Solar Energy Inverters with a Low Voltage AC-Bus", Chalmers University of Technology, Department of Electrical Power Engineering, EPE '99—Lausanne.

Jun. 20-25, 2004—Nikraz, "Digital Control of a Voltage Source Inverter in a Photovoltaic Applications", 2004 35th Annual IEEE Power Electronics Specialists Conference, Aachen, Germany, 2004, pp. 3266-3271.

Orduz, "Evaluation Test Results of a New Distributed MPPT Converter", 22nd European Photovoltaic Solar Energy Conference, Sep. 3-7, 2007, Milan, Italy.

Jun. 17-21, 2007—Palma, "A Modular Fuel Cell, Modular DC-DC Converter Concept for High Performance and Enhanced Reliability", IEEE 2007, pp. 2633-2638.

Sep. 16-19, 1996—Quaschning, "Cost Effectiveness of Shadow Tolerant Photovoltaic Systems", Berlin University of Technology, Institute of Electrical Energy Technology, Renewable Energy Section. EuroSun '96, pp. 819-824.

Roman, "Intelligent PV Module for Grid-Connected PV Systems", IEEE Transactions on Industrial Electronics, vol. 52, No. 4, Aug. 2006, pp. 1066-1073.

Roman, "Power Line Communications in Modular PV Systems", 20th European Photovoltaic Solar Energy Conference, Jun. 6-10, 2005, Barcelona, Spain, pp. 2249-2252.

Uriarte, "Energy Integrated Management System for PV Applications", 20th European Photovoltaic Solar Energy Conference, Jun. 6-10, 2005, Barcelona, Spain, pp. 2292-2295.

Walker, "Cascaded DC-DC Converter Connection of Photovoltaic Modules", IEEE Transactions on Power Electronics, vol. 19, No. 4, Jul. 2004, pp. 1130-1139.

Oct. 3-7, 1999—Matsui, et al., "A New Maximum Photovoltaic Power Tracking Control Scheme Based on Power Equilibrium at DC Link", IEEE, 1999, pp. 804-809.

Hou, et al., Application of Adaptive Algorithm of Solar Cell Battery Charger, Apr. 2004.

Sep. 15-22, 2000—Stamenic, et al., "Maximum Power Point Tracking for Building Integrated Photovoltaic Ventilation Systems".

International Preliminary Report on Patentability for PCT/IB2008/055092 dated Jun. 8, 2010.

International Search Report for PCT/IB2008/055092 dated Sep. 8, 2009.

International Search Report and Opinion of International Patent Application WO2009136358 (PCT/IB2009/051831), dated Sep. 16, 2009.

Informal Comments to the International Search Report dated Dec. 3, 2009.

PCT/IB2010/052287 International Search Report and Written Opinion dated Sep. 2, 2010.

UK Intellectual Property office, Combined Search and Examination Report for GB1100450.4 under Sections 17 and 18 (3), Jul. 14, 2011.

Jain, et al., "A Single-Stage Grid Connected Inverter Topology for Solar PV Systems with Maximum Power Point Tracking", IEEE Transactions on Power Electronics, vol. 22, No. 5, Sep. 2007, pp. 1928-1940.

Lynch, et al., "Flexible DER Utility Interface System: Final Report", Sep. 2004-May 2006, Northern Power Systems, Inc., Waitsfield, Vermont B. Kroposki, et al., National Renewable Energy Laboratory Golden, Colorado Technical Report NREL/TP-560-39876, Aug. 2006.

Schimpf, et al., "Grid Connected Converters for Photovoltaic, State of the Art, Ideas for improvement of Transformerless Inverters", NORPIE/2008, Nordic Workshop on Power and Industrial Electronics, Jun. 9-11, 2008.

Sandia Report SAND96-2797 I UC-1290 Unlimited Release, Printed Dec. 1996, "Photovoltaic Power Systems and The National Electrical Code: Suggested Practices", by John Wiles, Southwest Technology Development Institute New Mexico State University Las Cruces, NM.

United Kingdom Intellectual Property Office, Combined Search and Examination Report Under Sections 17 and 18(3), GB1020862.7, dated Jun. 16, 2011.

Dec. 31, 2020—CN Invalidation Decision—CN 200780045351.2.

Dec. 31, 2020—CN Invalidation Decision—CN 201210253614.1.

Mar. 3, 2021—EP Office Action—EP 17188365.5.

May 7, 2021—Chinese Office Action—CN 20181025083.8.

Jun. 21, 2021—Japanese Office Action—JP 2017-158887.

Zhao Junjian & al.: "Analysis of high efficiency DC/DC converter processing partial input/output power", 14th Workshop on Control and Modeling for Power Electronics, Jun. 23, 2013 (Jun. 23, 2013), DOI: 10.1109/COMPEL.2013.6626440.

Apr. 14, 2021—European Summons to Oral Proceedings—EP 17724234.4.

PV Balancers: Concept, Architectures, and Realization—Huimmin Zhou—IEEE Transactions on Power Electronics vol. 30 No. 7—Jul. 7, 2015.

Petition for Inter Partes Review of U.S. Pat. No. 10,256,770; IPR 2021-00540; Petitioner *Altenergy Power Systems Inc* vs. Patent Owner *Tigo Energy Inc.*

Declaration in Support of Petition for Inter Partes Review of U.S. Pat. No. 10,256,770; IPR 2021-00540; Petitioner *Altenergy Power Systems Inc* vs. Patent Owner *Tigo Energy Inc.*

Petition for Inter Partes Review of U.S. Pat. No. 8,988,321; IPR 2021-00541; Petitioner *Altenergy Power Systems Inc* vs. Patent Owner *Tigo Energy Inc.*

(56)            References Cited

OTHER PUBLICATIONS

Declaration in Support of Petition for Inter Partes Review of U.S. Pat. No. 8,933,321; IPR 2021-00541; Petitioner *Altenergy Power Systems Inc* vs. Patent Owner *Tigo Energy Inc.*

Petition for Inter Partes Review of U.S. Pat. No. 8,933,321; IPR 2021-01286; Petitioner *SunSpec Alliance* vs. Patent Owner *Tigo Energy Inc.*

Declaration in Support of Petition for Inter Partes Review of U.S. Pat. No. 8,933,321; IPR 2021-01286; Petitioner *SunSpec Alliance* vs. Patent Owner *Tigo Energy Inc.*

Petition for Inter Partes Review of U.S. Pat. No. 10,256,770; IPR 2021-01287; Petitioner *SunSpec Alliance* vs. Patent Owner *Tigo Energy Inc.*

Declaration in Support of Petition for Inter Partes Review of U.S. Pat. No. 10,256,770; IPR 2021-01287; Petitioner *SunSpec Alliance* vs. Patent Owner *Tigo Energy Inc.*

Maxouris, et al. "United States sets record for most Covid-19 deaths reported in one day," Jan. 13, 2021, CNN, https://www.cnn.com/2021/01/12/health/us-coronavirus-tuesday/index.html.

Texas Instruments, CMOS Ripple-Carry Binary Counter/Dividers, acquired from Harris Semiconductor SCHS030D—Revised Dec. 2003.

Excerpts from IEEE 100—The Authoritative Dictionary of IEEE Standards Terms (7th Ed. 2000).

Excerpts from Paul Horowitz & Winfield Hill—The Art of Electronics (2d. Ed. 1989).

Webeck, Evan, "Coronavirus: California sets another daily case record in possible first sign of 'surge on top of a surge,'" Jan. 5, 2021, The Mercury News (California).

Declaration of Randy R. Dunton in Support of Petition for Inter Partes Review of U.S. Pat. No. 8,933,321, Petitioner *Altenergy POwer Systems, Inc.* v. *Tigo Energy Inc.*, IPR2021-00541.

Declaration of Randy R. Dunton in Support of Petition for Inter Partes Review of U.S. Pat. No. 10,256,770, Petitioner *Altenergy Power Systems, Inc.* v. *Tigo Energy Inc.*, IPR2021-00540.

Declaration of Randy R. Dunton in Support of Petition for Inter Partes Review of U.S. Pat. No. 8,933,321, Petitioner *SunSpec Alliance* v. Patent Owner *Tigo Energy Inc.*, IPR2021-01286.

Declaration of Randy R. Dunton in Support of Petition for Inter Partes Review of U.S. Pat. No. 10,256,770, Petitioner *SunSpec Alliance* v. Patent Owner *Tigo Energy Inc.*, IPR2021-01287.

Nov. 17, 2021—CN Office Action—CN App No. 201810025083.8.

Dec. 16, 2021—EP Office Action—EP App. No. 19178054.3.

Noguchi, Short-Current Pulse-Based Maximum-Power-Point Tracking Method for Multiple Photovoltaic-and-Converter Module System, IECON, Feb. 2002.

Siri, Maximum Power Tracking in Parallel Connected Converters, IEEE, Jul. 1993.

Solero, Performance of A 10 kW Power Electronic Interface For Combined Wind/PV Isolated Generating Systems, PESC, 1996.

Wu, An Improved Dynamic Power Distribution Control Scheme for PWM Controlled Converter Modules, IEEE, 1992.

Jun. 30, 2022—Extended EP Search Report—EP App. No. 22150308.9.

Jul. 7, 2023—European Search Report—EP App. No. 22191698.4.

Oct. 5, 2023—European Search Report—EP App. No. 23180721.5.

"Parallel connection and shunt of resistors", Fundamentals of Circuit, Wang Lianqi, Xidian university Publishing House, pp. 19-21.

Jun. 1, 2024—Chinese Office Action—CN App. No. 202110496807.9.

Mar. 4-8, 2001—Andersen Gert, et al.,—Aalborg University, Institute of Energy Technology, Denmark—"Currect Programmed Control of a Single Phase Two-Switch Buck-Boost Power Factor Correction Circut"—Applied Power Electronics Conference and Exposition, 2001. APEC 2001. Sixteenth Annual IEEE.

Feb. 22-26, 2004—Andersen, Gert et al.,—"Utilizing the free running Current Programmed Control as a Power Factor Correction Technique for the two switch Buck-Boost converter"—Applied Power Electronic Conference and Exposition, 2004. APEC '04. Nineteenth Annual IEEE.

Mar. 3-7, 1996—Caricchi F et al.,—"Prototype of Innovative Wheel Direct Drive With Water-Cooled Exial-Flux Motor for Electric Vehicle Applications"—Applied Power Electronics Conference and Expositions, 1996. APEC '96. Conference Proceedings 1996., Eleventh Annual IEEE.

Feb. 15-19, 1998—Caricchi, F. et al.,—"Study of Bi-Directional Buck-Boost Converter Topologies for Application in Electrical Vehicle Motor Drives"—Applied Power Electronics Conference and Exposition, 1998, APEC '98. CONference Proeedings 1998., Thirteenth Annual IEEE.

Nov. 27-30, 1990—Ensling, JHR—"Maximum Power Point Tracking: A Cost Saving Necessity in Solar Energy Systems"—Industrial Electornics Society, 1990. IECON '90., 16th Annual Conference of IEEE.

Feb. 22-26, 2004—Gaboriault, Mark et al.,—"A High Efficiency, Non-Inverting, Buck-Boost DC-DC Converter"—Applied Power Electronics Conference and Exposition, 2004. APEC '04. Nineteenth Annual IEEE.

Feb. 15-19, 1998—Hua, et al.,—"Comparative Study of Peak Power Tracking Techniques for Solar Storage System"—Applied Power Electronics Conference and Exposition, 1998. APEC'98. Conferenced Proceedings 1998., Thirteenth Annual IEEE.

Jun. 20-24, 1993—Sullivan, et al., "A High-Efficiency Maximum Power Point Tracker for Photovoltaic Arrays in a Solar-Powered Race Vehicle"—University of California, Berkeley, Department of Electrical Engineering and OCmputer Sciences—Power Electronics Specialists Conference, 1993. PESC '93 Record., 24th Annual IEEE.

May 19-24, 2002—Bower et at.,—"Certification of Photovoltaic Inverters: The Initial Step Toward PV System Certification"—Photovoltaic Specialists Conferences, 2002. Conference Record of the Twenty-Ninth IEEE.

Jun. 17-21, 2001—Tse et al., "A Novel Maximum Power Point Tracking Technique for PV Panels"—Power Electronics Specialists Conferences, 2001. PESC. 2001 IEEE 32nd Annual.

May 12-18, 2008—Cuadras et al., "Smart Interfaces for Low Power Energy Harvesting Systems"—Instrumentation and Measurement Technology Conferences Proceedings, 2008. IMTC 2008. IEEE.

Dec. 5-9, 1994—Haan, et al., "Test Results of a 130 W AC Module; a modular solar as power station"—Photovoltaic Energy Conversion 1994. Conference Record of the Twenty Fourth. IEEE Phtovoltaic Specialists Conference—1994.

Sep. 1-3, 2008—Jung, et al., "Soft Switching Boost Converter for Photovoltaic Power Generation System"—Power Electronics and Motion Control Conference, 2008. EPE-PEMC 2008.

Jun. 3-5, 2008—Duan, et al., "A Novel High-Efficiency Inverter for Stand Alone and Grid-Connected Systems"—Industrial Electronics and Applications, 2008. ICIEA 2008.

Nov. 7, 2002—Ertl, et al., "A Novel Multicell DC-AC Converter for Applicaiton in Renewable Energy Systems"—IEEE Transactions on Industrial Electronics (vol. 49, Issue 5, Oct. 2002).

Oct. 8-12, 2000 Hashimoto, et al., "A Novel High Peforamance Utility Interactive Photovoltain Inverter System"—Industry Applications Conference, 2000. Conference Record of the 2000 IEEE.

Feb. 22-26, 2004—Ho, et al., "An Integrated Inverter with Maximum Power Tracking for Grid-Connected PV Systems"—Applied Power Electronics Conference and Exposition, 2004. APEC '04. Nineteenth Annual IEEE.

Nov. 14, 1997 Hua et al., "Control of DC/DC Converters for Solar Energy System with Maximum Power Tracking"—Industrial Electronics, Control and Instrumentation, 1997. IECON 97. 23rd International Conference on Industrial Electronics, Control and Instrumentation vol. 4 of 4.

Sep. 1-3, 2008 Lee et al., "Soft Switching Mutli-Phase Boost Converter for Photovoltaic System"—Power Electronics and Motion Control Conference, 2008. EPE-PEMC 2008.

Jul. 5, 2005, Yao et al., "Tapped-Inductor Buck Converter for High-Step-Down DC-DC Conversion" IEEE Transactions on Power Electronics (vol. 20, Issue 4, Jul. 2005).

Sep. 21-23, 1998 Kretschmar, et al., "An AC Converter with a Small DC Link Capacitor for a 15KW Permanent Magnet Synchronous Integral Motor"—Power Electronics and Variable Speed Drives, 1998. Seven International Converterest (Conf. Publ. No. 456).

(56) References Cited

OTHER PUBLICATIONS

May 25, 2000—Hong Lim, et al., "Simple Maximum Power Point Tracker for Photovoltaic Arrays"—Electronics Letters (vol. 36, Issue 11, May 25, 2000).

Aug. 14-16, 2004 Nishida et al., "A Novel Type of Utility-Interactive Inverter for Phtovoltaic System"—Power Electronics and Mtion Control Conference, 2004. IPEMC 2004.

May 30-Jun. 3, 2011, Jung, et al., "DC-Link Ripple Reduction of Series-connected Module Integrated Converter for Photovoltaic Systems."—Power Electronics and ECCE Asia (ICPE & ECCE).

Jan. 8, 2007, Li et al., "An Analysis of ZVS Two-Inductor Boost Converter under Variable Frequency Operation"—IEEE Transactions on Power Electronics (vol. 22, Issue 1, Jan. 2007).

Sep. 17, 2007 Rodriguez et al., "Analytic Solution to the Photovoltaic Maximum Power Point Problem"—IEEE Transactions on Circuits and Systems I: Regular Papers (vol. 54, Issue 9, Sep. 2007).

Jun. 27, 1997, Reimann et al., "A Novel Control Principle of Bi-Directional DC-DC Power Conversion"—Powre Electronics Specialists Conference 1997. PESC '97 Record.

Sep. 15-22, 2000 Russell et al., "The Massachusetts Electric Solar Project: A Pilot Project to Commercialize Residential PV Systems"—Photovoltaic Specialists Conference, 2000, Conference Record of the Twenty-Eighth IEEE Photovoltaic Specialists Conference—2000.

May 2001, Shimizu et al., "Generation Control Circuit for Photvoltaic Modules"—IEEE Transactions of Power Electronics (vol. 16, Issue 3, May 2001).

Feb. 6-10, 2000, Siri, Kasemsan "Study of System Instability in Current-Mode Converter Power Systems Operating in Solar Array Voltage Regulation Mode"—Applied Power Electronics Conference and Exposition, 2000. APEC 2000. Fiftheenth Annual IEEE.

Aug. 13-16, 1990—Rajan, Anita "A Maximum Power Point Tracker Optimized for Solar Powered Cars"—Future Transportation Technology Conference and Expostion.

Jul. 10, 1995—"Battery I.D. chip from Dallas Semiconductor monitors and reports battery pack temperature"—Business Wire.

Nov. 3, 1999—Takahashi et al., "Development of a Long-Life Three-Phase Flywheel UPS Using an Electrolytic Capacitorless Converter/Inverter"—Electrical Engineering in Japan, vol. 127.

Jan. 2001—Walker, Geoffrey "Evaluating MPPT Converter Topologies Using a Matlab PV Model"—"Journal of Electrical and Electronics Engineering, Australia".

Feb. 13, 2007—Roman et al., "Experimental Results of Controlled PV Module for Building Integrated PV Systems"—Solar Energy 82 (2008) 471-480.

2006—Bower et al., "Innovative PV Micro-Inverter Topology Eliminates Electrolytic Capacitors for Longer Lifetime"—IEEE 1-4244-0016-3/06/ pp. 2038-2041.

Aug. 23-27, 1993—Case et al., "A Minimum Component Photovoltaic Array Maximum Power Point Tracker"—European Space Power Conference vol. 1. Power Systems, Power Electronics.

Jun. 4, 1997—Maranda et al., "Optimization of the Master-Slave Inverter System for Grid-Connected Photovoltaic Plants"—Energy Convers. Mgmt. vol. 39, No. 12 pp. 1239-1246.

2005—Kang et al., "Photovoltaic Power Interface Circuit Incorporated with a Buck-Boost Converter and a Full-Bridge Inverter"—Applied Energy 82, pp. 266-283.

Nov. 21, 1997—Feuermann et al., "Reversable Low Soalr Heat Gain Windows for Energy Savings"—Solar Energy vol. 62, No. 3 pp. 169-175.

May 16, 2005—Enrique et al., "Theoretical assessment of the maximum power point tracking efficiency of photovoltaic facilities with different converter topologies"—Solar Energy 81 (2007) p. 31-38.

Dehbonei, Hooman "Power Conditioning for Distrbuted Renewable Energy Generation"—Curtin University of Technology, School of Electrical and Computer Engineering, 2003 568 pages Dissertation: Thesis. Abstract, 1 page—retrieved on Nov. 13, 2017 on https://books.google.com/books/about/Power_Conditioning_for_Distributed_Renew.html?id=3wVXuAAACAAJ.

Korean Patent Application No. 102005-7008700, filed May 13, 2015. Applicant: Exar Corporation.

Jan. 23, 2018—EP Search Report, EP App No. 17187230.2.

Apr. 16, 2018—EP Examination Report 12707899.6.

Aug. 9, 2010, Hong, Wei, et al., "Charge Equalization of Battery POwer Modules in Series" The 2010 International Power Electronics Conference, IEEE, p. 1568-1572.

Jun. 6, 2018—EP Search Report EP App No. 18151594.1.

Jun. 29, 2018—EP Search Report—EP App No. 18175980.4.

Jun. 23, 2000; Bascope, G.V.T. Barbi, I; "Generation of Family of Non-isolated DC-DC PWM Converters Using New Three-state Switching Cells"; 2000 IEEE 31st Annual Power Electronics Specialists Conference in Galway, Ireland; vol. 2.

Oct. 3-7, 2004; Nobuyoshi, M. et al., "A Controlling Method for Charging Photovoltaic Generation Power Obtained by a MPPT Control Method to Series Connected Ultra-Electric Double Layer Capacitors"—Industry Application Conference, 2004. 39th IAS Annual Meeting. Conference Record of the 2004 IEEE.

GB Combined Search and Examination Report—GB1203763.6—Mailing date: Jun. 25, 2012.

Mohammad Reza Amini et al., "Quasi Resonant DC Link Inverter with a Simple Auxiliary Circuit", Journal of Power Electronics, vol. 11, No. 1, Jan. 2011.

Khairy Fathy et al., "A Novel Quasi-Resonant Snubber-Assisted ZCS-PWM DC-DC Converter with High Frequency Link", Journal of Power Electronics, vol. 7, No. 2, Apr. 2007.

May 22, 1998—Cheng K.W.E., "New Generation of Switched Capacitor Converters", Department of Electrical Engineering, The Hong Kong Polytechnic University, Hung Hom, Hong Kong, Power Electronics Conference, PESC 98.

1999—Per Karlsson, "Quasi Resonant DC Link Converters—Analysis and Design for a Battery Charger Application", Universitetstryckeriet, Lund University, 1999, ISBN 91-88934-14-4; Added to Lund University Publications on Jun. 4, 2012.

Hsiao Sung-Hsin et al., "ZCS Switched-Capacitor Bidirectional Converters with Secondary Output Power Amplifier for Biomedical Applications", Power Electronics Conference (IPEC) Jun. 21, 2010.

Nov. 27-30, 2007—Yuang-Shung Lee et al., "A Novel QR ZCS Switched-Capacitor Bidirectional Converter", IEEE, 2007.

Antti Tolvanen et al., "Seminar on Solar Simulation Standards and Measurement Principles", May 9, 2006 Hawaii.

J.A. Eikelboom and M.J. Jansen, "Characterisation of PV Modules of New Generations—Results of tests and simulations", Jun. 2000.

Yeong-Chau Kuo et al., "Novel Maximum-Power-Point-Tracking Controller for Photovoltaic Energy Conversion System", IEEE Transactions on Industrial Electronics, vol. 48, No. 3, Jun. 2001.

C. Liu et al., "Advanced Algorithm for MPPT Control of Photovoltaic Systems", Canadian Solar Buildings Conference, Montreal, Aug. 20-24, 2004.

May 22, 1998—Chihchiang Hua and Chihming Shen, "Study of Maximum Power Tracking Techniques and Control of DC/DC Converters for Photovoltaic Power System", IEEE.

Tore Skjellnes et al., "Load sharing for parallel inverters without communication", Nordic Workshop in Power and Industrial Electronics, Aug. 12-14, 2002.

Jun. 23, 2000—Giorgio Spiazzi at el., "A New Family of Zero-Current-Switching Variable Frequency dc-dc Converters", IEEE.

Nayar, C.V., M. Ashari and W.W.L Keerthiphala, "A Grid Interactive Photovoltaic Uninterruptible Power Supply System Using Battery Storage and a Back up Diesel Generator", IEEE Transactions on Energy Conversion, vol. 15, No. 3, Sep. 2000, pp. 348?353.

Ph. Strauss et al., "AC coupled PV Hybrid systems and Micro Grids-state of the art and future trends", 3rd World Conference on Photovoltaic Energy Conversion, Osaka, Japan May 11-18, 2003.

Jul. 16-20, 2000—Nayar, C.V., abstract, Power Engineering Society Summer Meeting, 2000. IEEE, 2000, pp. 1280-1282 vol. 2.

Mar. 15, 2004—D. C. Martins et al., "Analysis of Utility Interactive Photovoltaic Generation System using a Single Power Static Inverter", Asian J. Energy Environ., vol. 5, Issue 2, (2004), pp. 115-137.

Rafael C. Beltrame et al., "Decentralized Multi String PV System With Integrated ZVT Cell", Congresso Brasileiro de Automática / 12 a 16-setembro-2010, Bonito-MS.

(56) References Cited

OTHER PUBLICATIONS

Sergio Busquets-Monge et al., "Multilevel Diode-clamped Converter for Photovoltaic Generators With Independent Voltage Control of Each Solar Array", IEEE Transactions on Industrial Electronics, vol. 55, No. 7, Jul. 2008.

Soeren Baekhoej Kjaer et al., "A Review of Single-Phase Grid-Connected Inverters for Photovoltaic Modules", IEEE Transactions on Industry Applications, vol. 41, No. 5, Sep./Oct. 2005.

Office Action—JP 2011-539491—Mailing date: Mar. 26, 2013.

Supplementary European Search Report—EP08857456—Mailing Date Dec. 6, 2013.

Extended European Search Report—EP14151651.8—Mailing date: Feb. 25, 2014.

Iyomori H et al: "Three-phase bridge power block module type auxiliary resonant AC link snubber-assisted soft switching inverter for distributed AC power supply", Intelec 2003. 25th. International Telecommunications Energy Conference. Yokohama, Japan, Oct. 19-23, 2003; Tokyo, IEICE, JP, Oct. 23, 2003 (Oct. 23, 2003), pp. 650-656, XP031895550, ISBN: 978-4-88552-196-6.

Yuqing Tang: "High Power Inverter EMI characterization and Improvement Using Auxiliary Resonant Snubber Inverter", Dec. 17, 1998 (Dec. 17, 1998), XP055055241, Blacksburg, Virginia Retrieved from the Internet: URL:http:jjscholar.lib.vt.edu/theses/available/etd-012299-165108/unrestricted/THESIS. PDF, [retrieved on Mar. 5, 2013].

Yoshida M et al: "Actual efficiency and electromagnetic noises evaluations of a single inductor resonant AC link snubber-assisted three-phase soft-switching inverter", Intelec 2003. 25th. International Telecommunications Energy Conference. Yokohama, Japan, Oct. 19-23, 2003; Tokyo, IEICE, JP, Oct. 23, 2003 (Oct. 23, 2003), pp. 721-726, XP031895560, ISBN: 978-4-88552-196-6.

Third party observation—EP07874025.5—Mailing date: Aug. 6, 2011.

Extended European Search Report—EP 13152967.9—Mailing date: Aug. 28, 2014.

Extended European Search Report—EP 14159696—Mailing Date: Jun. 20, 2014.

Gow Ja A et al: "A Modular DC-DC Converter and Maximum Power Tracking Controller For Medium to Large Scale Photovoltaic Generating Plant" 8<SUP>th </SUP> European Conference on Power Electronics and Applications. Lausaane, CH, Sep. 7-9, 1999, EPE. European Conference on Power Electronics and Applications, Brussls: EPE Association, BE, vol. Conf. 8, Sep. 7, 1999, pp. 1-8, XP000883026.

Chihchiang Hua et al: "Comparative Study of Peak Power Tracking Techniques for Solar Storage System" Applied Power Electronics Conference and Exposition, 1998. APEC '98. Conference Proceedings 1998, Thirteenth Annual Anaheim, CA USA Feb. 15-19, 1998, New York, NY, USA, IEEE, US, Feb. 15, 1998, pp. 679-685, XP010263666.

Matsuo H et al: "Novel Solar Cell Power Supply System Using the Multiple-input DC-DC Converter" 20<SUP>th</SUP> International telecommunications Energy Conference. Intelec '98 San Francisco, CA, Oct. 4-8, 1998, Intelec International Telecommunications Energy Conference, New York, NY: IEEE, US, Oct. 4, 1998, pp. 797-802, XP000896384.

Chihchiang Hua et al: "DSP-based controller application in battery storage of photovoltaic system" Industrial Electronics, Control, and Instrumentation, 1996, Proceedings of the 1996 IEEE IECON 22<SUP>nd</SUP> International Conference on Taipei, Taiwan Aug. 5-10, 1996, New York, NY, USA, IEEE, US, Aug. 5, 1996, pp. 1705-1710, XP010203239.

Hua C et al: "Implementation of a DSP-Controlled Photovoltaic System with Peak Power Tracking" IEEE Transactions on industrial Electronics, IEEE, Inc. New York, US, vol. 45, No. 1, Feb. 1, 1998, pp. 99-107, XP000735209.

I. Weiss et al.: "A new PV system technology—the development of a magnetic power transmission from the PV module to the power bus" 16th European Photovoltaic Solar Energy Conference, vol. III, May 1-5, 2000, pp. 2096-2099, XP002193468 Glasgow, UK.

Basso, Tim, "IEEE Standard for Interconnecting Distributed Resources With the Electric Power System," IEEE PES Meeting, Jun. 9, 2004.

Feb. 11, 2023—Boostbuck.com, "The Four Boostbuck Topologies," located at http://www.boostbuck.com/TheFourTopologies.html.

Apr. 2002—Gautam, Nalin K. et al., "An Efficient Algorithm to Simulate the Electrical Performance of Solar Photovoltaic Arrays," Energy, vol. 27, No. 4, pp. 347-361, 2002.

Nordmann, T. et al., "Performance of PV Systems Under Real Conditions," European Workshop on Life Cycle Analysis and Recycling of Solar Modules, The "Waste" Challenge, Brussels, Belgium, Mar. 18-19, 2004.

Wiles, John, "Photovoltaic Power Systems and the National Electrical Code: Suggested Practices," Sandia National Laboratories, document No. SAND2001-0674, Mar. 2001.

Hewes, J. "Relays," located at http:/web.archive.org/web/20030816010159/www.kpsec.freeuk.com/components/relay.htm, Aug. 16, 2003.

Jan. 1, 1993—Definition of "remove" from Webster's Third New International Dictionary, Unabridged, 1993.

Jan. 1, 1993—Definition of "removable" from Webster's Third New International Dictionary, Unabridged, 1993.

Advanced Energy Group, "The Basics of Solar Power Systems," located at http:/web.archive.org/web/20010331044156/http://www.solar4power.com/solar-power-basics.html, Mar. 31, 2001.

International Patent Application No. PCT/AU2005/001017, International Search Report and Written Opinion, Aug. 18, 2005.

Baek, Ju-Won et al., "High Boost Converter using Voltage Multiplier," 2005 IEEE Conference, IECON 05, pp. 567-572, Nov. 2005.

Wikimedia Foundation, Inc., "Electric Power Transmission," located at http://web.archive.org/web/20041210095723/en.wikipedia.org/wiki/Electric-power-transmission, Nov. 17, 2004.

Jacobsen, K.S., "Synchronized Discrete Multi-Tone (SDMT) Modulation for Cable Modems: Making the Most of the Scarce Reverse Channel Bandwidth," Conference Proceedings of Wescon/97, pp. 374-380, Nov. 4, 1997.

Loyola, L. et al., "A Multi-Channel Infrastructure based on DCF Access Mechanism for Wireless LAN Mesh Networks Compliant with IEEE 802.11," 2005 Asia-Pacific Conference on Communications, pp. 497-501, Oct. 5, 2005.

International Search Report for corresponding PCT/GB2004/001965, completed Aug. 16, 2004 by A. Roider.

Mar. 5-9, 1995—Naik et al., A Novel Grid Interface for Photovoltaic, Wind-Electric, and Fuel-Cell Systems With a Controllable Power Factor or Operation, IEEE, 1995, pp. 995-998.

Petkanchin, Processes following changes of phase angle between current and voltage in electric circuits, Aug. 1999, Power Engineering Review, IEEE vol. 19, Issue 8, pp. 59-60.

Mumtaz, Asim, et al., "Grid Connected PV Inverter Using a Commercially Available Power IC," PV in Europe Conference, Oct. 2002, 3 pages, Rome, Italy.

Koutroulis, Eftichios, et al., "Development of a Microcontroller-Based, Photovoltaic Maximum Power Point Tracking Control System," IEEE Transactions on Power Electronics, Jan. 2001, pp. 46-54, vol. 16, No. 1, IEEE.

European Search Report—EP App. 14159457.2—mailed Jun. 12, 2015.

European Search Report and Written Opinion—EP Appl. 12150819.6—dated Jul. 6, 2015.

Alonso, O. et al. "Cascaded H-Bridge Multilevel Converter for Grid Connected Photovoltaic Generators With Independent Maximum Power Point Tracking of Each Solar Array." IEEE 34th Annual Power Electronics Specialists Conference. vol. 2, Jun. 15, 2003.

Alonso, et al., "Cascaded H-Bridge Multilevel Converter for Grid Connected Photovoltaic Generators with Independent Maximum Power Point Tracking of Each Solar Array", 2003 IEEE 34th, Annual Power Electronics Specialists Conference, Acapulco, Mexico, Jun. 15-19, 2003, pp. 731-735, vol. 2.

Chinese Office Action—CN Appl. 201280006369.2—dated Aug. 4, 2015.

Chinese Office Action—CN Appl. 201210253614.1—dated Aug. 18, 2015.

Extended European Search Report, EP Application 04753488.8, mailed Apr. 29, 2015.

(56)                    References Cited

OTHER PUBLICATIONS

International Search Report from PCT/US04/16668, form PCT/ISA/220, filing date May 27, 2004.

Office Action U.S. Appl. No. 13/785,857, dated Jun. 6, 2013.

Partial Extended European Search Report, EP Application 04753488.8, mailed Feb. 2, 2015.

The International Search Report (Form PCT /ISA/220) Issued in corresponding international application No. PCT/US04/16668, filed May 27, 2004.

International Search Report—PCT/US2004/016668, form PCT/ISA/220—filing date May 27, 2004—mailed Jan. 19, 2005.

Written Opinion of the International Searching Authority—PCT/US2004/016668, form PCT/ISA/220—filing date May 27, 2004—mailed Jan. 19, 2005.

Extended European Search Report—EP Appl. 04753488.8—mailed Apr. 29, 2015.

Supplementary Partial European Search Report—EP Appl. 04753488.8—mailed Feb. 2, 2015.

US Office Action—U.S. Appl. No. 13/785,857—mailed Jun. 6, 2013.

European Office Action—EP Appl. 09725443.7—dated Aug. 18, 2015.

Definition of Isomorphism by Merriam-Webster, <http://www.merriaum-webster.com/dictionary/isomorphism, dated Oct. 20, 2015.

Definition of Isomorphic by Merriam-Webster, <http://www.merriam-webster.com/dictionary/isomorphic, dated Oct. 20, 2015.

Chinese Office Action—CN Appl. 201110349734.7—dated Oct. 13, 2015.

Chinese Office Action—CN Appl. 201210007491.3—dated Nov. 23, 2015.

European Office Action—EP Appl. 12176089.6—dated Dec. 16, 2015.

Chinese Office Action—CN Appl. 201310035223.7—dated Dec. 29, 2015.

Chinese Office Action—CN Application 201210334311.2—dated Jan. 20, 2016.

European Search Report—EP Appl. 13800859.4—mailed Feb. 15, 2016.

Chinese Office Action—CN App. 201310035221.8—mailed Mar. 1, 2016.

PCT/2008/058473 International Preliminary Report, 6 pages, Nov. 2, 2009.

International Search Report and Written Opinion, WO 2010080672, dated Aug. 19, 2010.

PCT/US2010/045352 International Search Report and Written Opinion; 12 pages; Oct. 26, 2010.

International Search Report and Written Opinion mailed Feb. 6, 2009,. In counteprart PCT/US2008/008451, 13 pages.

European Search Report: dated Jan. 10, 2013 in corresponding EP application No. 09838022.3, 7 pages.

D. Ton and W. Bower; Summary Report of the DOE High-Tech Inverter Workshop; Jan. 2005.

First Action Interview Pre-Interview Communication from U.S. Appl. No. 13/174,495 mailed Jun. 18, 2014, 7 pgs.

Johnson et al., "Arc-fault detector algorithm evaluation method utilizing prerecorded arcing signatures", Photovoltaic Specialists Conference (PVSC), Jun. 2012.

Aug. 6, 2007—Philippe Welter, et al. "Electricity at 32 kHz," Photon International, The Photovoltaic Magazine, Http://www.photon-magazine.com/archiv/articles.aspx?criteria=4&HeftNr=0807&Title=Elec . . . printed May 27, 2011).

PCT/US2009/069582 Int. Search Report—dated Aug. 19, 2010.

Chinese Office Action—CN Appl. 201210007491.3—mailed Apr. 25, 2016.

CN Office Action—CN Appl. 201310004123.8—dated May 5, 2016.

Law et al., "Design and Analysis of Switched-Capacitor-Based Step-Up Resonant Converters," IEEE Transactions on Circuits and Systems, vol. 52, No. 5, published May 2005.

CN Office Action—CN Appl. 201310066888.4—dated May 30, 2016.

European Search Report—EP Appl. 13152966.1—dated Jul. 21, 2016.

European Search Report—EP Appl. 12183811.4—dated Aug. 4, 2016.

European Notice of Opposition—EP Patent 2374190—dated Jul. 19, 2016.

"Es werde Dunkelheit. Freischaltung von Solarmodulen im Brandfall"—"Let there be Darkness: Quality control of Solar Modules in Case of Fire"; Photon, May 2005, 75-77, ISSN 1430-5348, English translation provided.

Chinese Office Action—CN Appl. 201380029450.7—dated Jul. 28, 2016.

* cited by examiner

Power bus

100d

Ground bus

CHAIN OF POWER DEVICES

CROSS REFERENCE TO RELATED APPLICATIONS

This application is a continuation of U.S. application Ser. No. 17/500,102, filed Oct. 13, 2021, which is a continuation of U.S. application Ser. No. 15/478,526, filed Apr. 4, 2017, now U.S. Pat. No. 11,177,663, which claims benefit of U.S. Provisional Patent Application No. 62/318,303, filed Apr. 5, 2016, U.S. Provisional Patent Application No. 62/341,147, filed May 25, 2016, and U.S. Provisional Patent Application No. 62/395,461, filed Sep. 16, 2016, the contents of which are incorporated herein by reference in their entireties for all purposes.

BACKGROUND

Power devices may be electrically coupled to photovoltaic (PV) generators and configured the set the operating point of the generators to generate maximum power. They may also be coupled to power production and/or storage units such as batteries, wind or hydroelectric turbines and the like.

Power devices are often manufactured, packaged and sold as single units, leading to deployment which requires that each device be individually coupled to its power unit and the devices themselves coupled by connecting electric cables between them.

Accordingly, there is a need for power device systems in which costs, time and complexity in deploying the power devices are reduced.

SUMMARY

The following summary is a short summary of some of the inventive concepts for illustrative purposes only, and is not intended to limit or constrain the inventions and examples in the detailed description. One skilled in the art will recognize other novel combinations and features from the detailed description.

Embodiments herein may employ a string of photovoltaic power devices (e.g. DC/DC converters, DC/AC inverters, measuring and monitoring devices) which may be deployed in photovoltaic installations. In some embodiments discussed herein, conductors may be used to couple power devices to one another during manufacturing to form a chain of power devices, with the chain packaged and sold as a single unit. The chain may be deployed by coupling the power devices in the chain to photovoltaic (PV) generators (e.g. one or more photovoltaic cells, substrings, PV panels, strings of PV panels and/or PV shingles). The coupling of power devices at the time of manufacturing may reduce costs and enable compact storage of the devices, and the easy deployment may reduce installation time. Connecting power devices at the time of manufacturing may include directly connecting conductors (e.g. by soldering or screwing the conductors into place within a power device enclosure) between adjacent power devices. Furthermore, preconnecting power device may reduce the number of connectors (e.g. MC4™ connectors) featured in each power device from four (two connectors for connecting to a PV generator at the power device input and two connectors for connecting between power devices at the power device output). As connectors may be costly components, substantial savings may be realized. Additionally, preconnecting power devices during manufacturing may increase system safety. For example, if improperly connected, connection points between power devices may be susceptible to overheating, arcing and/or other unsafe event which may result in fire. Preconnecting power devices during manufacturing without use of connectors may increase system safety by reducing the number of connection points from four per power device to two per power device.

Certain embodiments of illustrative power-circuit chains may be wound around a storage spool similar to spools used for storing electrical cables, and deployed in photovoltaic installations by unrolling the spool and coupling the power devices to photovoltaic generators the power devices unwound from the spool.

In some embodiments of illustrative power-circuit chains, a distance between adjacent power devices may correspond to an estimated distance between photovoltaic generator junction boxes in a photovoltaic installation, to enable adjacent power devices to be coupled to adjacent photovoltaic generators. In some embodiments, more than one photovoltaic generator may be coupled to each power device. For example, in some solar installations, two PV generators may be coupled in series and the two generators may then be coupled to one power device, in which case the length between adjacent power devices may be about double the distance between adjacent generators.

The photovoltaic power devices may include, but are not limited to, DC/DC converters, DC/AC inverters, devices configured to measure and monitor photovoltaic parameters, communication devices, safety devices (e.g., fuses, circuit breakers and Residual Current Detectors) and/or Maximum Power Point Tracking (MPPT) devices. The power generation units may include, but are not limited to, photovoltaic modules (e.g. photovoltaic cells, photovoltaic generators), batteries, wind turbines, hydroelectric turbines and fuel cells.

As noted above, this Summary is merely a summary of some of the features described herein and is provided to introduce a selection of concepts in a simplified form that are further described below in the Detailed Description. The Summary is not exhaustive, is not intended to identify key features or essential features of the claimed subject matter and is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures. A more complete understanding of the present disclosure and the advantages thereof may be acquired by referring to the following description in consideration of the accompanying drawings, in which like reference numbers indicate like features, and wherein:

FIG. 6 depicts an illustrative embodiment of a string of photovoltaic power devices coupled by conductors, stored on a storage device.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Since power devices may often be used in bulk (e.g., one power device per photovoltaic generator may be used in a solar installation including multiple photovoltaic strings, each string including ten, twenty or more photovoltaic generators), costs may be reduced and deployment may be easier by packaging power devices in a form which enables multiple devices to be strung out and deployed at one time, along a photovoltaic string. Furthermore, use of a storage device such as a spool to wind multiple cable-connected devices around can make storage and deployment easier and cheaper.

Figure 1A:
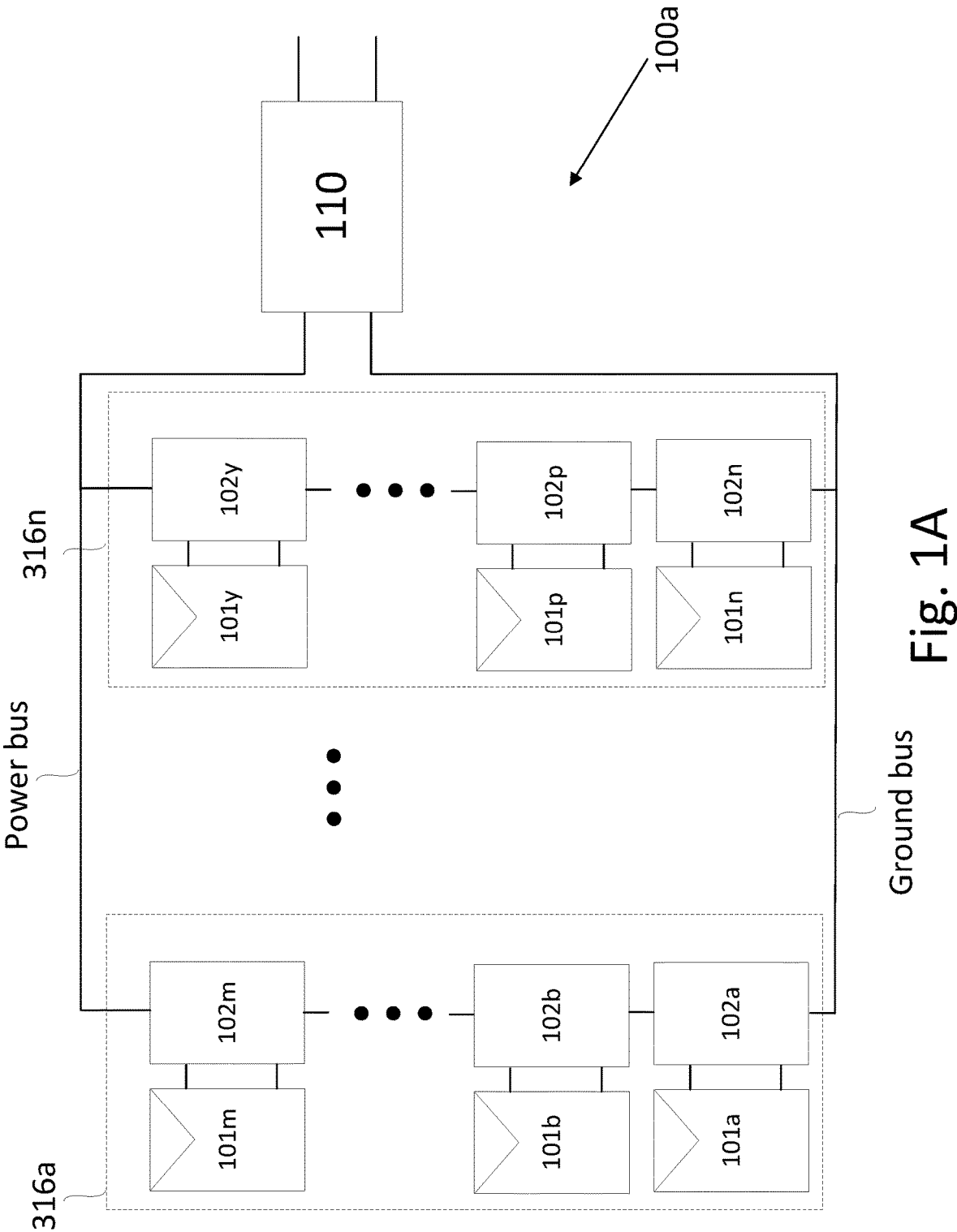
FIGS. 1A-1E are part schematic, part block diagrams of illustrative photovoltaic systems according to certain embodiments.

Referring to FIG. 1A, illustrative photovoltaic installation 100*a* may include a plurality of photovoltaic (PV) modules 101*a-y*. Photovoltaic generators may also be referred to as "photovoltaic modules". Each PV generator 101*a-y* may be coupled to a photovoltaic power device 102*a-y*.

In some embodiments, one or more PV power device 102*a-y* may comprise a power conversion circuit such as a direct current—direct current (DC/DC) converter such as a buck, boost, buck-boost, flyback and/or forward converter. In some embodiments, one or more PV power device 102*a-y* may comprise a direct current—alternating current (DC/AC) converter, also known as an inverter or a microinverter. In some embodiments, one or more PV power device 102*a-y* may include a Maximum Power Point Tracking (MPPT) and/or Impedance Matching circuit with a controller, configured to extract regulated (e.g. increased) power from the PV generator the power device is coupled to. One or more PV power device 102*a-y* may further comprise a control device such as a microprocessor, Digital Signal Processor (DSP) and/or a field-programmable gate array (FPGA). In some embodiments, one or more PV power device 102*a-y* may comprise circuitry and/or sensors configured to measure parameters on or near the photovoltaic generator, such as the voltage and/or current output by the generator, the power output by the generator, the irradiance received by the generator and/or the temperature on or near the generator.

In the illustrative embodiment depicted in FIG. 1A, a plurality of PV power devices 102*a-m* are coupled in series, to form a first photovoltaic string 316*a*. One terminal of the resultant photovoltaic string 316*a* may be coupled to a power bus, and the other terminal of the photovoltaic string 316*a* may be coupled to a ground bus. In some embodiments, the power and ground buses may be input to system power device 110. System power device 110 may comprise a DC/AC converter, and the DC/AC converter may output AC power to the grid, home or other destinations. In some embodiments, the photovoltaic power devices may comprise microinverters, and an additional inverter (e.g. part of system power device 110) may not be included. In some embodiments, the power devices may output a time-varying DC signal which emulates a rectified sine wave, in which case system power device 110 may comprise a full-bridge circuit configured to convert the rectified sine wave to a standard, alternating sine wave. In some embodiments, system power device 110 may include a combiner box for combining power from a plurality of photovoltaic strings (e.g. 316*a*-316*n*). In some embodiments, system power device 110 may comprise sensors/sensor interfaces for measuring or receiving measurements of one or more parameters (e.g. current, voltage, power, temperature etc.) associated with PV strings 316*a*-316*n*. In some embodiments, system power device 110 may include one or more safety switches for disconnecting and/or short-circuiting PV strings 316*a*-316*n* in case of a potentially unsafe condition or in response to a manual trigger (e.g. activating a rapid-shutdown switch or button).

Since PV power devices of known systems may be generally manufactured, packaged and sold separately, PV installations which include a plurality of PV generators, e.g., installation 100*a* may require unpacking a large number of devices, individually coupling each device to its corresponding photovoltaic generator, and then coupling the power devices to one another using cables which may be sold separately as well. In some embodiments introduced herein, a power device chain is provided. The power device chain may include a plurality of power devices each coupled to at least one other power device using conductors of appropriate length at the time of manufacturing. Accordingly, power device chains as described herein may be packaged and sold as a single unit, and deployed as a single unit when installing installation 100*a*. For example, power devices 102*a-m* may comprise a string of power devices or part of a string of power devices, and may be coupled to one another during manufacturing. During installation, the string may simply be strung out alongside photovoltaic modules 101*a-m* and each device may be coupled to its corresponding module quickly and easily, forming photovoltaic string 316*a*.

As shown in FIG. 1A, installation 100*a* may include a plurality of photovoltaic strings 316*a-n*, with a terminal of each photovoltaic string 316*a-n* being coupled to the power bus and the other terminal being coupled to the ground bus.

Figure 1B:
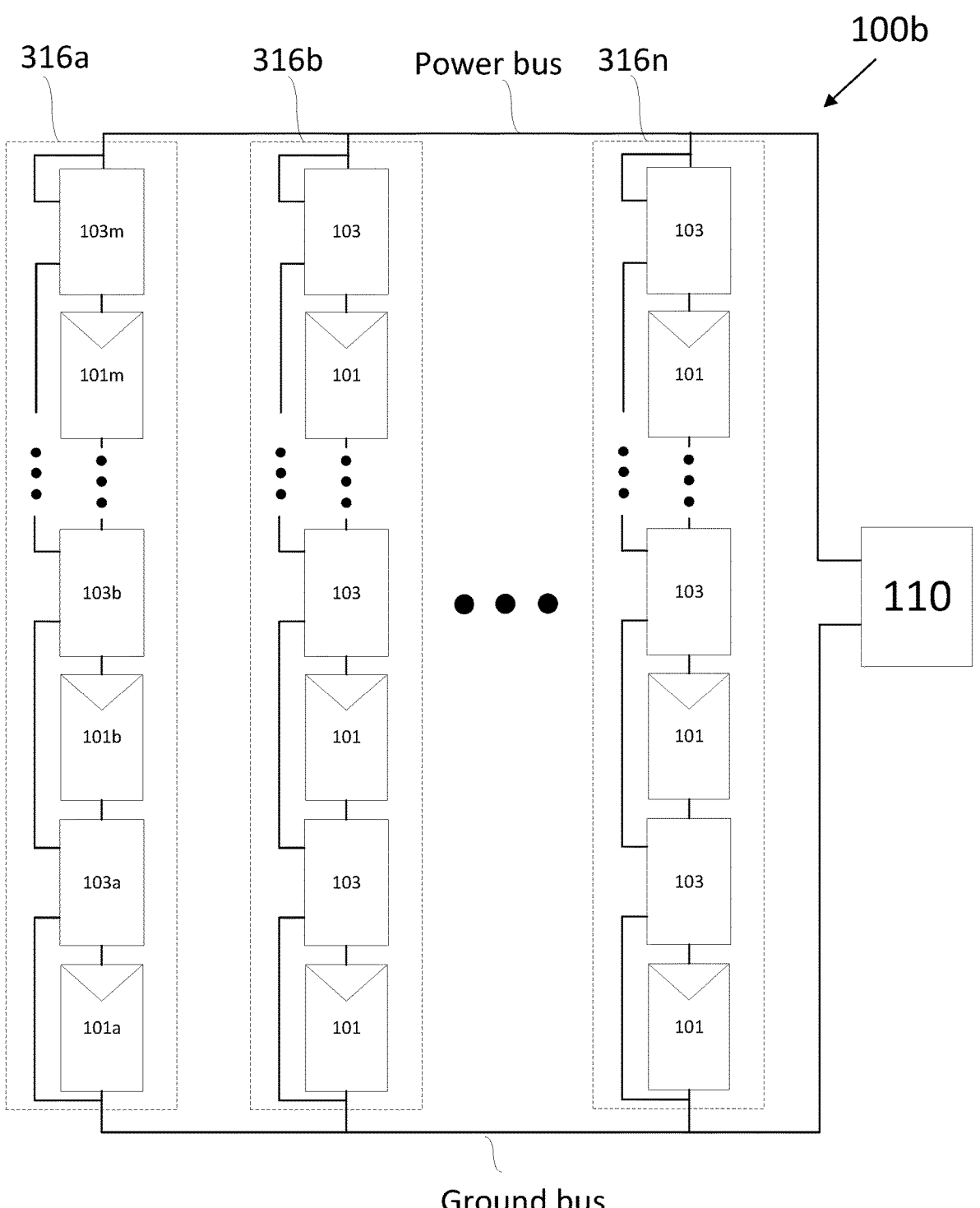

Referring now to FIG. 1B, illustrative system 100*b* may share many of the same characteristics as illustrative installation 100*a* of FIG. 1A, but the wiring of photovoltaic strings may differ in some respects. For example, in illustrative system 100*b*, each photovoltaic power device 103*a-m* may be coupled to two photovoltaic generators. For example, photovoltaic power device 103*a* may be coupled to generators 101*a* and 101*b*, power device 103*b* may be coupled to generators 101*b* and 101*c* (not shown), and so on. Wiring each photovoltaic string (e.g. 316*a*) in this manner may save money by requiring thinner and fewer cables to couple the power devices to the generators and to one another.

In the illustrative embodiment show in FIG. 1B, the power devices may be pre-coupled to one another during manufacturing, packaged and/or sold together, and deployed easily, similar to as described with reference to installation 100*a* shown in FIG. 1A. For effective system operation and for easy and fast coupling of the power devices to the photovoltaic generator(s) the power devices are meant to be coupled to, the electrical and/or mechanical design of the power devices used for systems such as 100*a* may differ from the design used for systems such as 100*b*. The pre-coupling, packaging and easy deployment described herein may be applied to different kinds of power devices used in different kinds of photovoltaic systems, regardless of mechanical design and electrical topology details which may be specific to certain power devices.

Figure 1C:
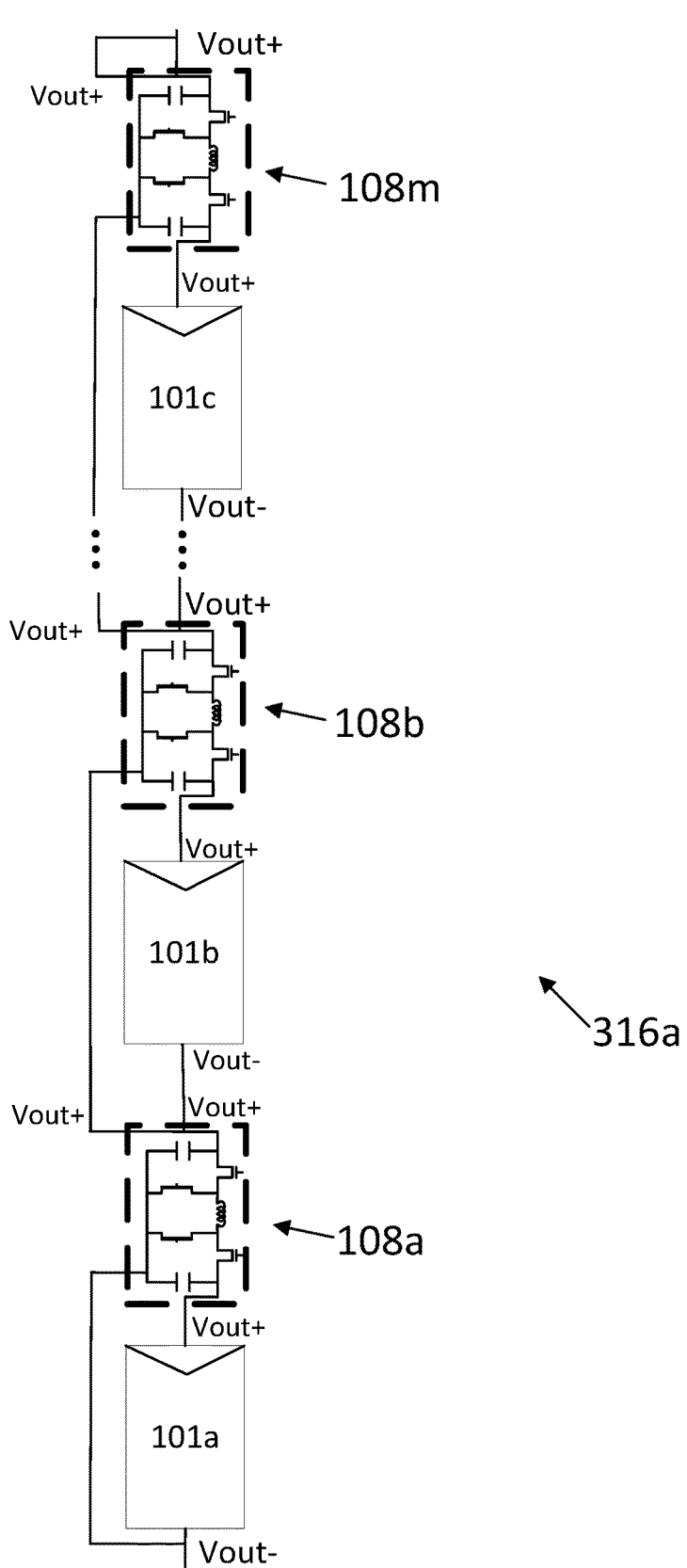

Reference is now made to FIG. 1C, which shows an illustrative embodiment of a photovoltaic string 316a in which each photovoltaic power device is coupled to two photovoltaic modules. In this embodiment, PV power devices 108a-m comprise Buck-Boost DC/DC converters. Additional circuitry may be included in power devices 108a-m, but is not explicitly depicted in FIG. 1C. Additional circuitry and/or wiring configurations may be used to couple power devices to photovoltaic generators according to various aspects of the present disclosure.

Figure 1D:
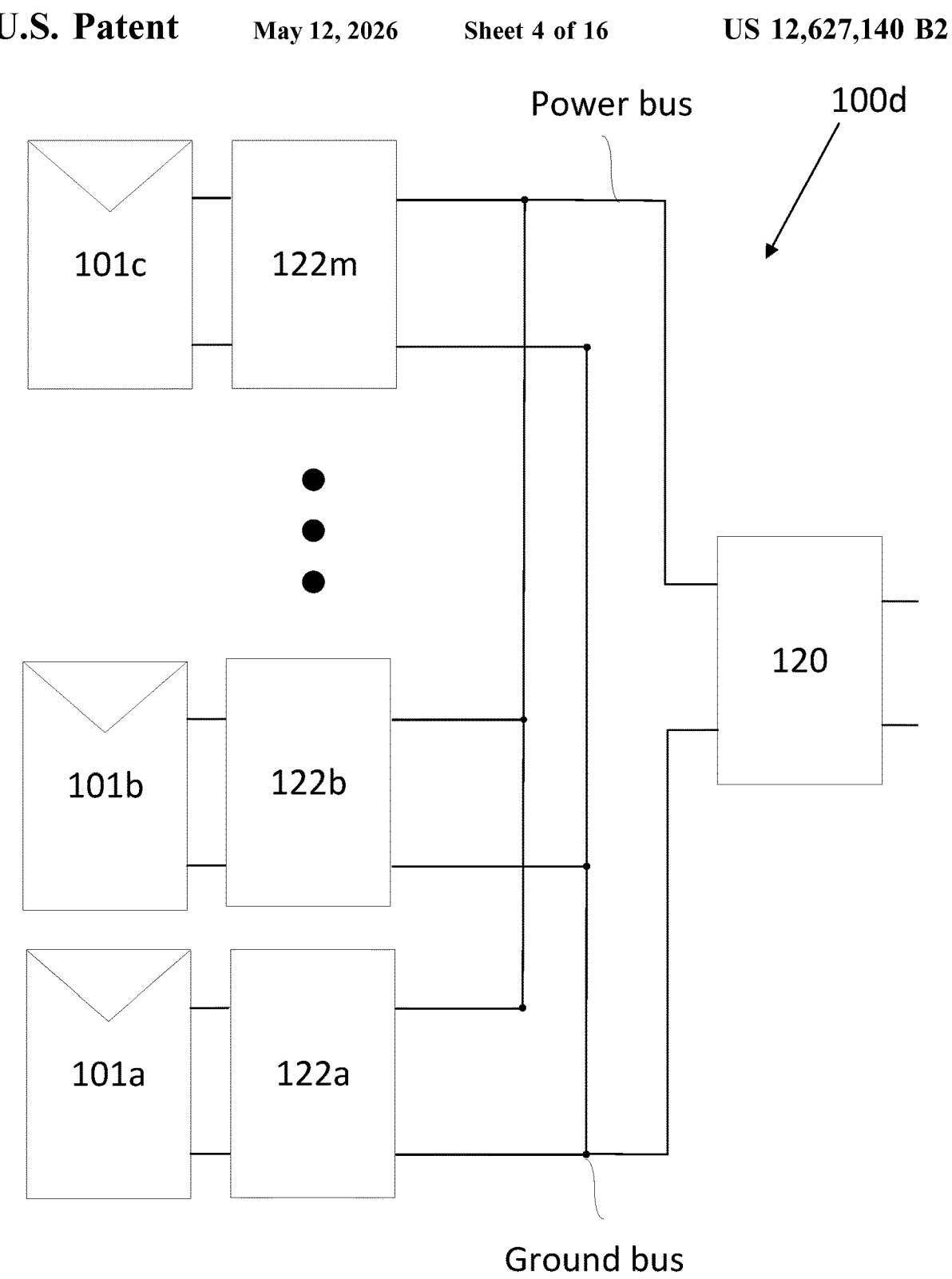

Referring to FIG. 1D, illustrative embodiments may include photovoltaic installation 100d, comprising a plurality of photovoltaic generators 101a-m each coupled to a power device 122a-m. Each power device may have two outputs, one coupled to a mutual power bus, and one coupled to a mutual ground bus, coupling all the power devices in parallel. In some embodiments, one or more power device 122a-m may comprise a DC/DC converter, with each converter's positive output coupled to the power bus, and the negative terminal coupled to the ground bus. In some embodiments, one or more power device 122a-m may comprise a DC/AC converter, with the AC outputs synchronized to allow parallel coupling. In some embodiments including an AC output by the power devices, the AC output may be a single phase coupled to the power and ground buses, and in some embodiments three or more phases may be output to more than two buses. The system may further include the power bus and ground bus being input to grid-coupling device 120. In embodiments including a DC output by the power devices, grid coupling device 120 may include a DC/AC inverter. In embodiments including an AC output by the power devices, grid coupling device 120 may include a transformer. Grid coupling device 120 may be similar to or the same as system power device 110 of FIG. 1A, and may comprise safety devices (e.g. sensors, circuit breakers, fuses, etc.) and/or control and/or monitoring devices.

Figure 1E:
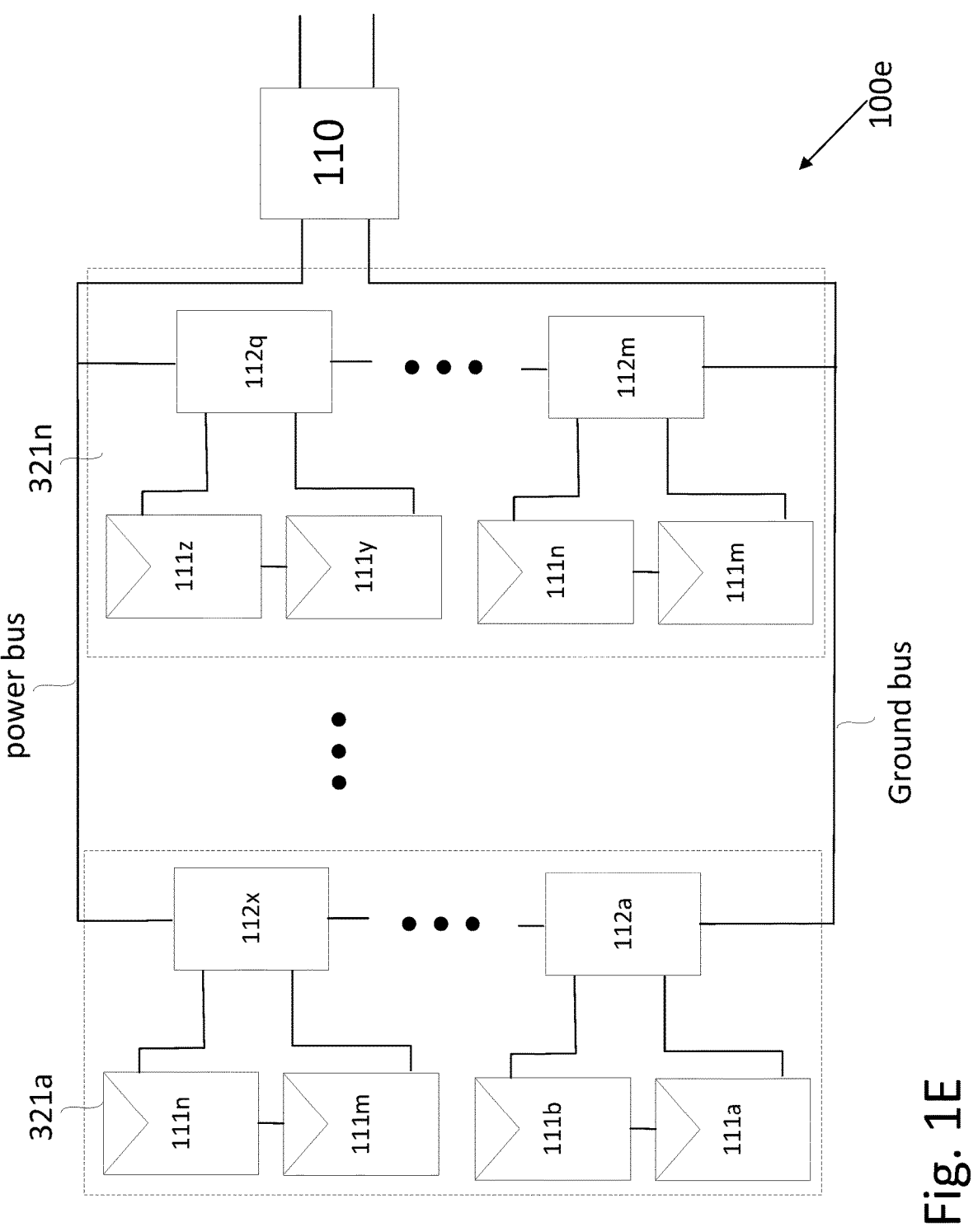

Referring to FIG. 1E, more than one photovoltaic module may be coupled to each photovoltaic power device. System 100e includes two photovoltaic modules (e.g. photovoltaic panels or a different type of photovoltaic generator) 111a, 111b coupled to each other in series, with a photovoltaic power device 112a coupled in parallel to the serially coupled modules 111a, 111b. Similar to other embodiments disclosed herein, a plurality of power devices 112a-x may be coupled in series to form a photovoltaic string 321a, with multiple strings 321a-n coupled in parallel between the ground and power buses. In some embodiments, inverter 123 may receive a DC input from the ground and power buses and output AC power to the grid or home. In similar embodiments, the power devices may be precoupled to one another at the time of manufacturing, with the conductors coupling the power devices being sized to allow the desired number of photovoltaic generators to be coupled to each power device. For example, if each two PV generators are to be coupled to one another and to a single power device, the length of each conductor between power devices being around double the width or length of each photovoltaic module.

Figure 2A:
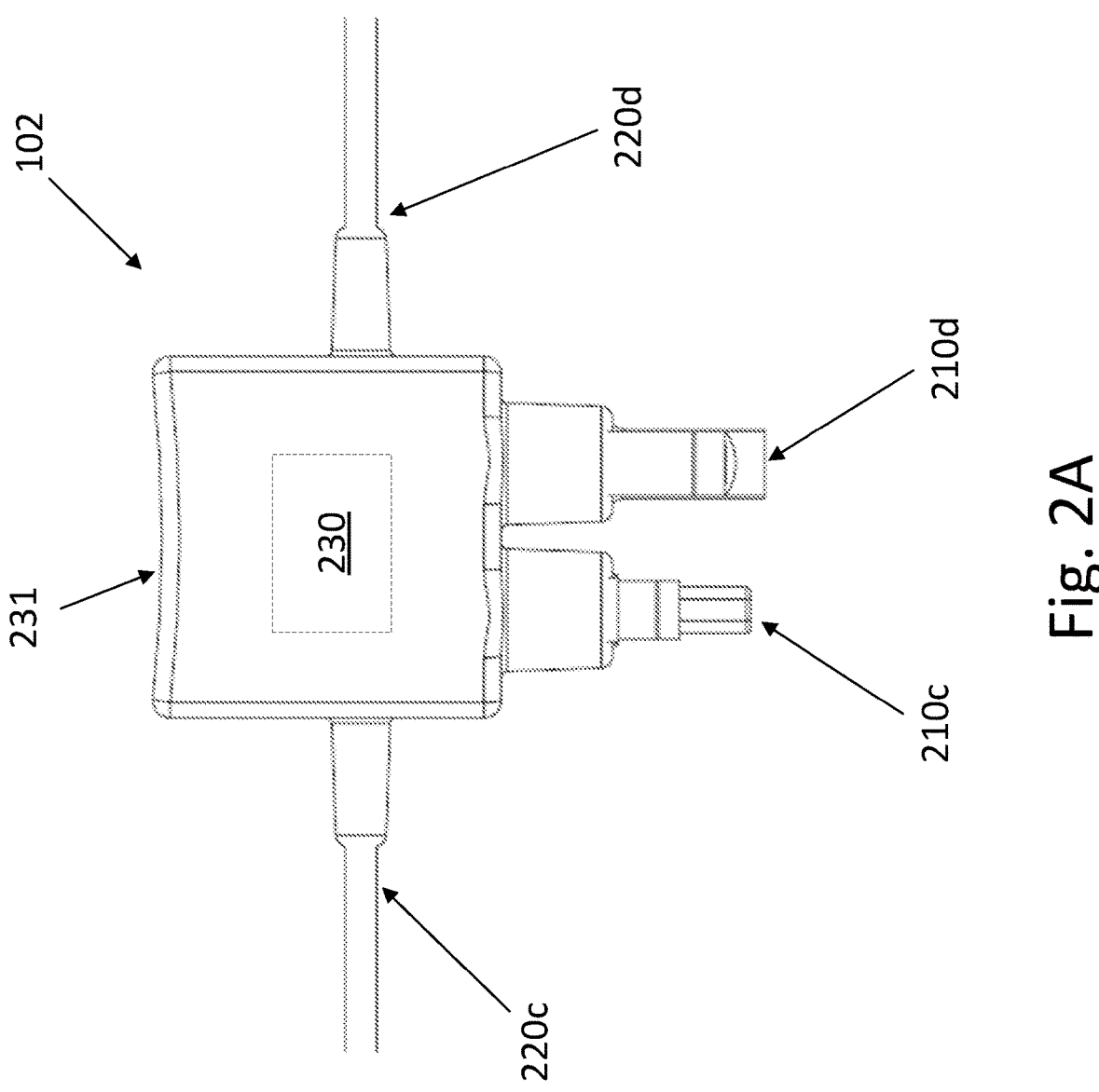
FIGS. 2A-2C depict photovoltaic power devices according to certain embodiments.

Referring to FIG. 2A, photovoltaic power device 102 may be configured in various ways. In one illustrative embodiment, photovoltaic power device 102 may comprise a casing 231 containing circuitry 230, input terminals 210c and 210d, and output conductors 220c and 220d. In other embodiments, casing 231 may be replaced by a surface on which circuitry 230 is mounted, the surface being snapped to a different part of a photovoltaic apparatus such as a junction box. In some embodiments, there may be more than two input terminals. For example, some embodiments may include four input terminals for coupling the power device to two photovoltaic modules, the power device processing power input from both modules.

In some embodiments, circuitry 230 may include a power conversion circuit such as a direct current—direct current (DC/DC) converter such as a buck, boost, buck-boost, Cuk, charge pump, flyback and/or forward converter. In some embodiments, circuitry 230 may include a direct current—alternating current (DC/AC) converter, also known as an inverter or a microinverter. In some embodiments, circuitry 230 may include a Maximum Power Point Tracking (MPPT) circuit with a controller, configured to extract increased power from the PV generator the power device is coupled to. Circuitry 230 may further comprise a control device such as a microprocessor, Digital Signal Processor (DSP) and/or an FPGA. In some embodiments, circuitry 230 may include circuitry and/or sensors configured to measure parameters on or near the photovoltaic generator, such as the voltage and/or current output by the generator, the power output by the generator, the irradiance received by the generator and/or the temperature on or near the generator. Input terminals 210c and 210d may be coupled to outputs of one or more photovoltaic modules, and may also be coupled to circuitry 230 for processing and/or measuring the power output by the corresponding photovoltaic module. Output conductors 220c and 220d may couple the photovoltaic power device to adjacent devices, to form a serial or parallel photovoltaic string. The input and output terminals may be physically connected to different parts of casing 231. The input terminals 210c and 210d may be physically located next to one another along one side of casing 231, with output conductors 220c and 220d occupying opposite sides of casing 231, on either side of input terminals 210c and 210d. In other embodiments, the input terminals and output conductors may be configured differently, as will be shown herein. The location of the input terminals and output conductors may be chosen considering the layout and wiring design of the system at hand. Mechanical considerations, such as enabling optimal storing of the entire chain of power devices, may also factor into designing the location of the input terminals and output conductors. The photovoltaic power device 102 shown in FIG. 2A may be particularly suited for coupling to a single photovoltaic generator (in systems such as those shown in FIGS. 1A and 5A), since the input terminals are next to each other, though photovoltaic power device 102 may also be deployed in a way that couples it to two generators.

Figure 2B:
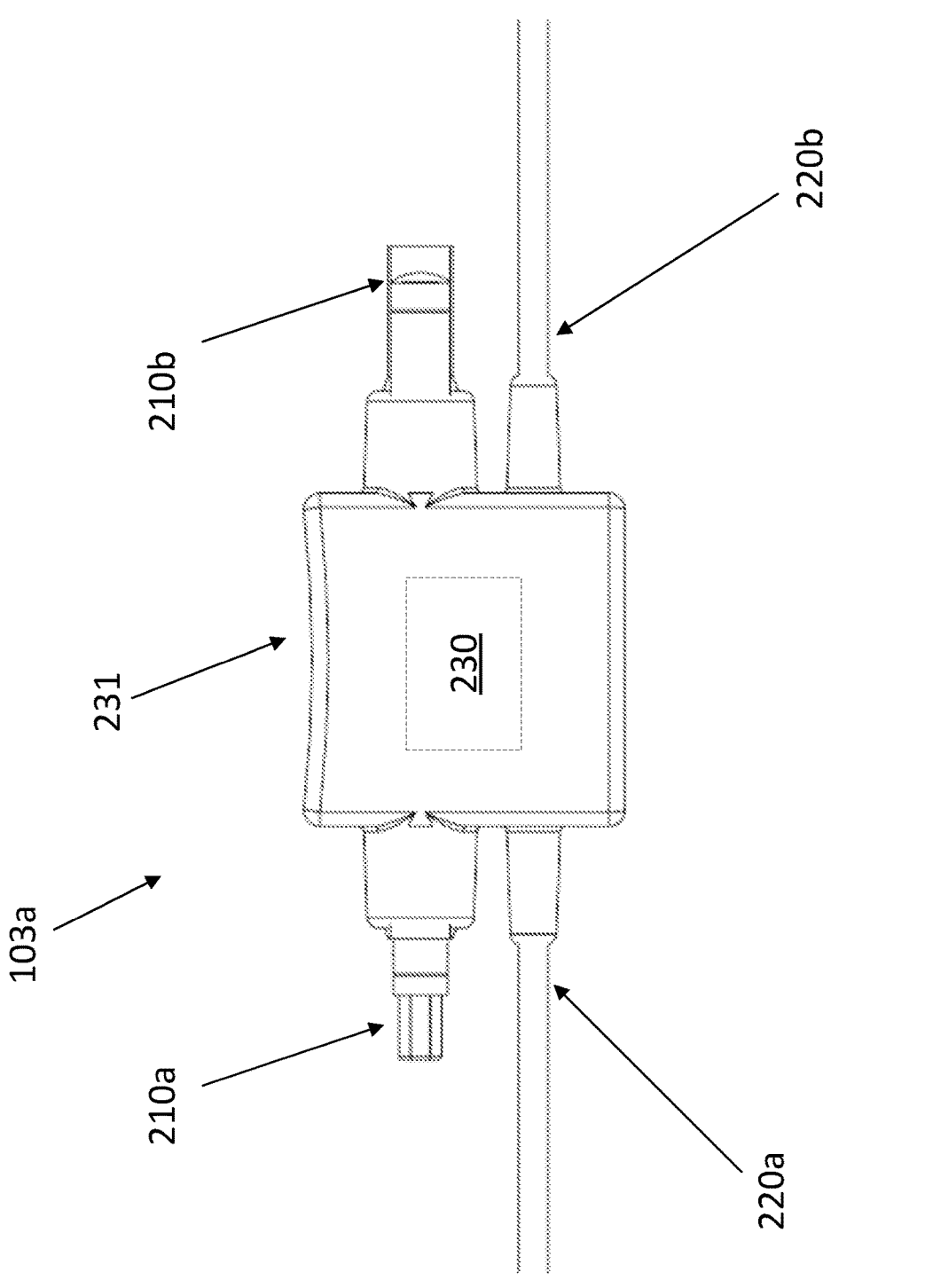

Referring now to FIG. 2B, the input terminals and output conductors may be configured such that input terminal 210a is adjacent to output conductor 220a, both connected to a side of casing 231, and on the opposite side of casing 231 input terminal 210b is adjacent to output conductor 220b. This illustrative embodiment may be particularly suited for coupling photovoltaic power device 103a to two photovoltaic generators (in systems such as those shown in FIGS. 1B and 5B), since the two input terminals may be coupled to two generators on either side of the power device, though photovoltaic power device 103a may also be deployed in a way that couples it to a single generator.

Figure 2C:
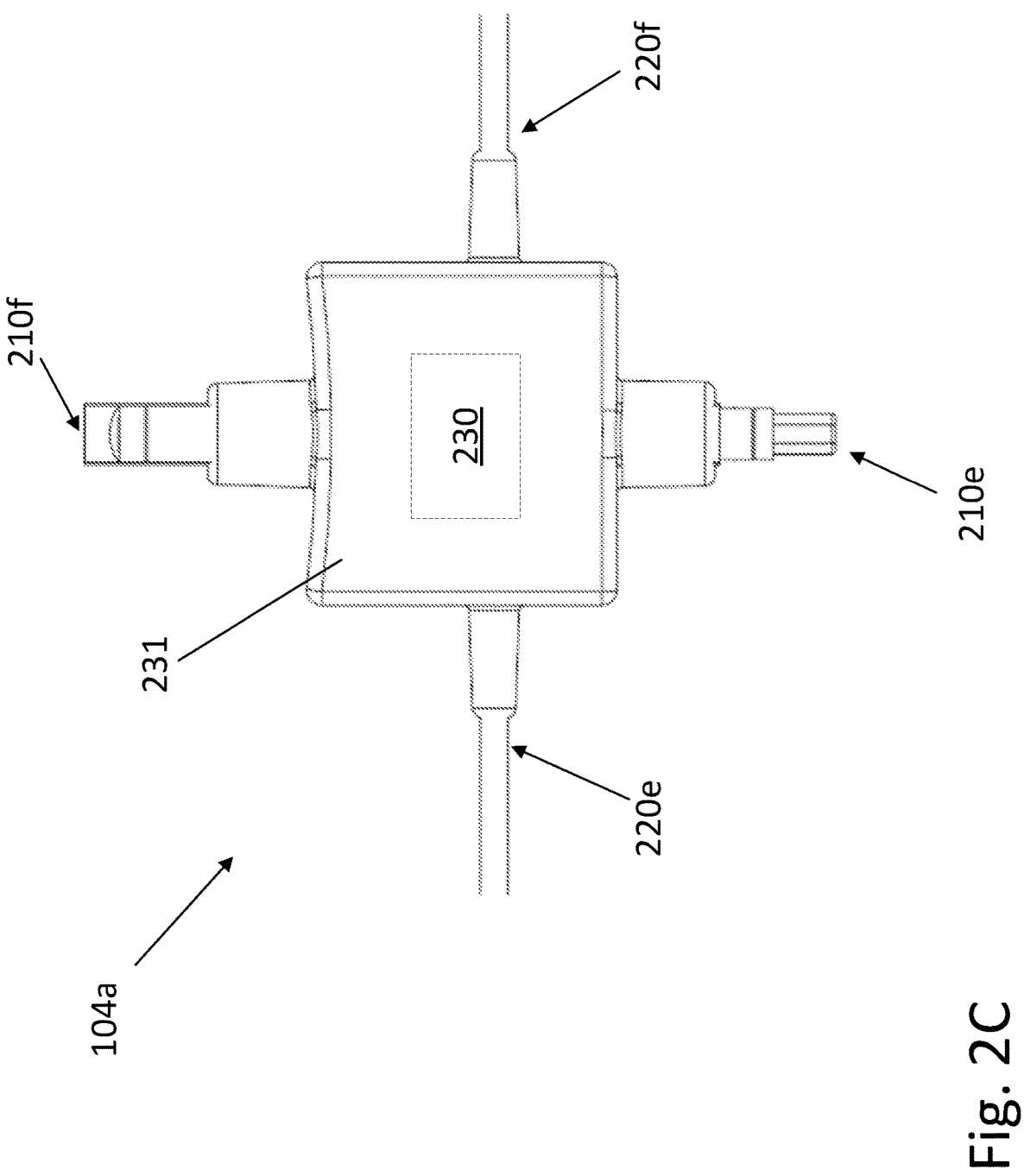

Referring now to FIG. 2C, the input terminals and output conductors may be configured such that input terminals 210e and 210f are located on opposing sides of casing 231, while output conductors 220e and 220f are located on the other pair of opposite sides of casing. Thus, four sides of the casing contain either an input terminal or an output conductor. This illustrative embodiment may, in some configurations, enable optimal packaging of the chain of power devices and enable it to be stored in a compact convenient way. The chain according this embodiment can be deployed in a way that couples each power device to either one or two photovoltaic modules.

Figure 3:
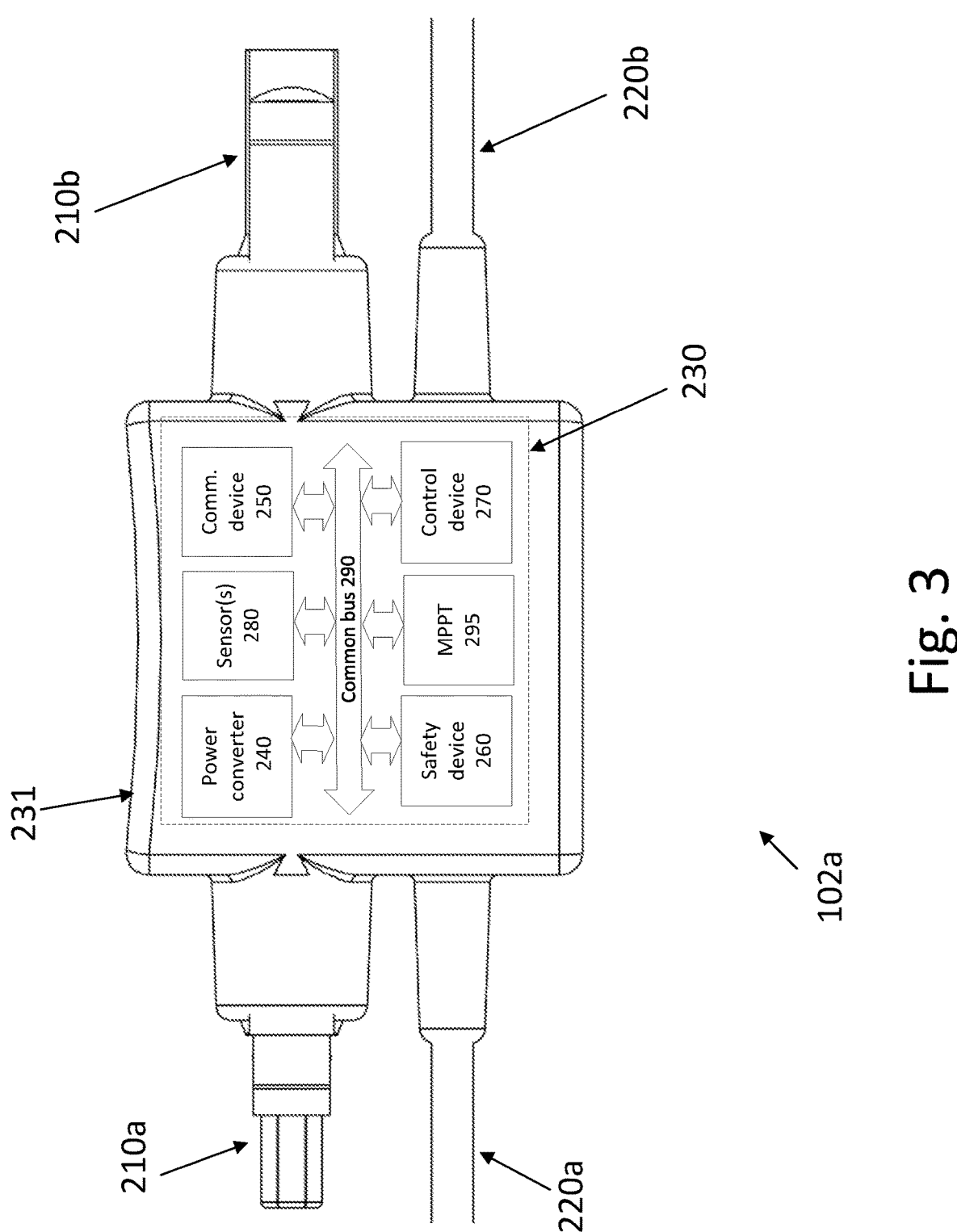
FIG. 3 is part schematic, part block diagram depicting a photovoltaic power device according to certain embodiments.

Referring now to FIG. 3, the casing 231 may house circuitry 230. In some embodiments, circuitry 230 may include power converter 240. Power converter 240 may include a direct current-direct current (DC/DC) converter such as a buck, boost, buck-boost, flyback and/or forward converter. In some embodiments, power converter 240 may include a direct current—alternating current (DC/AC) converter, also known as an inverter or a microinverter. In some embodiments, circuitry 230 may include Maximum Power Point Tracking (MPPT) circuit 295, configured to extract increased power from the PV generator the power device is coupled to. In some embodiments, power converter 240 may include MPPT functionality, and MPPT circuit 295 may not be included. Circuitry 230 may further comprise control device 270 such as a microprocessor, Digital Signal Processor (DSP) and/or an FPGA. Control device 270 may control and/or communicate with other elements of circuitry 230 over common bus 290. In some embodiments, circuitry 230 may include circuitry and/or sensors 280 configured to measure parameters on or near the photovoltaic generator, such as the voltage and/or current output by the generator, the power output by the generator, the irradiance received by the generator and/or the temperature on or near the generator. In some embodiments, circuitry 230 may include communication device 250, configured to transmit and/or receive data and/or commands from other devices. Communication device 250 may communicate using Power Line Communication (PLC) technology, or wireless technologies such as ZigBee, Wi-Fi, cellular communication or other wireless methods. In some embodiments, PLC signals may be transmitted and/or received over output conductors 220a and/or 220b. In some embodiments, a communications link (e.g. an optical fiber) may be integrated with output conductors 220a and/or 220b and may be communicatively coupled to communication device 250. In some embodiments, a thermal sensor device (e.g. a thermocouple device or a Linear Heat Detector) may be integrated with output conductors 220a and 220b and may provide temperature measurements (e.g. measurements obtained at various locations along output conductors 220a and 220b) to control device 270. Input terminals 210a and 210b may be coupled to outputs of one or more photovoltaic modules, and may also be coupled to circuitry 230 for processing and/or measuring the power output by the corresponding photovoltaic module. In some embodiments, circuitry 230 may include safety devices 260 (e.g. fuses, circuit breakers and Residual Current Detectors). The various components of circuitry 230 may communicate and/or share data over common bus 290.

Figure 4A:
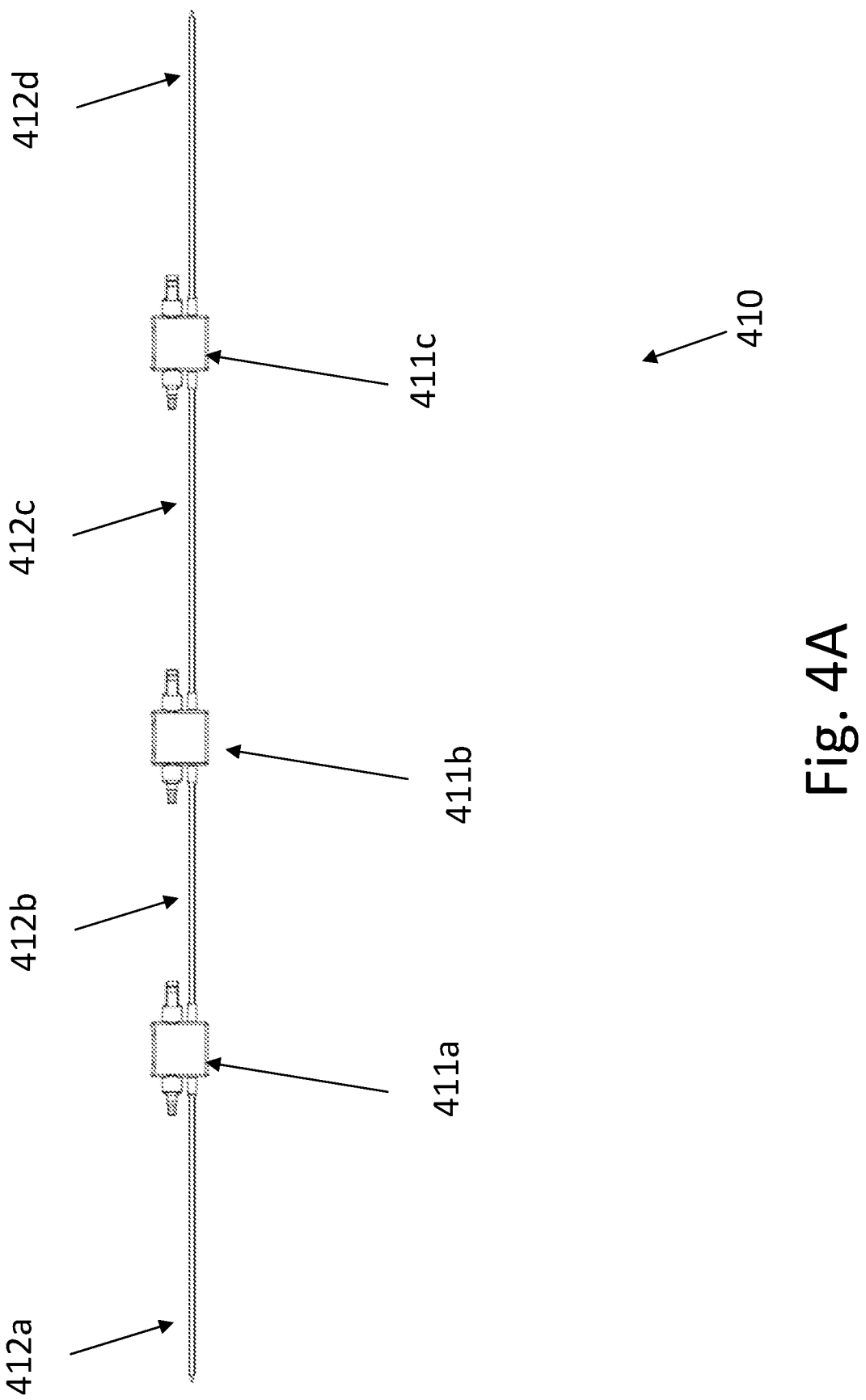
FIGS. 4A-4C depict illustrative embodiments of strings of photovoltaic power devices coupled by conductors.

FIG. 4A depicts an illustrative embodiment of chain 410. Chain 410 may comprise plurality of photovoltaic power devices 411a-c coupled by plurality of conductors 412a-d. In some embodiments, a chain of photovoltaic power devices similar to chain 410 may comprise ten, twenty or even a hundred photovoltaic power devices. In some embodiments, chain 410 may be manufactured and/or sold as a single unit. Photovoltaic power devices 411a-c may be similar to or the same as photovoltaic power devices described herein, for example, photovoltaic power device

102 of FIG. 2A, or photovoltaic power device 103a of FIG. 2B. Conductors 412a-d may be directly coupled (e.g. connected) to the output terminals of a DC/DC converter or DC/AC inverter included in a photovoltaic power device (e.g. 411a-c). The length of each output conductor 412a-d may be appropriate to enable each PV power device to be coupled to photovoltaic generators in a photovoltaic string. Since different PV generators may have different dimensions, and since the PV generators may be oriented differently during deployment, the distance between power devices (i.e., the length of each output conductor) may vary in different chains. However, many PV generators (e.g. PV panels) are of similar dimensions, and PV panels are generally oriented in one of two ways (vertically, aka "portrait", or horizontally, aka "landscape"), so a chain of photovoltaic power devices (e.g. chain 410) featuring a standard distance between power devices may be deployed many photovoltaic systems. For example, photovoltaic panels are generally manufactured in standard sizes, such as around 65 by around 39 inches for residential installations or around 77 by around 39 inches for commercial installations. Therefore, chains of power devices configured to be deployed with panels of dimensions similar to those cited above may include conductors which are around 39, around 65 or around 77 inches long. While the input terminals and output conductors 412a-d of illustrative power devices 411a-c denoted in FIG. 4A are located similarly to what is shown in FIG. 2B, this does not rule out embodiments in which the input terminals and output conductors are located similarly to what is shown in FIG. 2A, or various other configurations without departing from the scope of the present disclosure.

Conductors 412a-412d may be (e.g. during manufacturing or chain 410) internally connected to circuitry (e.g. circuitry 230 of FIG. 3) inside photovoltaic power devices 411a-411c at the time of manufacturing. For example, conductor 412b may, at a first end, be soldered or connected via a screw to a power converter or monitoring device in photovoltaic power device 411a, and at a second end, be soldered or connected via a screw to a power converter or monitoring device in photovoltaic power device 411b. Preconnecting conductors between power devices may reduce the number of connectors (e.g. MC4™ connectors) featured in each power device from four (two connectors for connecting to a PV generator at the power device input and two connectors for connecting between power devices at the power device output). As connectors may be costly components, substantial savings may be realized. Additionally, preconnecting power devices during manufacturing may increase system safety. For example, if improperly connected, connection points between power devices may be susceptible to overheating, arcing and/or other unsafe event which may result in fire. Preconnecting conductors between power devices during manufacturing without use of connectors may increase system safety by reducing the number of connection points from four per power device to two per power device.

Figure 4B:
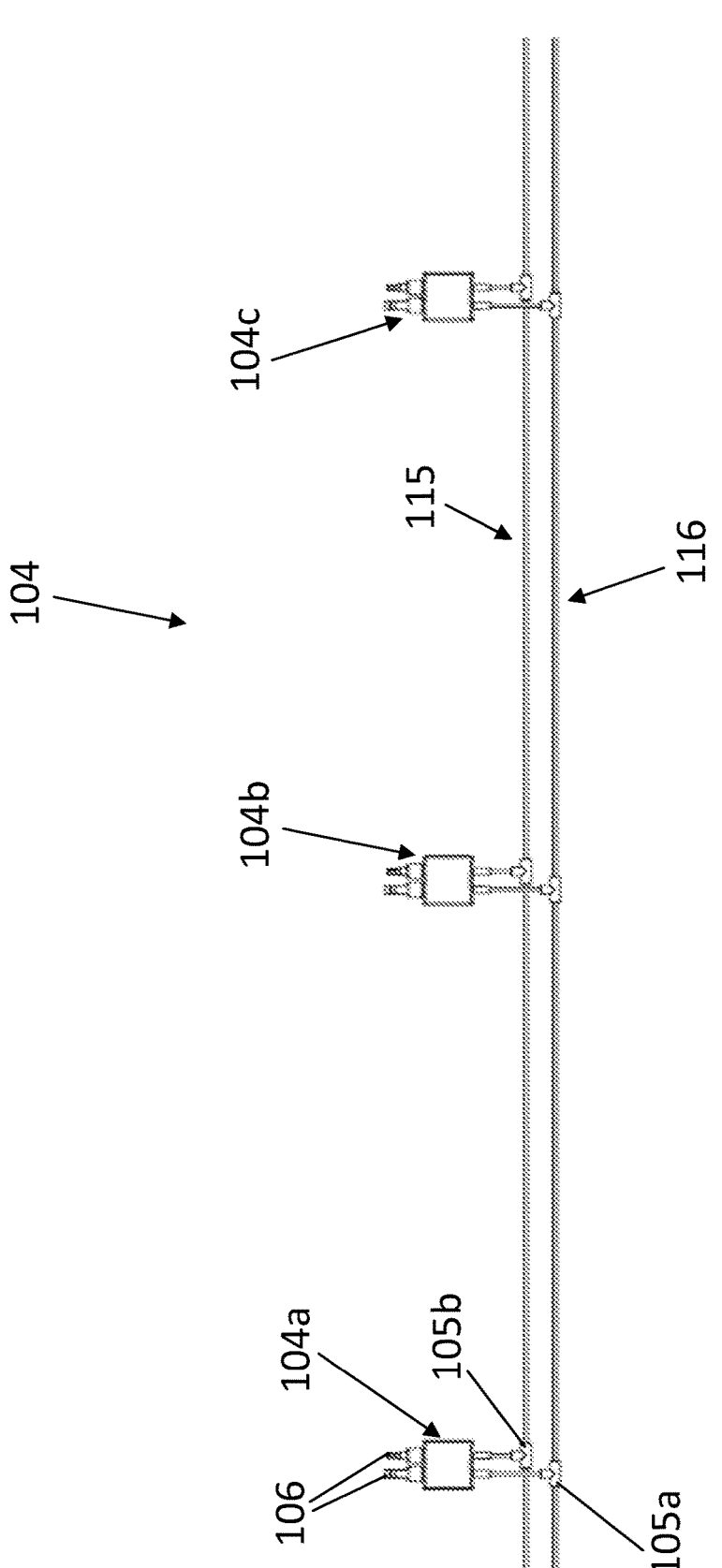

Referring now to FIG. 4B, a chain of photovoltaic power devices 104 may comprise output conductors which double as ground and power buses of a parallel-connected photovoltaic installation, similar to the system shown in FIG. 1D. Input terminals 106 may be coupled to the outputs of a photovoltaic system. Output conductor 105a may be coupled to the power bus using a T-connector, and output conductor 105b may be coupled to the ground bus using a T-connector. The input terminals 106 and output conductors 105a, 105b are denoted explicitly in FIG. 4B only for power device 104a, to reduce visual noise. One or more power device 104*a-c* may comprise a DC/DC converter or DC/AC inverter configured to output a DC or AC voltage common to all parallel-connected devices. In some embodiments, one or more power device 104*a-c* may comprise a Maximum Power Point Tracking (MPPT) circuit with a controller, configured to extract maximum power from the PV generator the power device is coupled to. One or more power device 104*a-c* may further comprise a control device such as a microprocessor, Digital Signal Processor (DSP) and/or an FPGA. In some embodiments, one or more power device 104*a-c* may comprise circuitry and/or sensors configured to measure parameters on or near the photovoltaic generator, such as the voltage and/or current output by the generator power output by the generator, the irradiance received by the generator and/or the temperature on or near the generator. The power device chain 104 in the illustrative embodiment shown in FIG. 4B may include two long conductors, ground bus 116 and power bus 115, with PV power devices coupled to the two conductors, with the distance between adjacent power devices enabling them to be coupled to adjacent PV generators in a photovoltaic installation. The power devices may be coupled to the conductors at the time of manufacturing, and may be compactly stored along with the conductors, enabling fast and easy deployment.

Figure 4C:
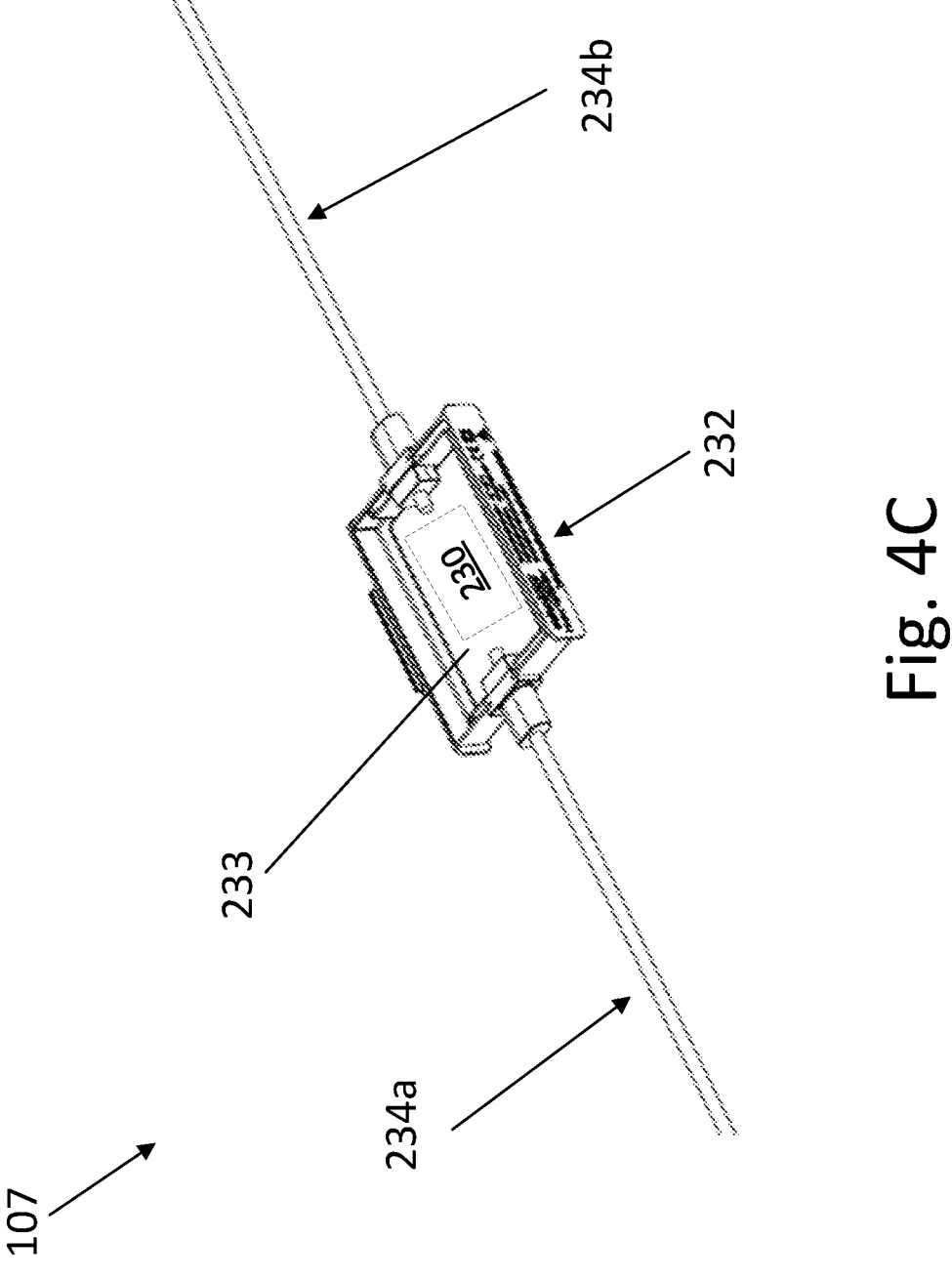

Referring now to FIG. 4C, illustrative embodiments of photovoltaic power device 107 may feature an open casing or lid 232 instead of a closed casing such as casing 231 depicted in FIG. 2A. Lid 232 may include circuit-mounting surface 233 which may be used to mount circuitry 230. Circuitry 230 may comprise any and/or all of the components described herein with reference to other figures. For example, circuitry 230 may comprise a power converter such as a DC/DC or a DC/AC converter. As another example, circuitry 230 may comprise a monitoring device in addition to or instead of a power converter. In some embodiments, power device 107 may be designed to be connectable to a portion of a photovoltaic panel junction box, enabling circuitry 230 to be coupled directly to the electronics located in the panel's junction box. In some embodiments, PV power device 107 may comprise bypass and/or blocking diodes to prevent and alleviate mismatch effects in the solar arrays comprising the PV panel. In some embodiments, direct coupling of the lid to a photovoltaic generator junction box may render external input terminals unnecessary. Output conductors 234*a-b* may be located on opposite sides of lid 232, and may be coupled to additional power devices (not depicted explicitly in the figure), forming a chain of serially connected devices. Similar to other illustrative embodiments, the distance (i.e. the length of the coupling conductor) between adjacent power devices 107 may be of appropriate length enabling coupling of adjacent power devices to adjacent photovoltaic modules in a photovoltaic installation. The power devices may be coupled to the conductors at the time of manufacturing, and may be compactly stored along with the conductors, enabling fast and easy deployment.

Figure 5A:
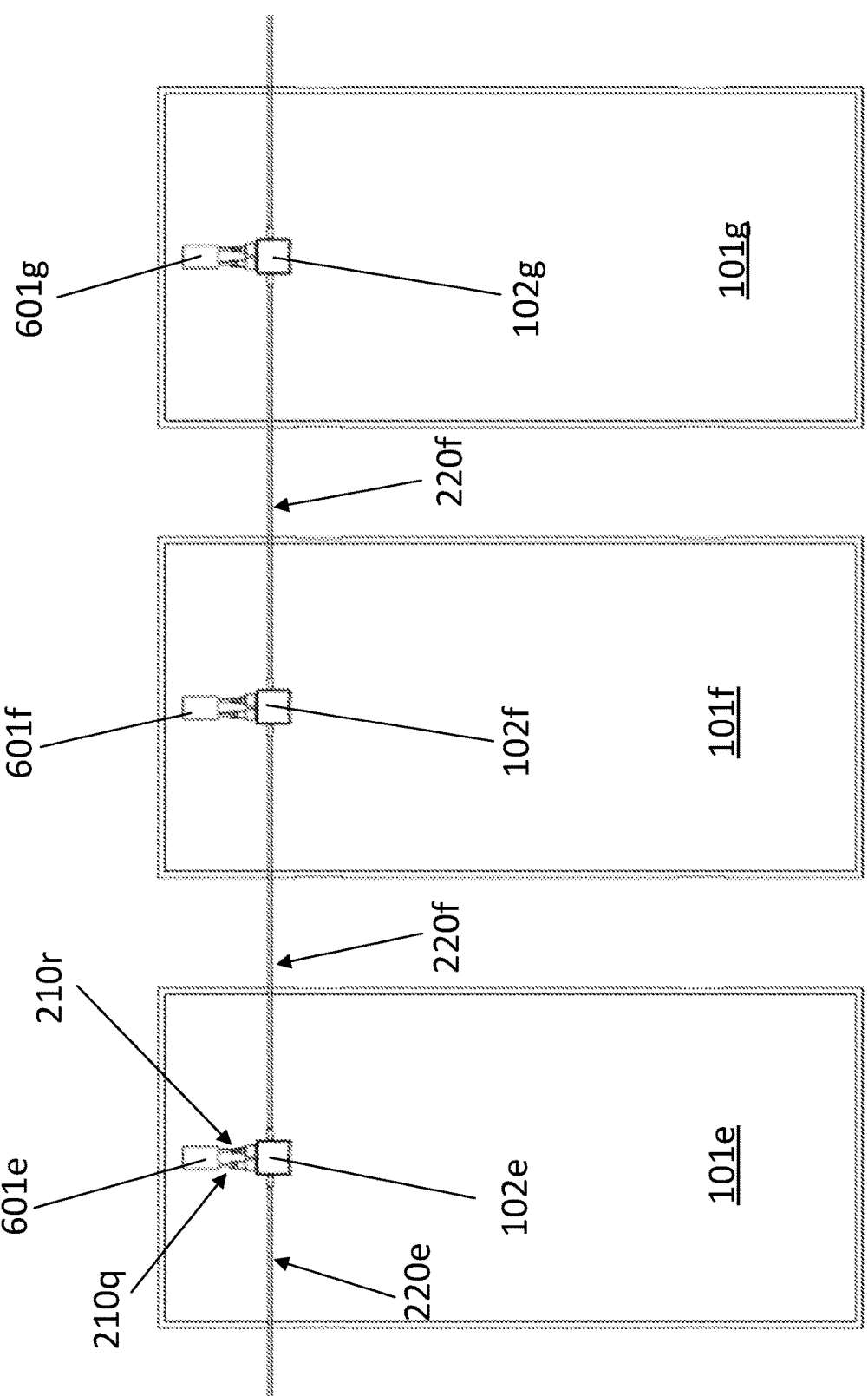
FIGS. 5A-5C depict illustrative embodiments of portions of photovoltaic strings, with a plurality of photovoltaic power devices coupled to each other by conductors and coupled to photovoltaic generators.

Reference is now made to FIG. 5A, which depicts a portion of a chain of power devices coupled to photovoltaic generators, according to illustrative embodiments. PV generator 101*e* may include junction box 601*e*, featuring two outputs which may be coupled to input terminals 210*q* and 210*r* of power device 102*e*. Power generated by the PV generator may be transferred via the junction box to the power device via the input terminals 210*q* and 210*r*, which may be coupled directly to the junction box. Power device 102*e* may further include circuitry 230 (not explicitly depicted in the figure) which may comprise various elements as described herein. Output conductor 220*e* may couple power device 102*e* to an adjacent power device on one side (not shown explicitly), while output conductor 220*f* may couple power device 102*e* to an adjacent power device 102*f* on the other side, with output conductor 220*f* coupling power device 102*f* to power device 102*g*. To reduce visual noise, the input terminals and output conductors of power devices 102*f*, 102*g* are not labeled explicitly in the figure. Conductors 220*e*, 220*f* and 220*g* may be of appropriate length to enable fast and easy coupling of each of the power devices to their respective generators, without overuse of conductive cables. For example, if PV modules 101*e*, 101*f* and 101*g* are of standard width of 39 inches and are placed next to one another while oriented vertically, each output conductor may be about 40-45 inches long.

Figure 5B:
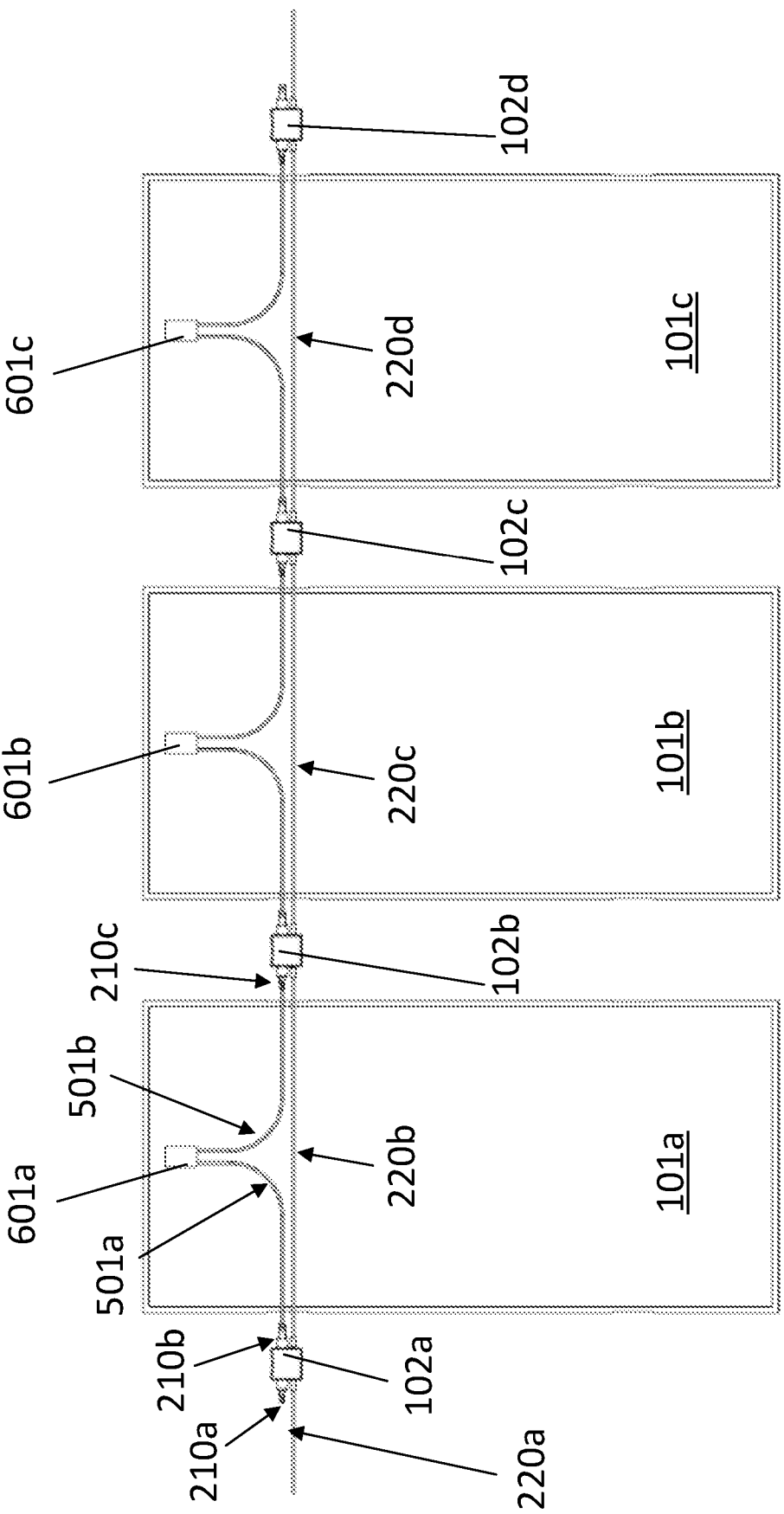

Reference is now made to FIG. 5B, which depicts a portion of a chain of power devices coupled to photovoltaic generators, according to illustrative embodiments. PV generator 101*a* may include junction box 601*a*, to which generator cables 501*a* and 501*b* are coupled. Power generated by the PV generator is transferred via the junction box to the generator cables, with cable 501*a* coupled to input terminal 210*b* of power device 102*a*, and cable 501*b* coupled to input terminal 210*c* of power device 102*b*. Power devices 102*a* and 102*b* may be coupled to one another by output conductor 220*b*. Power device 102*a* may include circuitry 230 (not explicitly depicted in the figure) which may comprise various elements as described herein. Output conductor 220*a* may couple power device 102*a* to an adjacent power device on one side (not shown explicitly), with input terminal 210*a* being coupled to an adjacent power cable (also not shown explicitly). To reduce visual noise, the input terminals and output conductors of power devices 102*b*, 102*c* are not labeled explicitly in the figure. Conductors 220*a*, 220*b* and 220*c* may be of appropriate length to enable fast and easy coupling of each of the power devices to two adjacent photovoltaic modules, without overuse of conductive cables. For example, if PV generators 101*a* 101*b* and 101*c* are of standard width of 39 inches and are placed next to one another while oriented vertically, each output conductor may be about 40-45 inches long.

Figure 5C:
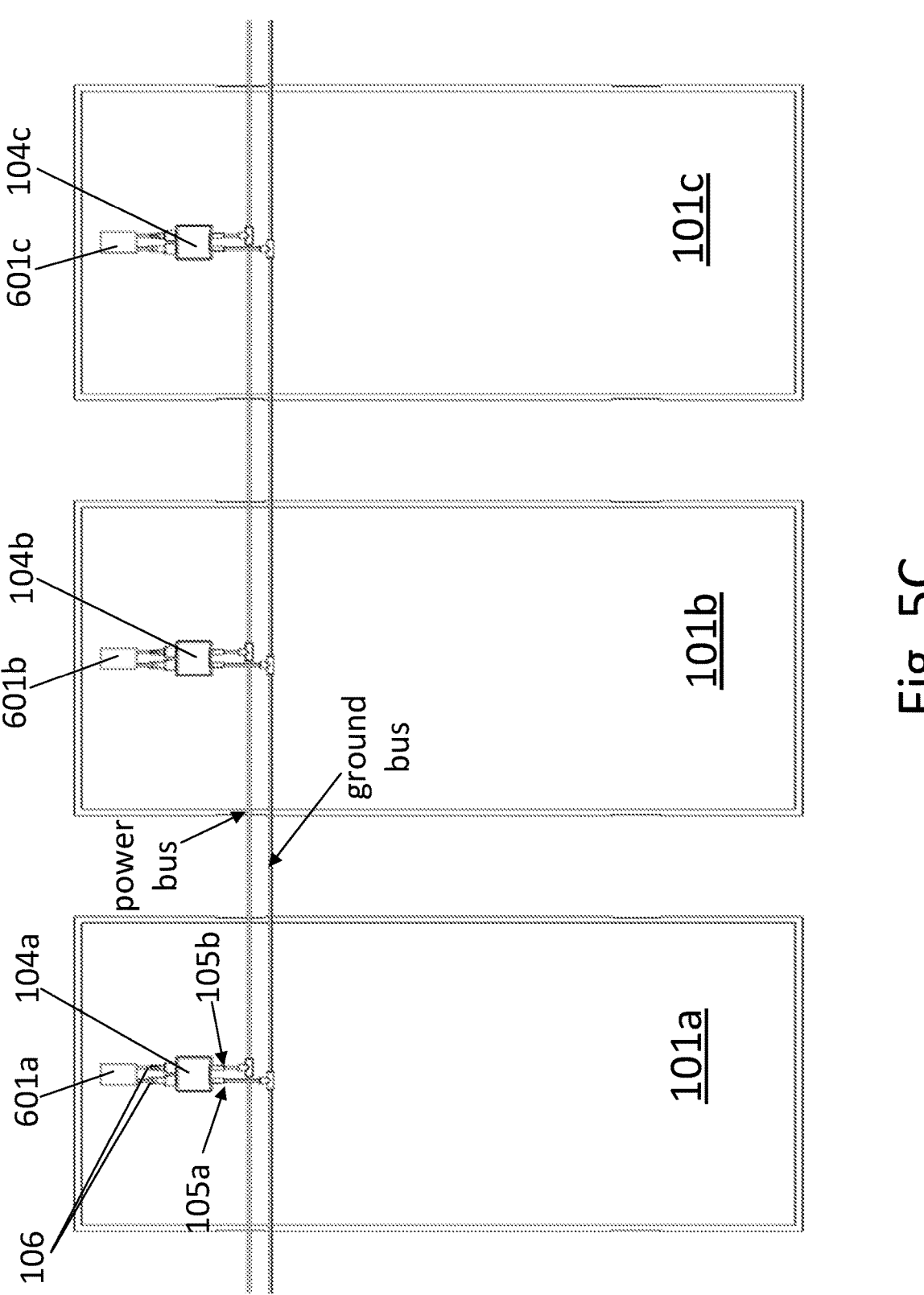

Referring to FIG. 5C, illustrative embodiments may include a plurality of PV power devices 104*a-c*, each featuring two input terminals 106 (only labeled explicitly for power device 104*a*) coupled to a photovoltaic generator's junction box (e.g., 601*a*). The photovoltaic power may flow via the junction box and input terminals to the PV power device. The power device may include output conductor 105*a*, which is coupled via a T-connector to a ground bus, and output conductor 105*b*, which is coupled via a T-connector to a power bus. The ground bus and power bus may be coupled to the output conductors of each power device in the chain, thus coupling all the photovoltaic modules in the string in parallel. The distance between adjacent PV power devices may enable them to be coupled to adjacent PV generators in a photovoltaic installation. The power devices may be coupled to the two conductors (the ground and power buses) at the time of manufacturing, and may be compactly stored along with the conductors, enabling fast and easy deployment.

Figure 6:
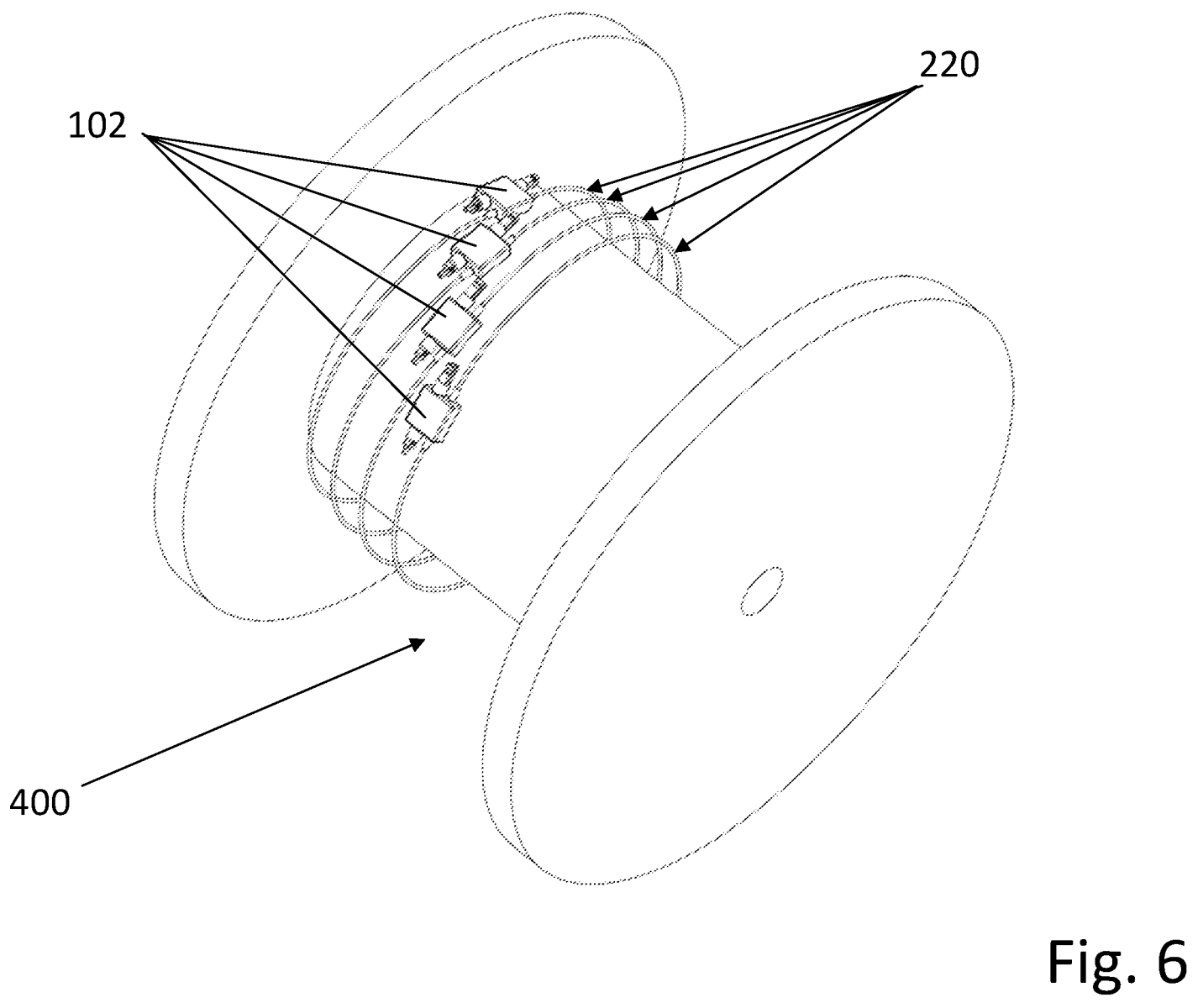

Referring now to FIG. 6, some illustrative embodiments include a storage device used to store a chain of power devices in a way that enables convenient storing and fast and easy deployment of the chain of power devices. A chain of photovoltaic power devices may comprise PV power devices 102 coupled to one another by output conductors 220. The chain may be stored by being wound around storage device 400. In the illustrative embodiment depicted in FIG. 6, storage device 400 is a cylindrical reel, though other shapes may be using for winding. A cylindrical shape may make deployment easier, as a cylindrical reel may be rolled along the ground in a photovoltaic installation, much like cabling reels. The storage device may be designed to allow the chain of power devices to be packaged efficiently. For example, if the storage device is similar to the cylindrical reel depicted in FIG. 4, the diameter of the reel may be chosen considering the length of the conductors coupling the power devices, so that when the chain is wound around the reel, the power devices may be located next to one another on the reel, pressed tightly together for compact storing.

In some embodiments, an apparatus includes a plurality of power devices and a plurality of photovoltaic generators connected to the power devices. The power devices may include an input terminal, a common terminal and first and second output terminals. An input terminal of a first power device may be connected to a first power source terminal of one of the plurality of photovoltaic generators, a first output terminal of a second power device may be connected to a second power source terminal of one of the plurality of photovoltaic generators, and a second output terminal of the second power device may be connected to a common terminal of the first power device. The first and second output terminals may output a common output voltage, with a total output current flowing through the power device (e.g. a photovoltaic string current where the power device is part of a photovoltaic string) being divided between a first output current flowing through the first output terminal and a second output current flowing through the second output terminal. The first output current may further flow through a connected photovoltaic generator, and in some embodiments, the power device may be operated to provide a first output current corresponding to a Maximum Power Point current of the photovoltaic generator. The power device may be operated to provide a second output current corresponding to a differential current between the total output current and the first output current.

In some embodiments, the first output terminal may comprise a connector designed to be connected to a photovoltaic generator terminal, for example, using an MC4™ connector. In some embodiment, the second output terminal and the common terminal may comprise conductors preconnected to the power device and other power devices (e.g. conductors 220c and 220d of FIG. 2A, or conductors 220a and 220b of FIG. 2B). Dividing the current of a power device into two or more portions may create smaller current portions that allow for cables which may be thinner and cheaper than those which would otherwise be needed.

At least one of the power devices may include a combiner box configured to couple to a plurality of photovoltaic strings and to combine power from the plurality of photovoltaic strings. One or more power devices may include one or more sensors or sensor interfaces configured to measure or to receive measurements of one or more parameters associated with the plurality of photovoltaic generators. One or more power devices may include one or more safety switches configured to disconnect and/or short circuit the photovoltaic generators upon detection of a predefined potentially unsafe condition or in response to a manual trigger. The manual trigger may include activation of a rapid-shutdown switch or button.

In some embodiments, the power device may include output conductors configured to transmit and/or receive PLC signals. A communications link (e.g. may be integrated with output conductors and may be communicatively coupled to a communication device. A thermal sensor device may be integrated with output conductors and may provide temperature measurements to a control device associated with the apparatus. The thermal sensor device may include a thermocouple device and/or a linear heat detector. Temperature measurements by the thermal sensor device may be obtained at one or more locations along the output conductors.

In some embodiments, an apparatus includes a plurality of power devices and a plurality of conductors connecting, each connecting one power device to at least one other power device. A first conductor may be connected between an input of a first power device and a first output of a first power generator. A second conductor may be connected between an output of the first power device and a second output of first power generator. A third conductor may be connected between an output of a second power device and the common terminal of the first power device. The conductors may be internally connected to circuitry inside a respective power device. At least one of the plurality of conductors may, at a first end, be soldered or connected via a screw to the power device. A second end of the conductor may be soldered or connected via a screw to another power device. Specifically, the first end and second end may each be connected to a power converter or monitoring device in a respective power device.

Other embodiments may consider alternative storage techniques, such as packing power device chains into boxes, winding the chain around multiple poles, and the like.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof. Further, elements of one embodiment may be combined with elements from other embodiments in appropriate combinations or subcombinations. For example, conductors 234a-b of FIG. 4C may be located at a same side of lid 232, similarly to as shown with regard to terminals 210c and 210d of FIG. 2A. As another example, a chain of power devices may connect a plurality of photovoltaic generators in parallel, as shown in FIG. 5C, wherein each of the plurality of photovoltaic generators comprises a plurality of serially connected photovoltaic panels (as shown in FIG. 1E) or photovoltaic cells.

In illustrative embodiments disclosed herein, photovoltaic generators are used as examples of power sources which may make use of the novel features disclosed. Each PV generator may comprise one or more solar cells, one or more solar cell strings, one or more solar panels, one or more solar shingles, or combinations thereof. In some embodiments, the power sources may include batteries, flywheels, wind or hydroelectric turbines, fuel cells or other energy sources in addition to or instead of photovoltaic panels. Systems, apparatuses and methods disclosed herein which use PV generators may be equally applicable to alternative systems using additional power sources, and these alternative systems are included in embodiments disclosed herein.

What is claimed is:
1. An apparatus comprising:
a chain of power devices, each power device of the chain of power devices comprising:
a casing,
circuitry disposed inside the casing, the circuitry comprising a power converter, two inputs configured to couple to a respective power source, a first output coupled to a first conductor, and a second output coupled to a second conductor, wherein outputs of adjacent power devices, of the chain of power devices, are preconnected to each other via direct connections to respective conductors therebetween, and the respective conductors are internally connected, without use of any external connectors, to the circuitry inside the casing, and wherein, for each power device of the chain of power devices:

at least one of the first conductor or the second conductor is coupled to an adjacent power device in the chain of power devices, and lengths of the first conductor and the second conductor are determined during manufacturing of the apparatus to be of an appropriate length to enable coupling of each power device, of the chain of power devices, to the respective power source.

2. The apparatus of claim 1, wherein each power device of the chain of power devices has a total of two external connection points.

3. The apparatus of claim 1, wherein, for each power device of the chain of power devices, at least one of the first conductor and the second conductor is soldered or connected via a screw to a respective power device.

4. The apparatus of claim 1, wherein the power converter, of each power device of the chain of power devices, comprises at least one of a direct current to direct current (DC/DC) converter or a direct current to alternating current (DC/AC) converter.

5. The apparatus of claim 1, wherein one or more power devices of the chain of power devices are configured to output a time-varying direct current (DC) signal that emulates a rectified sine wave.

6. The apparatus of claim 1, wherein the respective power source comprises a power generator, and wherein each power device of the chain of power devices is configured to regulate an output of the power generator.

7. The apparatus of claim 1, wherein one or more power devices of the chain of power devices further comprise at least one of: a communication device, a residual current device, a fuse, a measuring device, or a monitoring device.

8. The apparatus of claim 1, further comprising:

a packaging assembly configured to store the chain of power devices.

9. A method comprising:

connecting, during manufacturing of a plurality of power devices, outputs of adjacent power devices, of the plurality of power devices, to each other by directly connecting conductors therebetween to form a chain of power devices, wherein the conductors are internally connected, without use of any external connectors, to circuitry, comprising a power converter, inside a plurality of casings of the plurality of power devices; and connecting two inputs, of each power device of the plurality of power devices, to a respective power source, wherein each power device of the plurality of power devices comprises:

a casing, of the plurality of sasings, containing the circuitry, a first output coupled to a first conductor, and a second output coupled to a second conductor, wherein, for each power device of the plurality of power devices:

at least one of the first conductor or the second conductor is coupled to an adjacent power device in the chain of power devices, and lengths of the first conductor and the second conductor are determined during manufacturing of the plurality of power devices to be of an appropriate length to enable coupling of each power device, of the plurality of power devices, to the respective power source.

10. The method of claim 9, wherein, for each power device of the plurality of power devices, the first conductor and the second conductor are directly connected by soldering or screwing the first conductor and the second conductor into place within the casing.

11. The method of claim 9, wherein the connecting the two inputs comprises:

connecting the two inputs, of each power device of the plurality of power devices, to outputs of the respective power source.

12. The method of claim 9, wherein each power device of the plurality of power devices comprises at least one of a direct current to direct current (DC/DC) converter or a direct current to alternating current (DC/AC) converter.

13. The method of claim 9, wherein one or more power devices of the plurality of power devices are configured to output a time-varying direct current (DC) signal that emulates a rectified sine wave.

14. The method of claim 9, wherein the comprises a power generator, and wherein each power device of the plurality of power devices is configured to regulate an output of the power generator.

15. The method of claim 9, wherein one or more power devices of the plurality of power devices further comprise at least one of: a communication device, a residual current device, a fuse, a measuring device, or a monitoring device.

16. The method of claim 9, further comprising:

storing the chain of power devices using a packaging assembly.

* * * * *